United States Patent
Kawai et al.

(10) Patent No.: US 9,900,525 B2
(45) Date of Patent: Feb. 20, 2018

(54) IMAGE PROCESSING DEVICE, IMAGING DEVICE, IMAGE PROCESSING METHOD, AND IMAGE PROCESSING PROGRAM GENERATING A SPLIT IMAGE

(71) Applicant: FUJIFILM Corporation, Tokyo (JP)

(72) Inventors: Tomoyuki Kawai, Saitama (JP); Junji Hayashi, Saitama (JP); Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

(21) Appl. No.: 15/067,864

(22) Filed: Mar. 11, 2016

(65) Prior Publication Data

US 2016/0198105 A1 Jul. 7, 2016

Related U.S. Application Data

(63) Continuation of application No. PCT/JP2014/073366, filed on Sep. 4, 2014.

(30) Foreign Application Priority Data

Sep. 30, 2013 (JP) ................................. 2013-205478

(51) Int. Cl.
*H04N 5/341* (2011.01)
*H04N 5/369* (2011.01)
(Continued)

(52) U.S. Cl.
CPC ............. *H04N 5/341* (2013.01); *G02B 7/346* (2013.01); *G03B 13/36* (2013.01); *G03B 17/20* (2013.01);
(Continued)

(58) Field of Classification Search
None
See application file for complete search history.

(56) References Cited

U.S. PATENT DOCUMENTS

2006/0251413 A1* 11/2006 Toji .................... H04N 5/23212
396/111
2009/0153693 A1 6/2009 Onuki et al.
(Continued)

FOREIGN PATENT DOCUMENTS

JP 2009-147665 A 7/2009
JP 2009-237214 A 10/2009
(Continued)

OTHER PUBLICATIONS

International Preliminary Report on Patentability for PCT/JP2014/073366 (PCT/IB/373) dated Apr. 5, 2016.
(Continued)

*Primary Examiner* — Dennis Hogue
(74) *Attorney, Agent, or Firm* — Birch, Stewart, Kolasch & Birch, LLP

(57) ABSTRACT

The invention provides an image processing device, an imaging device, an image processing method, and a non-transitory computer readable recording medium recorded with an image processing program which can ensure a split image with a simple structure. A control unit selects the pixels in a 3n-th (n is an integer equal to or greater than 0) row as a first pixel group which functions as left phase difference pixels and reads a signal charge generated in a photodiode (PDL). The control unit selects the pixels in a (3n+2)-th row as a second pixel group which functions as right phase difference pixels and reads a signal charge generated in a photodiode (PDR). The control unit selects the pixels in a (3n+1)-th row as a third pixel group which functions as normal pixels, adds the signal charges generated in the photodiodes (PDL and PDR) and reads the sum of the signal charges.

21 Claims, 35 Drawing Sheets

(51) Int. Cl.
*H04N 5/232* (2006.01)
*H04N 9/04* (2006.01)
*G03B 17/20* (2006.01)
*G03B 13/36* (2006.01)
*G02B 7/34* (2006.01)
*H04N 13/02* (2006.01)

(52) U.S. Cl.
CPC ....... *H04N 5/23212* (2013.01); *H04N 5/3696* (2013.01); *H04N 9/045* (2013.01); *H04N 13/0217* (2013.01)

(56) References Cited

U.S. PATENT DOCUMENTS

| | | | |
|---|---|---|---|
| 2010/0302433 A1* | 12/2010 | Egawa | G02B 7/34 348/345 |
| 2011/0058070 A1* | 3/2011 | Awazu | H04N 5/23212 348/241 |
| 2013/0235253 A1* | 9/2013 | Onuki | H04N 5/3696 348/349 |
| 2014/0267865 A1 | 9/2014 | Kishi | |

FOREIGN PATENT DOCUMENTS

| | | |
|---|---|---|
| JP | 2012-191401 A | 10/2012 |
| JP | 2013-110607 A | 6/2013 |

OTHER PUBLICATIONS

Written Opinion of the International Searching Authority for PCT/JP2014/073366 (PCT/ISA/237) dated Nov. 4, 2014.
International Search Report for PCT/JP2014/073366 (PCT/ISA/210) dated Nov. 4, 2014.

* cited by examiner

FIG. 34
BEFORE CORRECTION
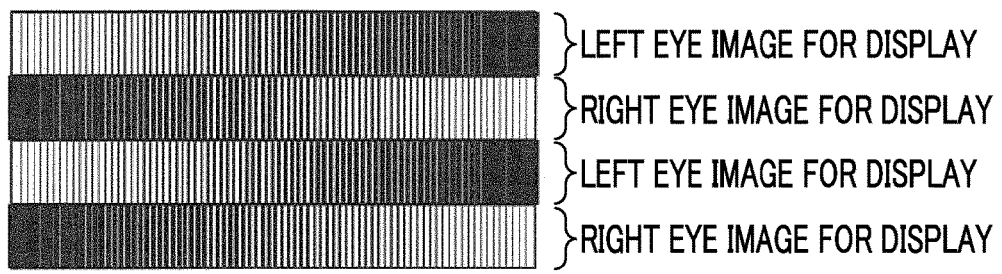
} LEFT EYE IMAGE FOR DISPLAY
} RIGHT EYE IMAGE FOR DISPLAY
} LEFT EYE IMAGE FOR DISPLAY
} RIGHT EYE IMAGE FOR DISPLAY
AFTER CORRECTION
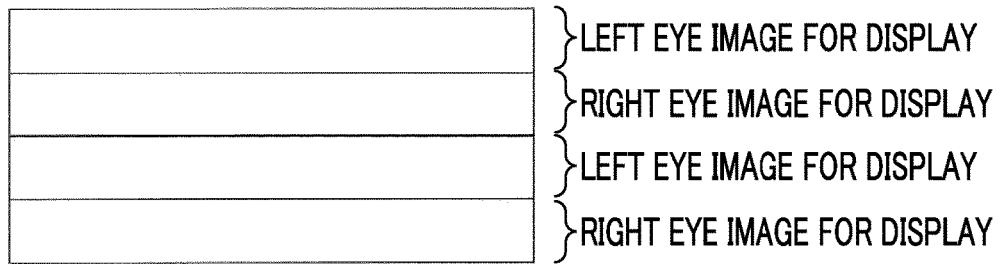
} LEFT EYE IMAGE FOR DISPLAY
} RIGHT EYE IMAGE FOR DISPLAY
} LEFT EYE IMAGE FOR DISPLAY
} RIGHT EYE IMAGE FOR DISPLAY

IMAGE PROCESSING DEVICE, IMAGING DEVICE, IMAGE PROCESSING METHOD, AND IMAGE PROCESSING PROGRAM GENERATING A SPLIT IMAGE

CROSS-REFERENCE TO RELATED APPLICATIONS

This application is a Continuation of PCT International Application No. PCT/JP2014/073366 filed on Sep. 4, 2014, which claims priority under 35 U.S.C. §119(a) to Japanese Patent Application No. 2013-205478 filed on Sep. 30, 2013. Each of the above application(s) is hereby expressly incorporated by reference, in its entirety, into the present application.

BACKGROUND OF THE INVENTION

1. Field of the Invention

The present invention relates to an image processing device, an imaging device, an image processing method, and a non-transitory computer readable recording medium recorded with an image processing program.

2. Description of the Related Art

Digital cameras which have a so-called manual focus mode that enables the user to manually adjust focus, in addition to an automatic focus mode using a phase difference detection method or a contrast detection method, is widely known.

As a digital camera having a manual focus mode, a digital camera is known which is provided with a reflex mirror such that the user can adjust focus while checking an object and uses a split microprism screen on which a phase difference is visually displayed. In addition, a digital camera using a method which visually checks contrast is known.

However, in a digital camera without a reflex mirror which has recently come into widespread use, since a reflex mirror is not provided, there is no way to check an object image while displaying a phase difference and there is no choice but to use the contrast detection method. However, in this case, it is difficult to display an image with a contrast that is equal to or greater than the resolution of a display device such as a liquid crystal display (LCD). As a result, there is no choice but to use a method which partially enlarges an image or the like and displays the image.

In recent years, a split image has been displayed in a live view image (also referred to as a through image) in order to make it easy for the user (for example, the photographer) to focus the camera on the object in the manual focus mode. The split image indicates, for example, a divided image of which the display region is divided into a plurality of regions (for example, each of the images which are divided in the up-down direction) and which deviates in a direction in which parallax occurs (for example, the left-right direction) depending on the amount of defocus. When an image is in focus, the deviation of the split image in the direction in which parallax occurs is removed. The user operates a manual focus ring (hereinafter, referred to as a "focus ring") to focus the camera on the object such that the deviation of the split image (for example, each of the images which are divided in the up-down direction) is removed.

Here, the principle of the split image will be described with reference to the imaging device disclosed in JP2009-147665A. The imaging device disclosed in JP2009-147665A generates a so-called right eye image and a so-called left eye image from an object image which passes through a pair of regions of an imaging lens, is pupil-divided, and is formed. Then, the imaging device generates a split image using the right eye image and the left eye image, and generates a normal image from an object image which passes through the imaging lens, without being pupil-divided, and is formed. Then, the imaging device displays the normal image on a display unit and displays the split image in the normal image.

However, an image signal output from a phase difference pixel which receives right region passage light that passes through the exit pupil of the imaging lens is used to generate the right eye image. In addition, an image signal output from a phase difference pixel which receives left region passage light that passes through the exit pupil of the imaging lens is used to generate the left eye image. JP2013-110607A discloses an imaging device which has all pixels as phase difference pixels, each of which has a plurality of photoelectric conversion regions, independently reads an image signal from each photoelectric conversion region, and adds the image signals read from each photoelectric conversion region.

SUMMARY OF THE INVENTION

However, in the technique disclosed in JP2013-110607A, all of the pixels are the phase difference pixels each of which has a plurality of photoelectric conversion regions and the image signals are independently read from each photoelectric conversion region. Therefore, there is a concern that the structure of an imaging element, particularly, the structure of the pixels will become complicated.

The invention has been made in view of the above-mentioned problems and an object of the invention is to provide an image processing device, an imaging device, an image processing method, and a non-transitory computer readable recording medium recorded with an image processing program which can ensure a split image with a simple structure even if all pixels are phase difference pixels.

In order to achieve the object, according to a first aspect, there is provided an image processing device including a control unit that reads a first image signal from pixels which are selected as a first pixel group among a plurality of pixels, each of which includes an output unit that selectively outputs any one of the first image signal, a second image signal, and a third image signal obtained by adding the first and second image signals which are obtained from an object image that passes through first and second regions of an imaging lens, is pupil-divided, and is formed, reads the second image signal from pixels which are selected as a second pixel group among the plurality of pixels, and reads the third image signal from pixels which are selected as a third pixel group among the plurality of pixels.

According to a second aspect of the invention, the image processing device according to the first aspect of the invention may further include a generation unit that generates a first display image which is used to check a focus and in which first divided images that are some of a plurality of divided images obtained by dividing a first image based on the first image signal in a predetermined division direction and second divided images that correspond to divided regions adjacent to divided regions corresponding to the first divided images among a plurality of divided images obtained by dividing a second image based on the second image signal in the division direction are arranged so as to be adjacent to each other in the division direction.

According to a third aspect of the invention, in the image processing device according to the second aspect of the invention, the generation unit may further generate a second display image which is used to check an imaging range, on the basis of the third image signal.

According to a fourth aspect of the invention, in the image processing device according to any one of the first to third aspects of the invention, the plurality of pixels may be two-dimensionally arranged and the control unit may select the pixels in units of rows as the first, second, and third pixel groups among the plurality of pixels which are two-dimensionally arranged.

According to a fifth aspect of the invention, in the image processing device according to the fourth aspect of the invention, color filters of three primary colors may be provided in a Bayer array in the plurality of pixels. The control unit may select pixels in a (3n−2)-th (n is a natural number equal to or greater than 1) row, pixels in a (3n−1)-th row, and pixels in a 3n-th row as the first, second, and third pixel groups, respectively.

According to a sixth aspect of the invention, in the image processing device according to the fifth aspect of the invention, the control unit may select the pixels in the (3n−2)-th (n is a natural number equal to or greater than 1) row as one of the first and second pixel groups, select the pixels in the (3n−1)-th row as the third pixel group, and select the pixels in the 3n-th row as the other of the first and second pixel groups.

According to a seventh aspect of the invention, in the image processing device according to any one of the fourth to sixth aspects of the invention, the control unit may select the pixels in a (3m−2)-th (m is a natural number equal to or greater than 1) column as the first, second, and third pixel groups.

According to an eighth aspect of the invention, in the image processing device according to any one of the fourth to sixth aspects of the invention, the control unit may select the pixels as the first, second, and third pixel groups such that the pixels in the same row and (3m−2)-th (m is a natural number equal to or greater than 1) and 3m-th columns form one pixel unit.

According to a ninth aspect of the invention, in the image processing device according to any one of the first to eighth aspects of the invention, the control unit may perform control such that an exposure time of the pixel in the first and second pixel groups is longer than an exposure time of the pixel in the third pixel group.

According to a tenth aspect of the invention, in the image processing device according to any one of the first to ninth aspects of the invention, the control unit may perform control such that the exposure time of the pixel in the first and second pixel groups is twice as long as the exposure time of the pixel in the third pixel group.

According to an eleventh aspect of the invention, in the image processing device according to any one of the first to tenth aspects of the invention, the control unit may select the pixels, which are selected as the first pixel group in a k-th (k is a natural number equal to or greater than 1) frame, as the second pixel group in a (k+1)-th frame, select the pixels, which are selected as the second pixel group in the k-th frame, as the first pixel group in the (k+1)-th frame, and select the pixels, which are selected as the third pixel group in the k-th frame, as the third pixel group in the (k+1)-th frame.

According to a twelfth aspect of the invention, in the image processing device according to the eleventh aspect of the invention, the control unit may perform control such that the first and second pixel groups are exposed over the k-th frame and the (k+1)-th frame.

According to a thirteenth aspect of the invention, the image processing device according to any one of the first to twelfth aspects of the invention may further include a correction unit that corrects shading characteristics of the first image based on the first image signal, on the basis of a result of comparison between a value of a pixel in the third pixel group and a value of a pixel, which is adjacent to the pixel, in the first pixel group, and corrects shading characteristics of the second image based on the second image signal, on the basis of a result of comparison between the value of the pixel in the third pixel group and a value of a pixel, which is adjacent to the pixel, in the second pixel group.

According to a fourteenth aspect of the invention, there is provided an imaging device including: the image processing device according to any one of the first to thirteenth aspects of the invention; an imaging element that includes the plurality of pixels; and a storage unit that stores an image which is generated on the basis of a signal output from the imaging element.

According to a fifteenth aspect of the invention, there is provided an image processing method of the image processing device including allowing the control unit to read the first image signal from pixels which are selected as the first pixel group among the plurality of pixels, each of which includes an output unit that selectively outputs any one of the first image signal, the second image signal, and the third image signal obtained by adding the first and second image signals which are obtained from the object image that passes through first and second regions of the imaging lens, is pupil-divided, and is formed, to read the second image signal from pixels which are selected as the second pixel group among the plurality of pixels, and to read the third image signal from pixels which are selected as the third pixel group among the plurality of pixels, and allowing the control unit to select the pixels in units of rows as the first, second, and third pixel groups among the plurality of pixels which are two-dimensionally arranged.

According to a sixteenth aspect of the invention, there is provided a non-transitory computer readable recording medium recorded with an image processing program that causes a computer to function as the image processing device including allowing the control unit to read the first image signal from pixels which are selected as the first pixel group among the plurality of pixels, each of which includes an output unit that selectively outputs any one of the first image signal, the second image signal, and the third image signal obtained by adding the first and second image signals which are obtained from the object image that passes through first and second regions of the imaging lens, is pupil-divided, and is formed, to read the second image signal from pixels which are selected as the second pixel group among the plurality of pixels, and to read the third image signal from pixels which are selected as the third pixel group among the plurality of pixels, and allowing the control unit to select the pixels in units of rows as the first, second, and third pixel groups among the plurality of pixels which are two-dimensionally arranged.

According to the invention, it is possible to ensure a split image with a simple structure even if all pixels are phase difference pixels.

BRIEF DESCRIPTION OF THE DRAWINGS

FIG. 34 is a conceptual diagram illustrating an example of the influence of the shading characteristics on a left eye image for display and a right eye image for display before and after correction.

DESCRIPTION OF THE PREFERRED EMBODIMENTS

Hereinafter, examples of embodiments of an imaging device according to the invention will be described with reference to the accompanying drawings.

First Embodiment

Figure 1:
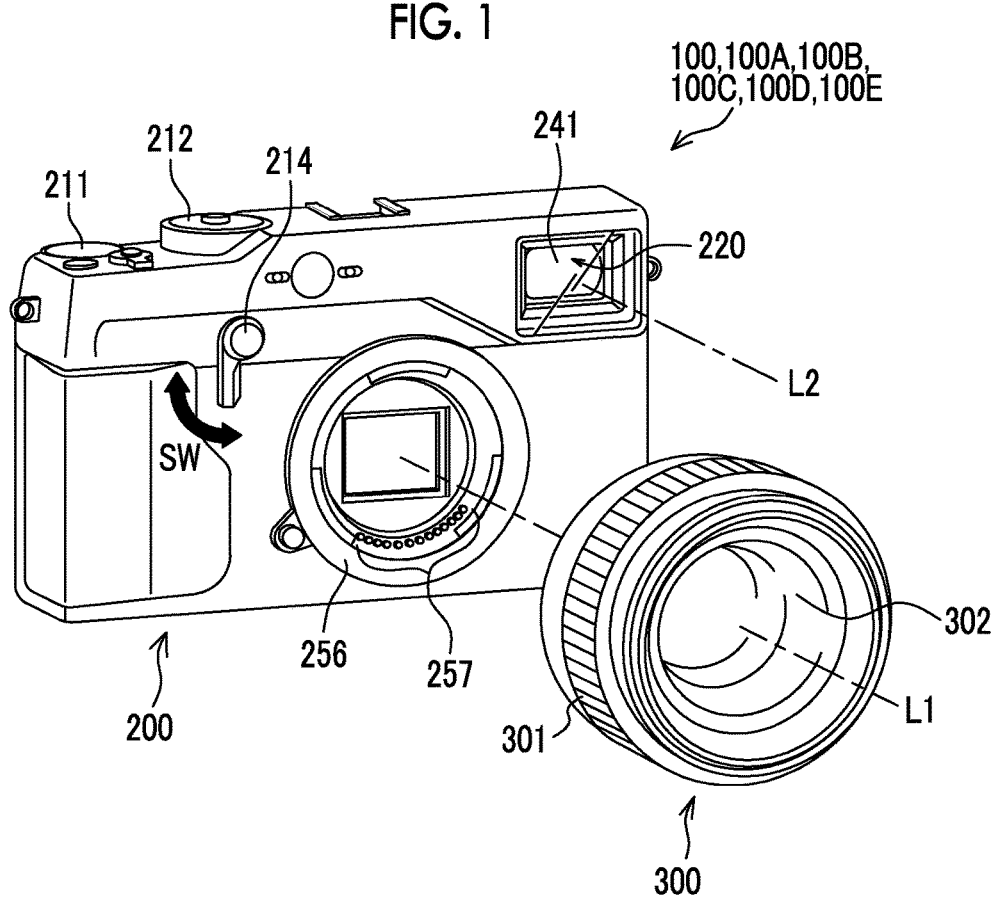
FIG. 1 is a perspective view illustrating an example of the outward appearance of an imaging device which is an interchangeable lens camera according to first to sixth embodiments.
Figure 2:
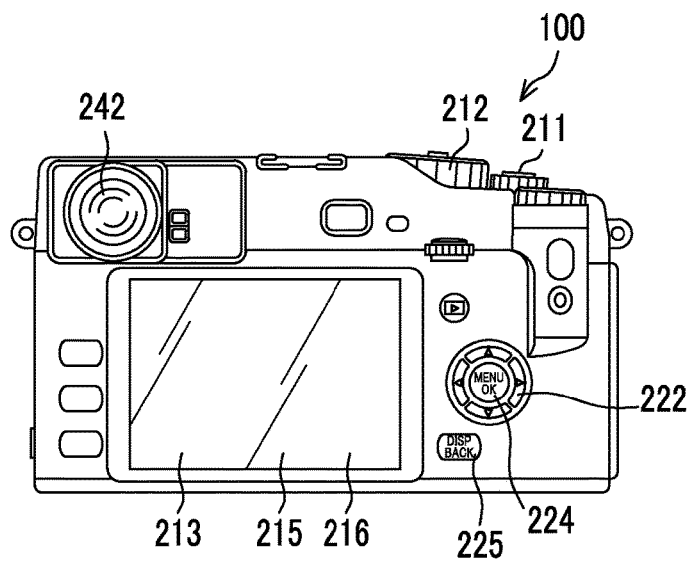
FIG. 2 is a rear view illustrating the rear surface side of the imaging device according to the first to sixth embodiments.

FIG. 1 is a perspective view illustrating an example of the outward appearance of an imaging device 100 according to a first embodiment. FIG. 2 is a rear view illustrating the imaging device 100 illustrated in FIG. 1.

The imaging device 100 is an interchangeable lens camera. The imaging device 100 is a digital camera that includes an imaging device body 200 and an interchangeable lens 300 which is interchangeably mounted on the imaging device body 200, and does not include a reflex mirror. The interchangeable lens 300 includes an imaging lens 16 (see FIG. 3) having a focus lens 302 that can be moved in an optical axis direction by a manual operation. In addition, imaging device body 200 includes a hybrid finder (registered trademark) 220. The hybrid finder 220 means, for example, a finder in which an optical viewfinder (hereinafter, referred to as an "OVF") and an electronic viewfinder (hereinafter, referred to as an "EVF") are selectively used.

The interchangeable lens 300 is interchangeably mounted on the imaging device body 200. In addition, a focus ring 301 which is used in a manual focus mode is provided in a lens barrel of the interchangeable lens 300. The focus lens 302 is moved in the optical axis direction with the rotation of the focus ring 301 by a manual operation to focus object light on an imaging element 20 (see FIG. 3), which will be described below, at an in-focus position corresponding to the distance to the object.

A finder window 241 of the OVF included in the hybrid finder 220 is provided on the front surface of the imaging device body 200. In addition, a finder switching lever 214 (finder switching unit) is provided on the front surface of the imaging device body 200. When the finder switching lever 214 is rotated in the direction of an arrow SW, an image is switched between an optical image which can be viewed through the OVF and an electronic image (live view image) which can be viewed through the EVF (which will be described below). Further, an optical axis L2 of the OVF is different from an optical axis L1 of the interchangeable lens 300. Furthermore, a release button 211 and a dial 212 for setting, for example, an imaging mode or a reproduction mode are generally provided on an upper surface of the imaging device body 200.

The release button 211 serving as an imaging preparation instruction unit and an imaging instruction unit is configured such that a two-stage pressing operation, that is, an imaging preparation instruction state and an imaging instruction state can be detected. The imaging preparation instruction state means a state in which the release button 211 is pressed from a standby position to an intermediate position (halfway pressed position). The imaging instruction state means a state in which the release button 211 is pressed to a finally pressed position (fully pressed position) through the intermediate position. Hereinafter, the "state in which the release button 211 is pressed from the standby position to the halfway pressed position" is referred to as a "halfway pressed state" and the "state in which the release button 211 is pressed from the standby position to the fully pressed position" is referred to as a "fully pressed state".

In the imaging device 100 according to the first embodiment, the imaging mode and the reproduction mode as the operation modes are selectively set in response to an instruction from the user. In the imaging mode, the manual focus mode and the automatic focus mode are selectively set in response to an instruction from the user. In the automatic focus mode, the state of the release button 211 is changed to the halfway pressed state to adjust imaging conditions, and is then changed to the fully pressed state to perform exposure (imaging). That is, when the release button 211 is pressed halfway, an automatic exposure (AE) function is performed to set an exposure state. Then, an auto-focus (AF) is performed to perform focusing control. When the release button 211 is fully pressed, imaging is performed.

A touch panel display 213, an arrow key 222, a MENU/OK key 224, a BACK/DISP button 225, and a finder eyepiece 242 of the OVF are provided on the rear surface of the imaging device body 200 illustrated in FIG. 2.

The touch panel display 213 includes a liquid crystal display (hereinafter, referred to as a "first display") 215 and a touch panel 216.

The first display 215 displays, for example, an image and text information. The first display 215 is used to display a live view image (through image) which is an example of a continuous frame image captured in continuous frames in the imaging mode. In addition, the first display 215 is used to display a still image which is an example of a single frame image that is captured in a single frame in a case in which an instruction to capture a still image is issued. The first display 215 is also used to display a reproduction image in the reproduction mode or to display, for example, a menu screen.

The touch panel 216 is a transmissive touch panel and is superimposed on the surface of a display region of the first display 215. The touch panel 216 detects the contact of an indicator (for example, a finger or a stylus pen). The touch panel 216 outputs detection result information indicating the detection result (indicating whether the indicator comes into contact with the touch panel 216) to a predetermined output destination (for example, a CPU 12 (see FIG. 3) which will be described below) in a predetermined cycle (for example, 100 milliseconds). In a case in which the touch panel 216 detects the contact of the indicator, the detection result information includes two-dimensional coordinates (hereinafter, referred to as "coordinates") which can specify the contact position on the indicator on the touch panel 216. In a case in which the touch panel 216 does not detect the contact of the indicator, the detection result information does not include the coordinates.

The arrow key 222 functions as a multi-function key which is used to select one or more menu items and to output various kinds of command signals, such as a zoom signal and a frame advance signal. The MENU/OK key 224 is an operation key having both the function of a menu button for issuing a command to display one or more menus on a screen of the first display 215 and the function of an OK button for issuing a command to confirm and execute the selected content. For example, the BACK/DISP button 225 is used to delete a desired target, such as a selected item, to cancel the designated content, or to return to the previous operation state.

Figure 3:
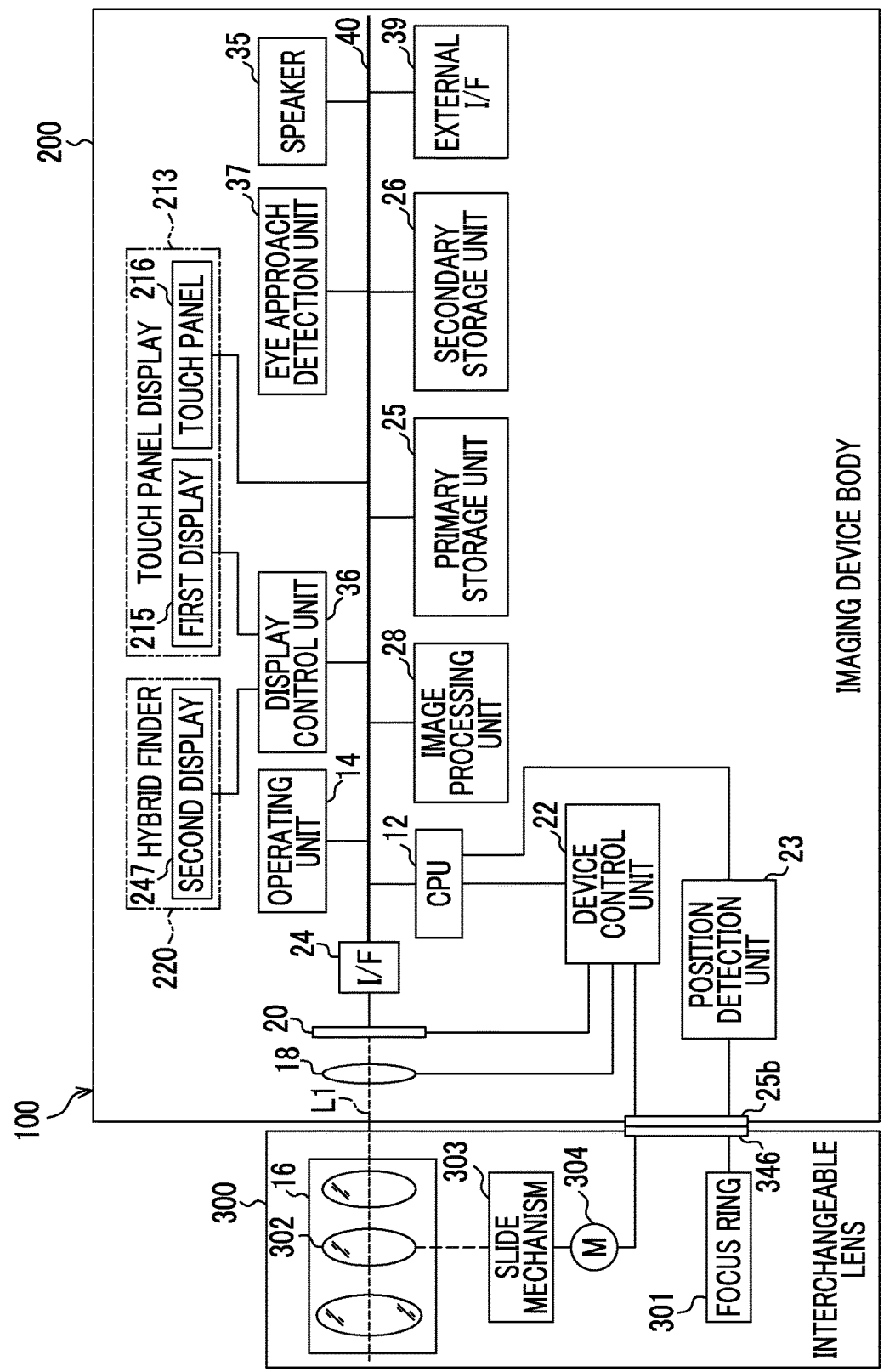
FIG. 3 is a block diagram illustrating an example of the hardware configuration of the imaging device according to the first to sixth embodiments.

FIG. 3 is an electric system block diagram illustrating an example of the hardware configuration of the imaging device 100 according to the first embodiment.

The imaging device 100 includes a mount 256 which is provided in the imaging device body 200 and a mount 346 which is provided in the interchangeable lens 300 and corresponds to the mount 256. The mount 346 is coupled to the mount 256 such that the interchangeable lens 300 is interchangeably mounted on the imaging device body 200.

The interchangeable lens 300 includes a slide mechanism 303 and a motor 304. The slide mechanism 303 moves the focus lens 302 along the optical axis L1 when the focus ring 301 is operated. The focus lens 302 is attached to the slide mechanism 303 so as to be slidable along the optical axis L1. In addition, the motor 304 is connected to the slide mechanism 303 and the slide mechanism 303 is driven by the motor 304 to slide the focus lens 302 along the optical axis L1.

The motor 304 is connected to the imaging device body 200 through the mounts 256 and 346 and the driving of the motor 304 is controlled in response to a command from the imaging device body 200. In the first embodiment, a stepping motor is applied as an example of the motor 304. The motor 304 is operated in synchronization with pulse power in response to a command from the imaging device body 200. In the example illustrated in FIG. 3, the motor 304 is provided in the interchangeable lens 300. However, the invention is not limited thereto. The motor 304 may be provided in the imaging device body 200.

The imaging device 100 is a digital camera that records captured still images and moving images. The overall operation of the camera is controlled by the central processing unit (CPU) 12. The imaging device 100 includes an operating unit 14, an interface unit 24, a primary storage unit 25, a secondary storage unit 26, a speaker 35, an eye approach detection unit 37, and an external interface (I/F) 39. In addition, the imaging device 100 includes an image processing unit 28 which is an example of a generation unit according to the invention.

The CPU 12, the operating unit 14, the interface unit 24, the primary storage unit 25, the secondary storage unit 26, the image processing unit 28, the speaker 35, the display control unit 36, the eye approach detection unit 37, the external I/F 39, and the touch panel 216 are connected to each other through a bus 40.

The primary storage unit 25 means a volatile memory and is, for example, a random access memory (RAM). The secondary storage unit 26 means a non-volatile memory and is, for example, a flash memory or a hard disk drive (HDD).

In the imaging device 100 according to the first embodiment, in the automatic focus mode, the CPU 12 controls the driving of the motor 304 such that the contrast value of a captured image is the maximum to perform focus control. In addition, in the automatic focus mode, the CPU 12 calculates AE information which is a physical amount indicating the brightness of the captured image. When the release button 211 is in the halfway pressed state, the CPU 12 calculates a shutter speed and an F number corresponding to the brightness of the image indicated by the AE information. Then, the CPU 12 controls each related unit such that the shutter speed and the F number become the calculated values to set an exposure state.

The operating unit 14 is a user interface which is operated by the operator to input various instructions to the imaging device 100. The operating unit 14 includes the release button 211, the dial 212 for selecting, for example, the imaging mode, the finder switching lever 214, the arrow key 222, the MENU/OK key 224, and the BACK/DISP button 225. Various instructions received by the operating unit 14 are output as operation signals to the CPU 12. The CPU 12 performs processes corresponding to the operation signals input from the operating unit 14.

The imaging device body 200 includes a position detection unit 23. The position detection unit 23 is connected to the CPU 12. The position detection unit 23 is connected to the focus ring 301 through the mounts 256 and 346, detects the rotation angle of the focus ring 301, and outputs rotation angle information indicating the detected rotation angle to the CPU 12. The CPU 12 performs a process corresponding to the rotation angle information input from the position detection unit 23.

When the imaging mode is set, image light indicating the object is focused on a light receiving surface of a color imaging element (for example, a CMOS sensor) 20 through the imaging lens 16 including a focus lens 302 which can be moved by a manual operation and a shutter 18. The signal charge stored in the imaging element 20 is sequentially read as a digital signal corresponding to the signal charge (voltage) under the control of a device control unit 22. The imaging element 20 has a so-called electronic shutter function and performs the electronic shutter function to control the charge storage time (shutter speed) of each photo sensor on the basis of the time based on the control of the device control unit 22. The imaging element 20 according to the first embodiment is a CMOS image sensor, but is not limited thereto. For example, the imaging element 20 may be a CCD image sensor.

Figure 4:
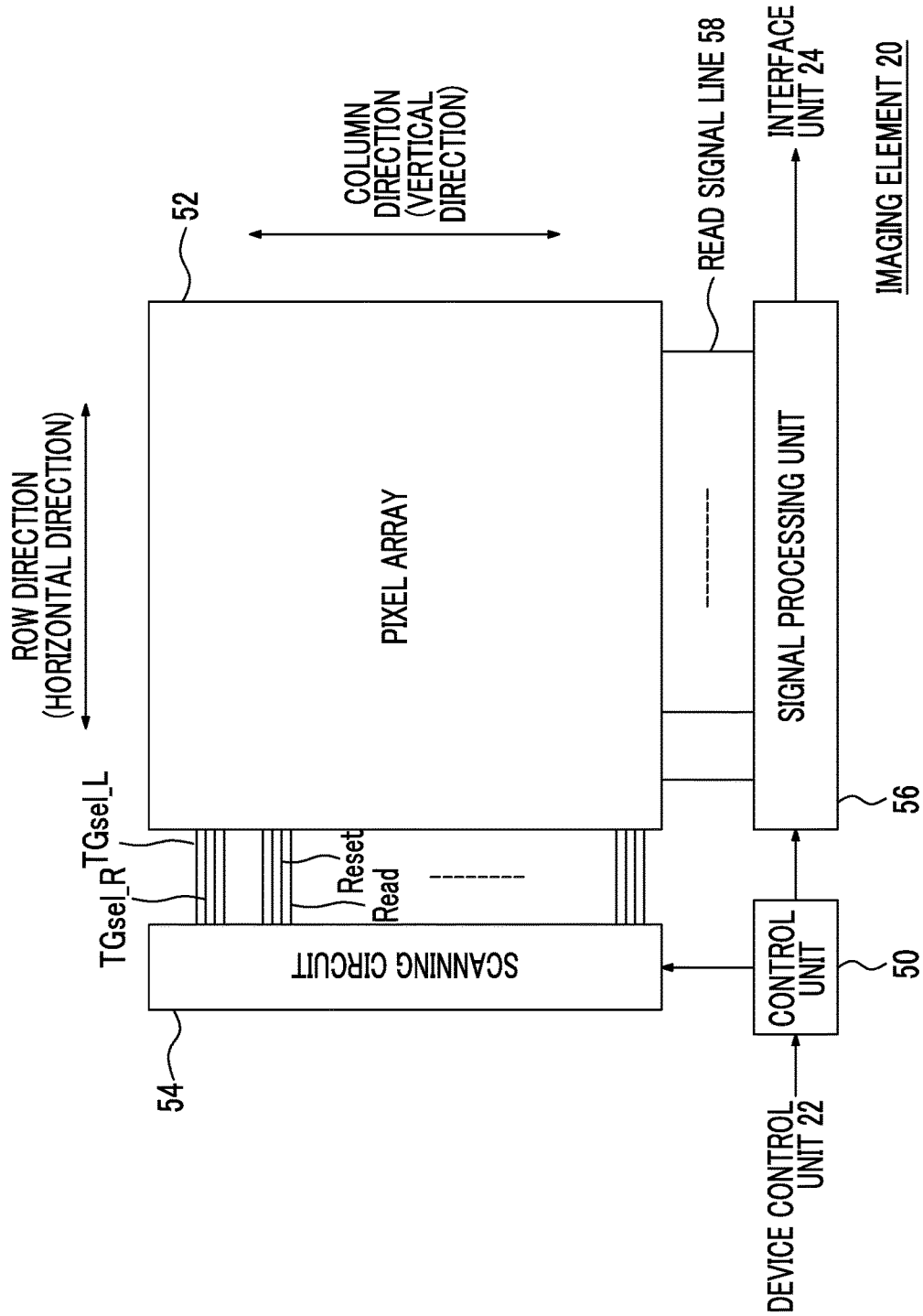
FIG. 4 is a diagram schematically illustrating an example of the structure of an imaging element according to the first to sixth embodiments.

The imaging element 20 according to the first embodiment will be described in detail. FIG. 4 is a diagram schematically illustrating an example of the structure of the imaging element 20 according to the first embodiment. For example, as illustrated in FIG. 4, the imaging element 20 according to the first embodiment includes a control unit 50, a pixel array 52, a scanning circuit 54, and a signal processing unit 56. In addition, the imaging element 20 includes microlenses 19 (see FIG. 6) and color filters 21 (see FIG. 9).

Figure 5:
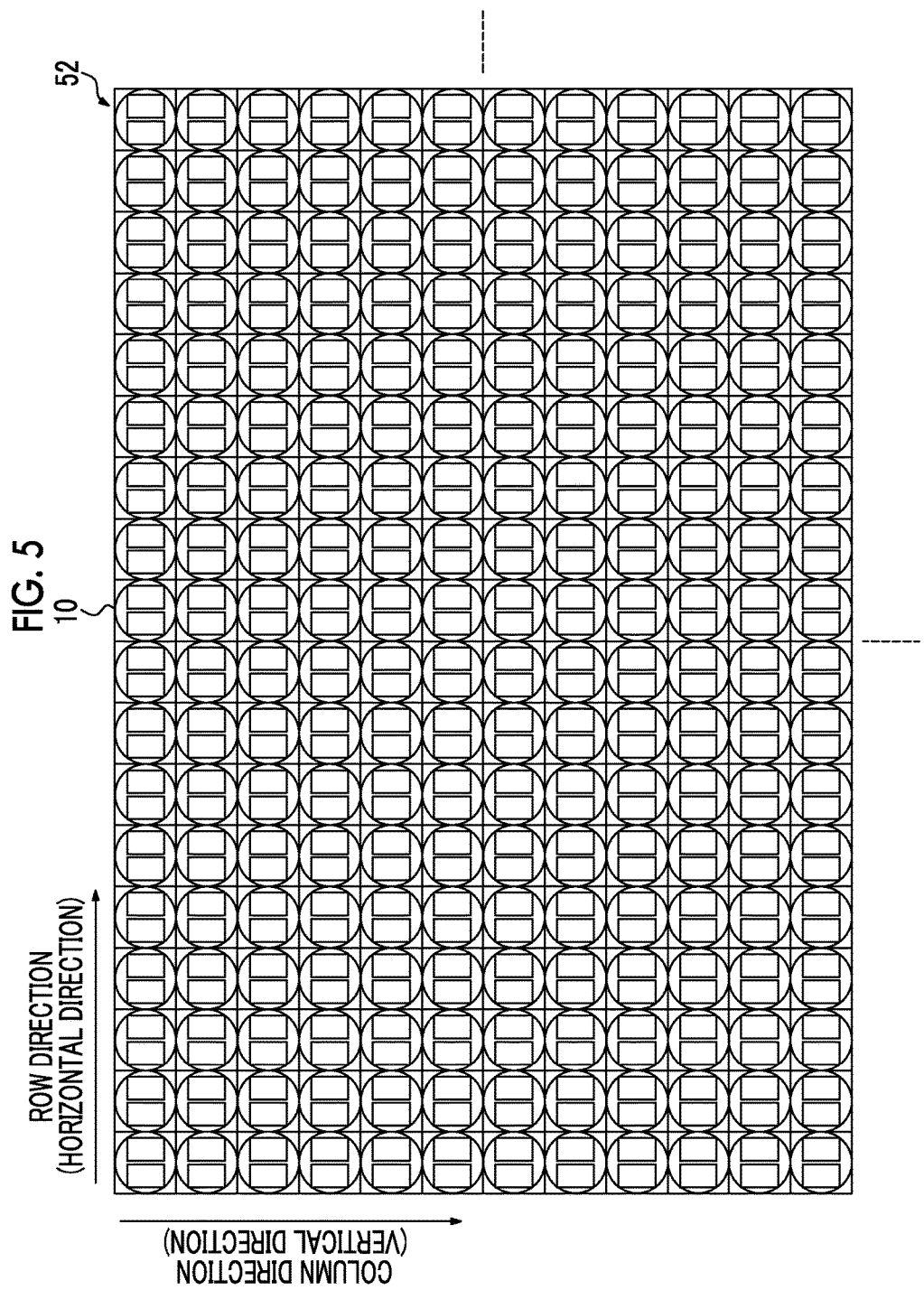
FIG. 5 is a diagram schematically illustrating an example of the arrangement of pixels in a pixel array according to the first to sixth embodiments.

FIG. 5 is a diagram schematically illustrating an example of the arrangement of pixels 10 in the pixel array 52 according to the first embodiment. As in the example illustrated in FIG. 5, in the pixel array 52, the pixels 10 are two-dimensionally arranged. In the example illustrated in FIG. 5, the imaging element 20 has, for example, "4896× 3265" pixels.

Figure 6:
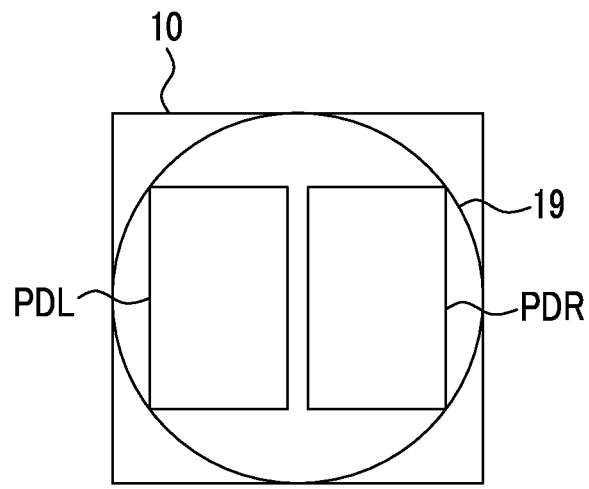
FIG. 6 is a diagram schematically illustrating an example of the structure of one pixel according to the first to sixth embodiments.

The pixel 10 forming the pixel array 52 will be described in detail. FIG. 6 is a diagram schematically illustrating an example of the structure of one pixel 10. As illustrated in FIG. 6, the pixel 10 includes a photodiode PDR and a photodiode PDL which are an example of a photo sensor. In addition, the pixel 10 is provided with the microlens 19.

Figure 7:
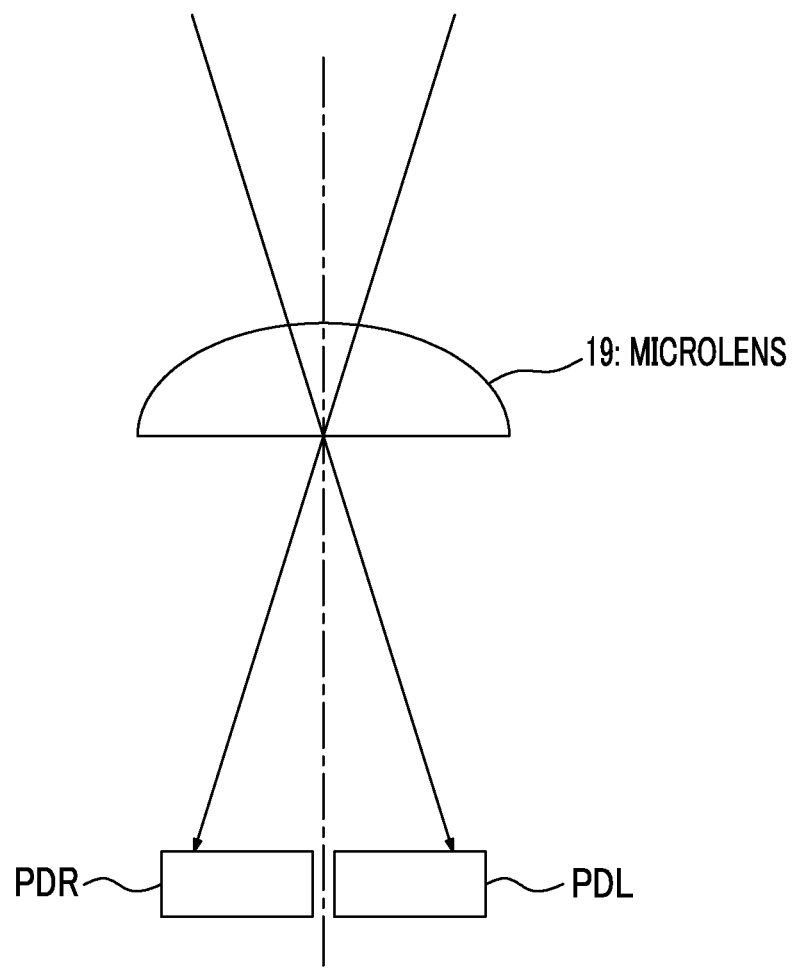
FIG. 7 is a diagram schematically illustrating an example of the structure of the pixel in the imaging element included in the imaging device according to the first to sixth embodiments.

Light which passes through the microlens 19 is converted into an electric signal by the photodiodes PDL and PDR. As illustrated in FIG. 7, for example, the photodiode PDL is provided in the right half of the light receiving surface in a row direction (on the right side in a case in which the object is viewed from the light receiving surface (in other words, on the left side in a case in which the light receiving surface is viewed from the object)). As illustrated in FIG. 7, for example, the photodiode PDL is provided in the left half of the light receiving surface in the row direction (on the left side in a case in which the object is viewed from the light receiving surface (in other words, on the right side in a case in which the light receiving surface is viewed from the object)).

A light flux which passes through the exit pupil of the imaging lens 16 is mainly divided into left region passage light and right region passage light. The left region passage light indicates the left half of the light flux which passes through the exit pupil of the imaging lens 16 and the right region passage light indicates the right half of the light flux which passes through the exit pupil of the imaging lens 16. The light flux which passes through the exit pupil of the imaging lens 16 is divided into left and right light fluxes by the microlens 19 serving as a pupil division portion. The photodiode PDL receives the left region passage light and the photodiode PDR receives the right region passage light. As a result, an object image corresponding to the left region passage light and an object image corresponding to the right region passage light are acquired as parallax images (a left eye image and a right eye image which will be described below) with parallax.

Figure 8:
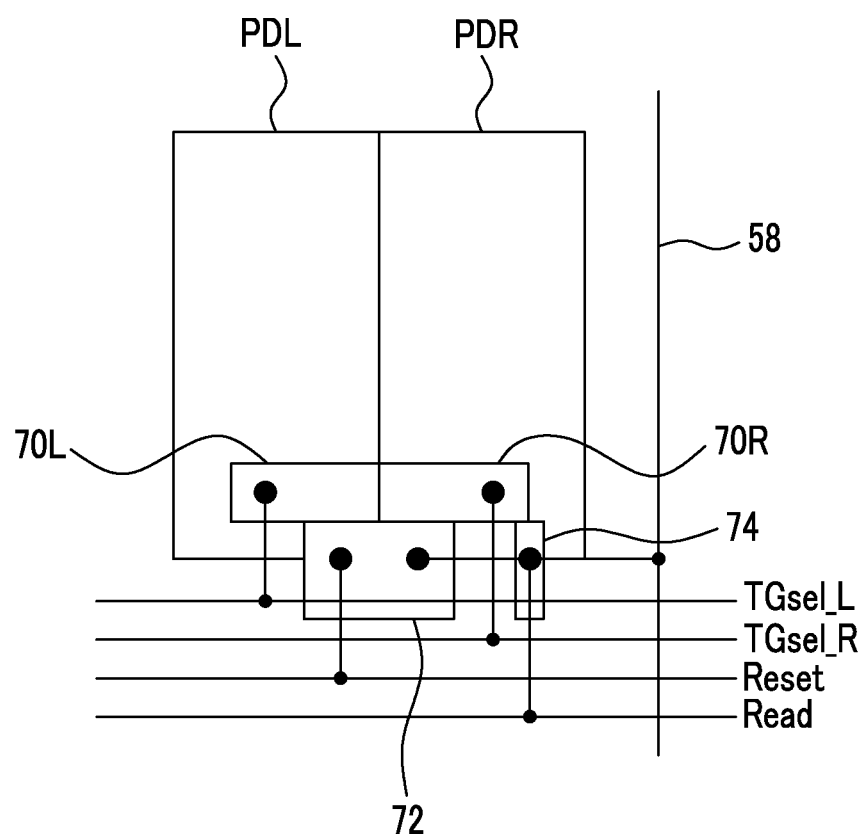
FIG. 8 is a diagram schematically illustrating an example of the electrical structure of one pixel according to the first to sixth embodiments.

FIG. 8 is a diagram schematically illustrating an example of the electrical structure of one pixel 10. As illustrated in FIG. 8, the pixel 10 includes read electrodes 70L and 70R, a floating diffusion (FD) 72, and a read switch 74.

The read electrode 70L is connected to a left phase difference pixel photodiode read selection line TGsel_L and functions as a gate electrode which collects and reads a signal charge generated in the photodiode PDL on the basis of a left selection signal that flows through the left phase difference pixel photodiode read selection line TGsel_L.

The read electrode 70R is connected to a right phase difference pixel photodiode read selection line TGsel_R and functions as a gate electrode which collects and reads a signal charge generated in the photodiode PDR on the basis of a right selection signal that flows through the right phase difference pixel photodiode read selection line TGsel_R.

The signal charges which are read by the read electrodes 70L and 70R are transmitted to the FD 72. The FD 72 has a function of temporarily storing the transmitted signal charges. The read switch 74 is connected to a read row selection line Read. The turn-on and turn-off of the read switch 74 are controlled on the basis of a read signal that flows through the read row selection line Read. In addition, the read switch 74 is connected to the FD 72. When the read switch 74 is turned on, the signal charge stored in the FD 72 is read and an electric signal (image signal), which is a digital signal corresponding to the signal charge, is output to a read signal line 58. The read electrodes 70L and 70R, the FD 72, and the read switch 74 function as an output unit according to the invention.

The FD 72 is connected to a reset row selection line Reset. The signal charge which remains in the FD 72 is discharged (reset) on the basis of a reset signal that flows through the reset row selection line Reset. In the first embodiment, an example of the reset destination of the signal charge in the FD 72 is the ground or a predetermined discharge destination (for example, a predetermined signal line).

The left phase difference pixel photodiode read selection line TGsel_L, the right phase difference pixel photodiode read selection line TGsel_R, the reset row selection line Reset, and the read row selection line Read are provided for each row of the pixels 10 in the pixel array 52 along the row direction. In the first embodiment, as illustrated in FIG. 4, the scanning circuit 54 is connected to each pixel 10 through the left phase difference pixel photodiode read selection line TGsel_L, the right phase difference pixel photodiode read selection line TGsel_R, the reset row selection line Reset, and the read row selection line Read. The scanning circuit 54 applies a left selection signal, a right selection signal, a read signal, and a reset signal with levels corresponding to the control of the control unit 50 to the left phase difference pixel photodiode read selection line TGsel_L, the right phase difference pixel photodiode read selection line TGsel_R, the reset row selection line Reset, and the read row selection line Read to control the reading of an electric signal from the pixel 10.

The read signal line 58 is provided for each column of the pixels 10 in the pixel array 52 along the column direction. In the first embodiment, as illustrated in FIG. 5, the signal processing unit 56 is connected to each pixel 10 through the read signal lines 58. The electric signals which are output from each pixel 10 to the signal processing unit 56 through the read signal lines 58 are temporarily stored (overwritten and saved) for each frame in the primary storage unit 25 through the interface unit 24.

The control unit 50 has a function of controlling the entire imaging element 20 under the control of the device control unit 22. That is, the control unit 50 has a function of controlling the scanning circuit 54 and the signal processing unit 56 to control the reading of the signal charge from the pixel 10. The device control unit 22 and the control unit 50 function as a control unit according to the invention.

The following three reading methods are given as examples of a method for reading the signal charge from each pixel 10 in the imaging element 20 according to the first embodiment.

A first reading method is a method which reads the signal charge generated in the photodiode PDL. A left selection signal with a level corresponding to an on state is applied to the left phase difference pixel photodiode read selection line TGsel_L and a right selection signal with a level corresponding to an off state is applied to the right phase difference pixel photodiode read selection line TGsel_R to transmit the signal charge from the read electrode 70L to the FD 72. In addition, a read signal, which is an on signal, is applied to the read row selection line Read to turn on the read switch 74. Then, an electric signal is output from the FD 72 to the read signal line 58. In this way, an electric signal corresponding to the signal charge which is generated in the photodiode PDL is output to the read signal line 58. Hereinafter, a RAW image based on the electric signal which is output according to the signal charge generated in the photodiode PDL is referred to as a "left eye image". In the imaging element 20 according to the first embodiment, during the reading process, the signal charge generated in the photodiode PDR is not output to the read signal line 58 and is reset through the FD 72 at a predetermined time corresponding to the reset signal that flows through the reset row selection line Reset. Therefore, according to the first reading method, the pixel 10 functions as a phase difference pixel (hereinafter, referred to as a "left phase difference pixel") for generating the left eye image.

Hereinafter, a signal with a level corresponding to the on state of the left selection signal, the right selection signal, the read signal, and the reset signal is referred to as an "on signal". In addition, a signal with a level corresponding to the off state of the left selection signal, the right selection signal, the read signal, and the reset signal is referred to as an "off signal".

A second reading method is a method which reads the signal charge generated in the photodiode PDR. The on signal is applied to the right phase difference pixel photodiode read selection line TGsel_R and the off signal is applied to the left phase difference pixel photodiode read selection line TGsel_L to transmit the signal charge from the read electrode 70R to the FD 72. The on signal is applied to the read row selection line Read to turn on the read switch 74. Then, an electric signal is output from the FD 72 to the read signal line 58. In this way, an electric signal corresponding to the signal charge which is generated in the photodiode PDR is output to the read signal line 58. Hereinafter, a RAW image based on the electric signal which is output according to the signal charge generated in the photodiode PDR is referred to as a "right eye image". In the imaging element 20 according to the first embodiment, during the reading process, the signal charge generated in the photodiode PDL is not output to the read signal line 58 and is reset through the FD 72 at a predetermined time corresponding to the reset signal that flows through the reset row selection line Reset. Therefore, according to the second reading method, the pixel 10 functions as a phase difference pixel (hereinafter, referred to as a "right phase difference pixel") for generating the right eye image. The electric signals corresponding to the signal charges which are generated in the photodiodes PDL and PDR are an example of a first image signal and a second image signal according to the invention.

A third reading method is a method which reads the signal charges generated in the photodiodes PDL and PDR. The on signal is applied to the left phase difference pixel photodiode read selection line TGsel_L and the right phase difference pixel photodiode read selection line TGsel_R to transmit the signal charges from the read electrodes 70L and 70R to the FD 72. The signal charges transmitted from the read electrodes 70L and 70R are added and stored in the FD 72. In addition, the on signal is applied to the read row selection line Read to turn on the read switch 74. Then, an electric signal is output from the FD 72 to the read signal line 58. In this way, an electric signal corresponding to the sum of the signal charges generated in the photodiodes PDL and PDR is output to the read signal line 58. Hereinafter, a RAW image based on the electric signal which is output according to the sum of the signal charges generated in the photodiodes PDL and PDR is referred to as a "normal image". Therefore, according to the third reading method, the pixel 10 functions as a pixel (hereinafter, referred to as a "normal pixel") other than the phase difference pixel. The electric signal which is output according to the sum of the signal charges generated in the photodiodes PDL and PDR is an example of a third image signal according to the invention.

Hereinafter, in a case in which the left eye image, the right eye image, and the normal image which are obtained at the same imaging time do not need to be distinguished from each other, they are referred to as "frames". In addition, in a case in which the right phase difference pixel and the left phase difference pixel do not need to be distinguished from each other, they are referred to as "phase difference pixels". Similarly, hereinafter, in a case in which the left eye image and the right eye image do not need to be distinguished from each other, they are referred to as "phase difference images".

Figure 9:
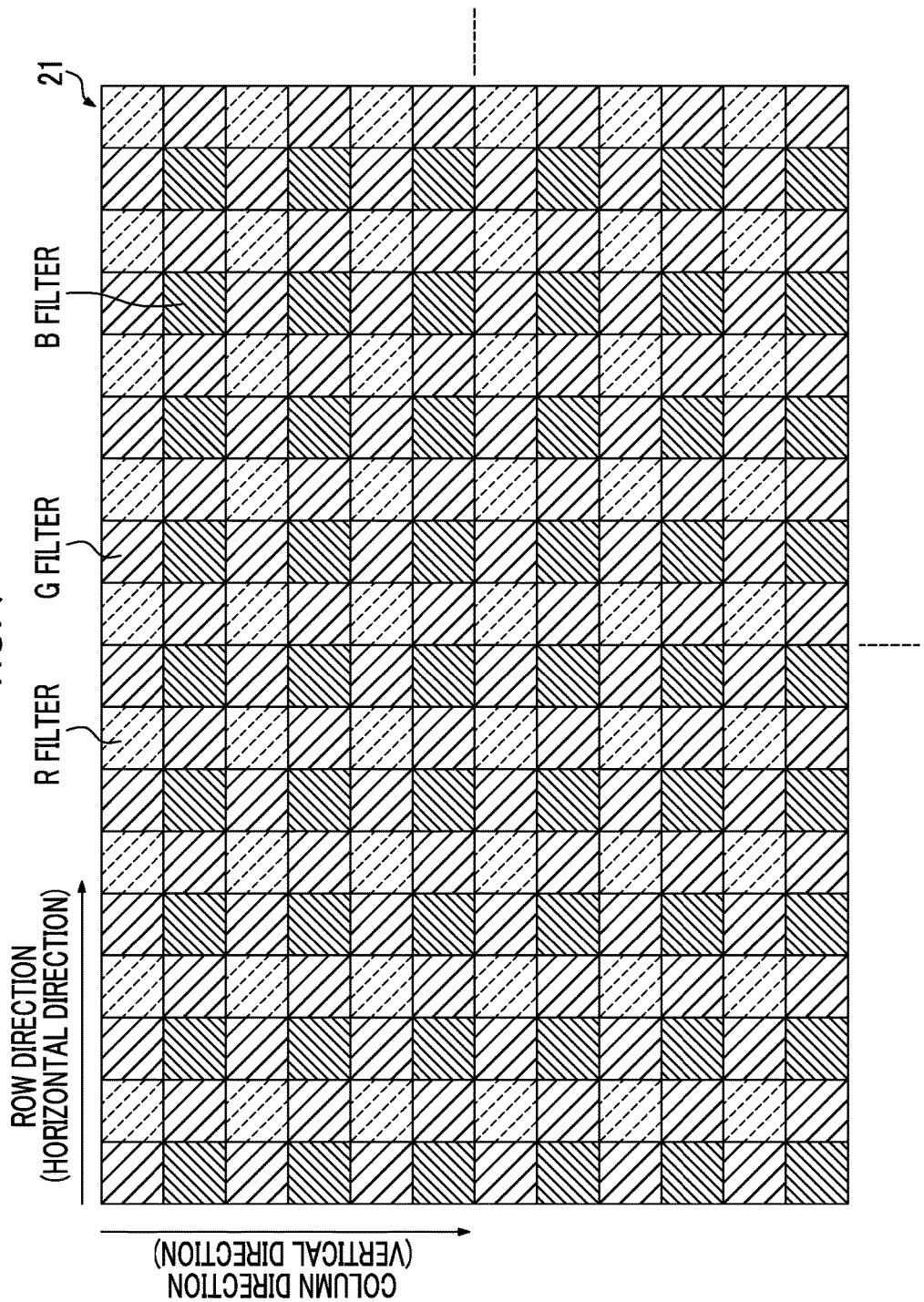
FIG. 9 is a diagram schematically illustrating an example of the structure of color filters provided in the imaging element included in the imaging device according to the first to sixth embodiments.

For example, the imaging element 20 includes the color filter 21 illustrated in FIG. 9. The color filter 21 includes a G filter corresponding to green (G) which most contributes to obtaining a brightness signal, an R filter corresponding to red (R), and a B filter corresponding to blue (B). Any one of the "R", "G", and "B" filters included in the color filter 21 is allocated to each pixel 10 of the imaging element 20.

In the color filter 21, the G filter, the R filter, and the B filter are arranged for each of the pixels 10 in the pixel array 52 illustrated in FIG. 5 so as to have predetermined periodicity in the row direction (horizontal direction) and the column direction (vertical direction). Specifically, the color filter 21 has a color array that is called a Bayer array in which the number of G filters is twice as many as the number of R filters or the number of B filters. Therefore, when performing a synchronization (interpolation) process for R, G, and B signals, the imaging device 100 can perform the process according to a repetitive pattern. The synchronization process is a process which calculates the information of all colors for each pixel from a mosaic image corresponding to a color filter array of a single-plate color imaging element. For example, in the case of an imaging element including three color filters, that is, R, G, and B filters, the synchronization process means a process which calculates the color information of all of R, G, and B for each pixel from a mosaic image including R, and B.

Returning to FIG. 3, the imaging element 20 outputs the left eye image (a digital signal indicating a pixel value) from the left phase difference pixels and outputs the right eye image (a digital signal indicating a pixel value) from the right phase difference pixels. The imaging element 20 outputs the normal image (a digital signal indicating a pixel value) from the normal pixels. The normal image which is output from the normal pixels is a chromatic color image and is, for example, a color image having the same color array as the array of the normal pixels. The frame which is output from the imaging element 20 is temporarily stored (overwritten and saved) in a RAW image storage area (not illustrated) of the primary storage unit 25 through the interface unit 24.

The image processing unit 28 performs various kinds of image processing for the frame stored in the primary storage unit 25. The image processing unit 28 is implemented by, for example, an application specific integrated circuit (ASIC) which is an integrated circuit obtained by integrating circuits for implementing a plurality of functions related to image processing. However, the hardware configuration of the image processing unit 28 is not limited thereto. For example, the image processing unit 28 may be a programmable logic device or may have other hardware configurations such as a computer including a CPU, a ROM, and a RAM.

The encoder 34 converts an input signal into a signal of another format and outputs the converted signals. The hybrid finder 220 includes a liquid crystal display (hereinafter, referred to as a "second display") 247 which displays an electronic image.

The display control unit 36 is connected to the first display 215 and the second display 247. The display control unit 36 selectively controls the first display 215 and the second display 247 such that the first display 215 and the second display 247 selectively display images, in response to an instruction from the CPU 12. Hereinafter, in a case in which the first display 215 and the second display 247 do not need to be distinguished from each other, they are referred to as "display devices".

The imaging device 100 according to the first embodiment is configured such that the operation mode can be switched between the manual focus mode and the automatic focus mode by the dial 212 (focus mode switching unit). When one of the focus modes is selected, the display control unit 36 directs the display device to display a live view image with which a split image is combined. In addition, when the automatic focus mode is selected by the dial 212, the CPU 12 operates as a phase difference detection unit and an automatic focusing unit. The phase difference detection unit detects a phase difference between the first image output from a first pixel group and the second image output from a second pixel group. The automatic focusing unit controls the motor 304 through the mounts 256 and 346 on the basis of the detected phase difference such that the focus lens 302 is moved to an in-focus position and the amount of defocus of the focus lens 302 is zero, in response to an instruction from the device control unit 22. The "amount of defocus" means, for example, the amount of phase shift between the first image and the second image.

The eye approach detection unit 37 detects whether the user (for example, a photographer) looks through the finder eyepiece 242 and outputs the detection result to the CPU 12. Therefore, the CPU 12 can check whether the finder eyepiece 242 is used on the basis of the detection result of the eye approach detection unit 37.

The external I/F 39 is connected to a communication network, such as a local area network (LAN) or the Internet, and transmits and receives various kinds of information between an external apparatus (for example, a printer) and the CPU 12 through the communication network. Therefore, when a printer is connected as the external apparatus, the imaging device 100 can output a captured still image to the printer such that the still image is printed by the printer. When a display is connected as the external apparatus, the imaging device 100 can output the captured still image or live view image to the display such that the display displays the image.

Figure 10:
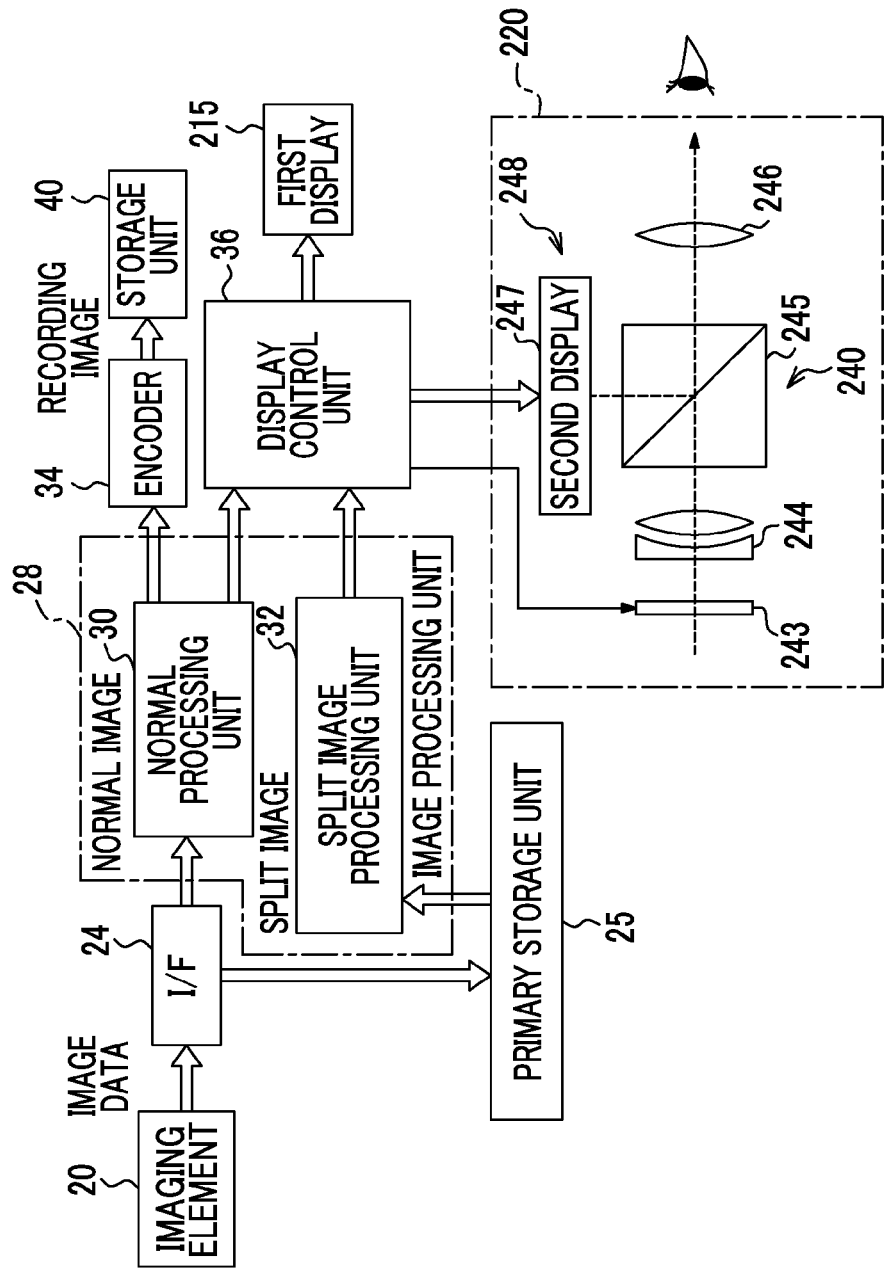
FIG. 10 is a block diagram illustrating an example of the functions of a main portion of the imaging device according to the first to sixth embodiments.

FIG. 10 is a functional block diagram illustrating the functions of a main portion of the imaging device 100 according to the first embodiment. The same components as those in the block diagram illustrated in FIG. 3 are denoted by the same reference numerals.

A normal processing unit 30 and a split image processing unit 32 each include a WB gain unit, a gamma correction unit, and a synchronization processing unit (not illustrated) and sequentially perform signal processing on the original digital signal (RAW image) which is temporarily stored in the primary storage unit 25. That is, the WB gain unit adjusts the gain of the R, G, and B signals to perform white balance correction (WB). The gamma correction unit performs gamma correction on the R, G, and B signals whose white balance has been corrected by the WB gain unit. The synchronization processing unit performs a color interpolation process corresponding to the array of the color filters in the imaging element 20 to generate R, G, and B signals which are synchronized with each other. Whenever the imaging element 20 acquires a RAW image corresponding to one screen, the normal processing unit 30 and the split image processing unit 32 perform image processing on the RAW image in parallel.

In a case in which R, G, and B RAW images are input from the interface unit 24 and a live view image is displayed, the normal processing unit 30 interpolates the pixel 10 which functions as the normal pixel, using neighboring pixels (for example, adjacent G pixels) of the same color among the pixels which function as the phase difference pixels, to generate a chromatic normal pixel.

In addition, the normal processing unit 30 outputs the image data of the generated normal image for recording to the encoder 34. The R, G, and B signals processed by the normal processing unit 30 are converted (encoded) into signals for recording by the encoder 34 and are recorded in a recording unit 41. The normal image for display which has been processed by the normal processing unit 30 is output to the display control unit 36. Hereinafter, for convenience of explanation, in a case in which the "normal image for recording" and the "normal image for display" do not need to be distinguished from each other, they are referred to as "normal images" without the words "for recording" and "for display". The normal image for display is an example of a second display image according to the invention.

The split image processing unit 32 extracts a phase difference image of the pixels 10 which function as the phase difference pixels from the RAW image which is temporarily stored in the primary storage unit 25 and generates a chromatic split image.

Figure 11:
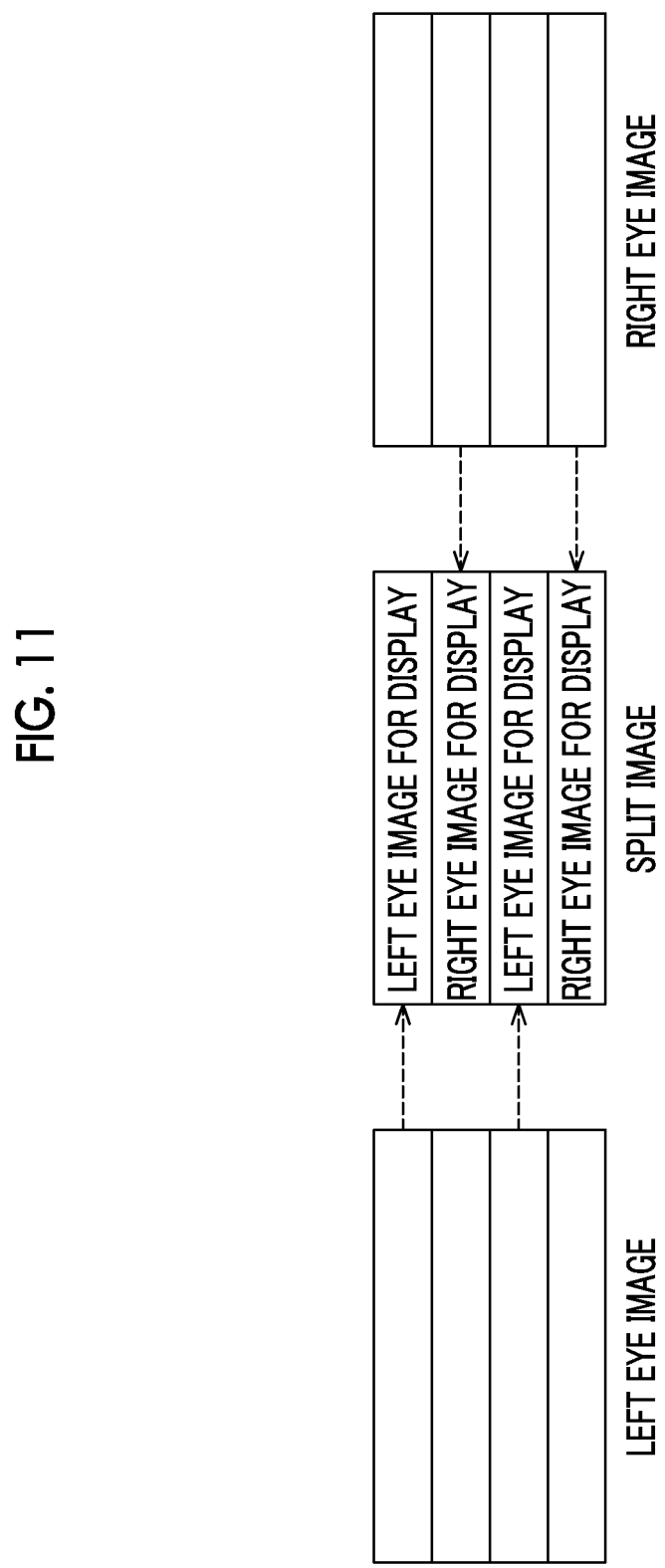
FIG. 11 is a diagram schematically illustrating a method for generating a split image which is generated by an image processing unit included in the imaging device according to the first to sixth embodiments.

For example, as illustrated in FIG. 11, in the split image, the left eye images for display and the right eye images for display are arranged so as to be adjacent to each other in a predetermined direction (here, for example, a direction perpendicular to a parallax generation direction). The left eye images for display indicate some (the first and third divided images in a front view in the example illustrated in FIG. 11) of four divided images obtained by dividing the left eye image into four images in a predetermined direction. The right eye images for display indicate divided images (the second and fourth divided images in a front view in the example illustrated in FIG. 11) which extracted from four divided images obtained by dividing the right eye image into four images in a predetermined direction and correspond to divided regions adjacent to the divided regions corresponding to the left eye images for display. The split image is an example of a first display image according to the invention.

Figure 12:
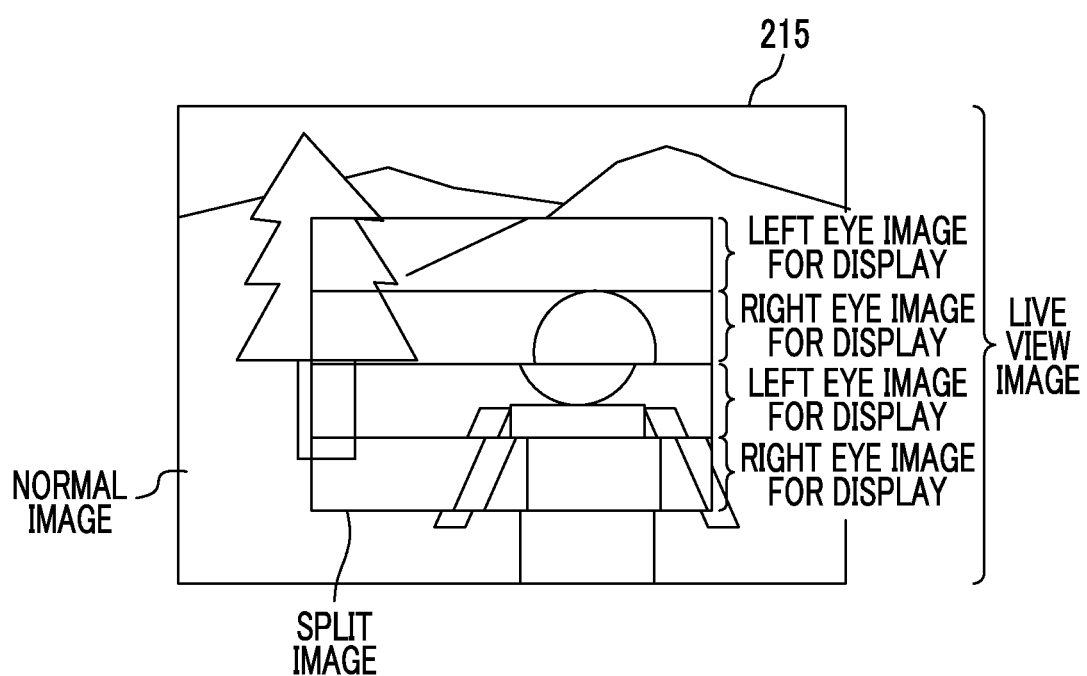
FIG. 12 is a screen view illustrating an example of a live view image including a split image and a normal image which is displayed on a first display included in the imaging device according to the first to sixth embodiments.

For example, as illustrated in FIG. 12, the split image is displayed in a rectangular frame which is disposed at the center of the screen of the display device and the normal image is displayed in a peripheral region of the split image. FIG. 12 illustrates an example of the split image in which two right eye images for display and two left eye images for display are alternately arranged in a predetermined direction. The left eye image for display and the right eye image for display included in the split image deviate from each other in the direction in which parallax is generated according to a focus state. FIG. 11 illustrates a state in which a peripheral region (for example, a tree) of a person is in focus and the person is out of focus. Hereinafter, for convenience of explanation, in a case in which the left eye image for display and the right eye image for display do not need to be distinguished from each other, they are referred to as "parallax images for display".

In the first embodiment, the split image is inserted, instead of a portion of the normal image, and is combined with the normal image. However, the invention is not limited thereto. For example, a combination method which superimposes the split image on the normal image may be used. When the split image is superimposed, a combination method may be used which appropriately adjusts the transmissivities of the split image and a portion of the normal image on which the split image is superimposed. In this case, a live view image indicating object images which are continuously captured is displayed on the screen of the display device. The displayed live view image is an image in which the split image is displayed in the display region of the normal image.

For example, as illustrated in FIG. 10, the hybrid finder 220 includes the OVF 240 and the EVF 248. The OVF 240 is an inverted Galilean finder including an objective lens 244 and an eyepiece lens 246. The EVF 248 includes the second display 247, a prism 245, and the eyepiece lens 246.

A liquid crystal shutter 243 is provided in front of the objective lens 244. The liquid crystal shutter 243 shields light such that no optical image is incident on the objective lens 244 when the EVF 248 is used.

The prism 245 reflects an electronic image or various kinds of information displayed on the second display 247 to the eyepiece lens 246 and combines the optical image and information (the electronic image or various kinds of information) displayed on the second display 247.

Whenever the finder switching lever 214 is rotated in the direction of the arrow SW illustrated in FIG. 1, the operation mode is alternately switched between an OVF mode in which an optical image can be viewed through the OVF 240 and an EVF mode in which an electronic image can be viewed through the EVF 248.

In the OVF mode, the display control unit 36 performs control such that the liquid crystal shutter 243 does not shield light and an optical image can be viewed through the finder eyepiece. In addition, the display control unit 36 directs the second display 247 to display only the split image. Therefore, it is possible to display a finder image in which the split image is superimposed on a portion of the optical image.

In contrast, in the EVF mode, the display control unit 36 performs control such that the liquid crystal shutter 243 shields light and only the electronic image displayed on the second display 247 can be viewed through the finder eyepiece. In addition, the same image data as that, with which the split image output to the first display 215 is combined, is input to the second display 247. Therefore, the second display 247 can display an electronic image in which the split image is combined with a portion of the normal image, similarly to the first display 215.

Figure 13:
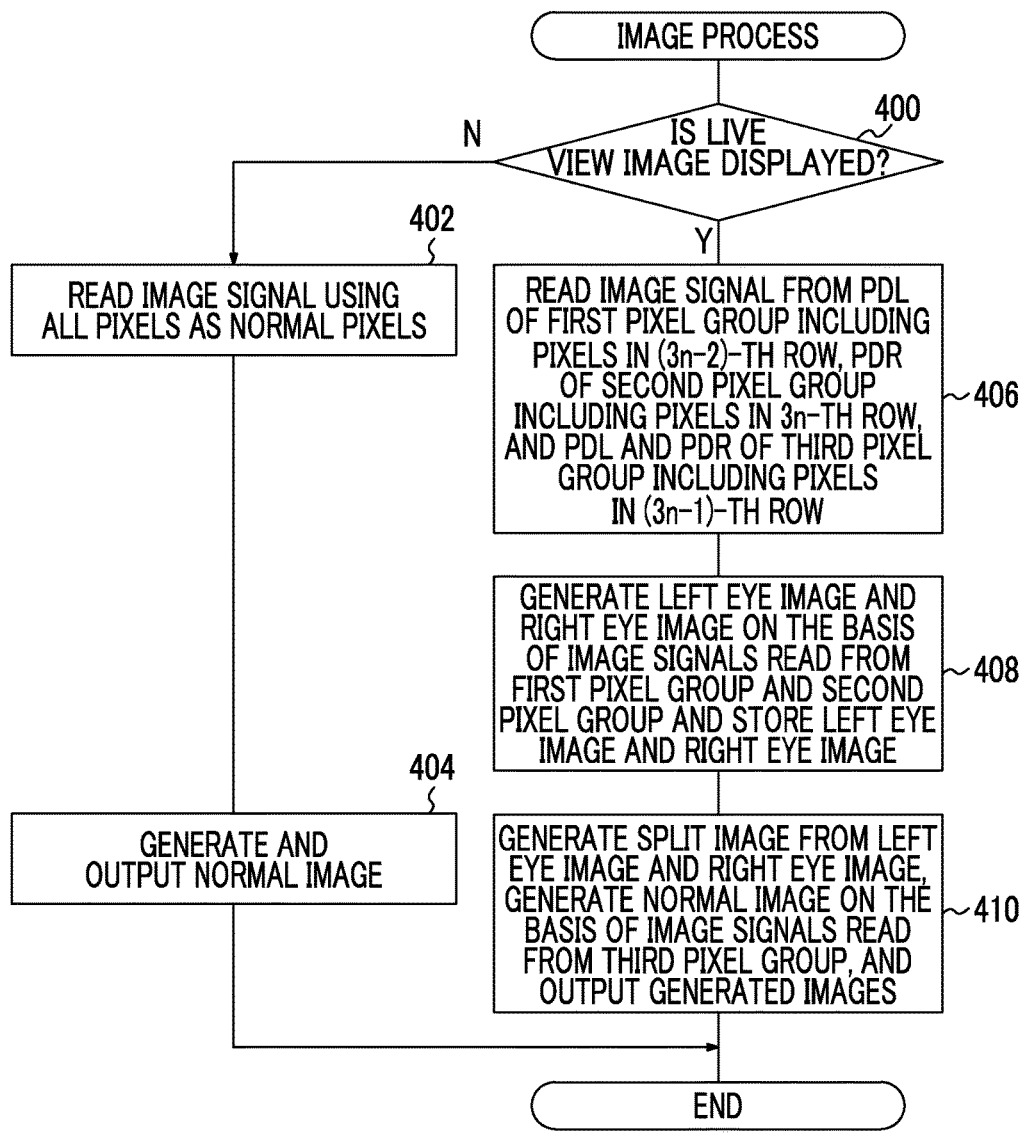
FIG. 13 is a flowchart illustrating an example of the flow of image processing according to the first embodiment.

Next, the operation of the imaging device 100 according to the first embodiment will be described. Image processing performed by the imaging device 100 will be described with reference to FIG. 13. The image processing illustrated in FIG. 13 includes a signal reading process which reads a signal charge (electric signal) from each pixel of the imaging element 20 and an image generation process which generates a normal image and a split image on the basis of the read electric signals. The image processing illustrated in FIG. 13 is performed in the manual focus mode. The signal reading process is performed by the device control unit 22 and the control unit 50 on the basis of the control of the device control unit 22. The image generation process is performed by the image processing unit 28.

In the image processing illustrated in FIG. 13, first, in Step 400, the device control unit 22 determines whether to display a live view image. In the first embodiment, for example, in case of an imaging process after focus adjustment and in a case in which the user instructs or sets the non-display of a live view image, the determination result is "No" and the process proceeds to Step 402.

In Step 402, an image signal is read using all of the pixels 10 as the normal pixels. In this step, the device control unit 22 outputs a control signal for reading the image signal using all of the pixels 10 as the normal pixels to the control unit 50. The control unit 50 sequentially outputs the left selection signal and the right selection signal to the left phase difference pixel photodiode read selection lines TGsel_L and the right phase difference pixel photodiode read selection lines TGsel_R through the scanning circuit 54 such that the read electrodes 70L and 70R of all of the pixels 10 are turned on, respectively. In addition, the control unit 50 sequentially outputs the read signals to the read row selection lines Read through the scanning circuit 54 such that the read switches 74 of all of the pixels 10 are turned on. In each pixel row, the signal charges generated in the photodiodes PDL and PDR in each pixel 10 are transmitted to the FD 72 by the left selection signal, the right selection signal, and the read signal and are then output from the FD 72 to the read signal line 58.

In Step 404, the image processing unit 28 generates a normal image on the basis of the signal charges read by the normal processing unit 30 and outputs the normal image to at least a predetermined one of the display control unit 36 and the encoder 34. Then, the image processing unit 28 ends the image processing.

On the other hand, in a case in which the user instructs or sets the display of a live view image in Step 400, the determination result is "Yes" and the process proceeds to Step 406. The device control unit 22 outputs a control signal for reading an image signal for generating a split image and a normal image used to display the live view image to the control unit 50.

In Step 406, the control unit 50 reads an electric signal (image signal) corresponding to the signal charges generated in the photodiodes PDL of a first pixel group including the pixels 10 in a (3n−2)-th (n is a natural number equal to or greater than 1) row. In addition, the control unit 50 reads an electric signal (image signal) corresponding to the signal charges generated in the photodiodes PDR of the second pixel group including the pixels 10 in a 3n-th row. The control unit 50 reads an electric signal (image signal) corresponding to the signal charges generated in the photodiodes PDL and PDR of a third pixel group including the pixels 10 in a (3n−1)-th row.

In the imaging element 20 according to the first embodiment, since the left phase difference pixel photodiode read selection line TGsel_L, the right phase difference pixel photodiode read selection line TGsel_R, the read row selection line Read, and the reset row selection line Reset are provided for each row of the pixels 10, the control unit 50 selects any one of the first pixel group, the second pixel group, and the third pixel group in units of pixel rows.

Figure 14:
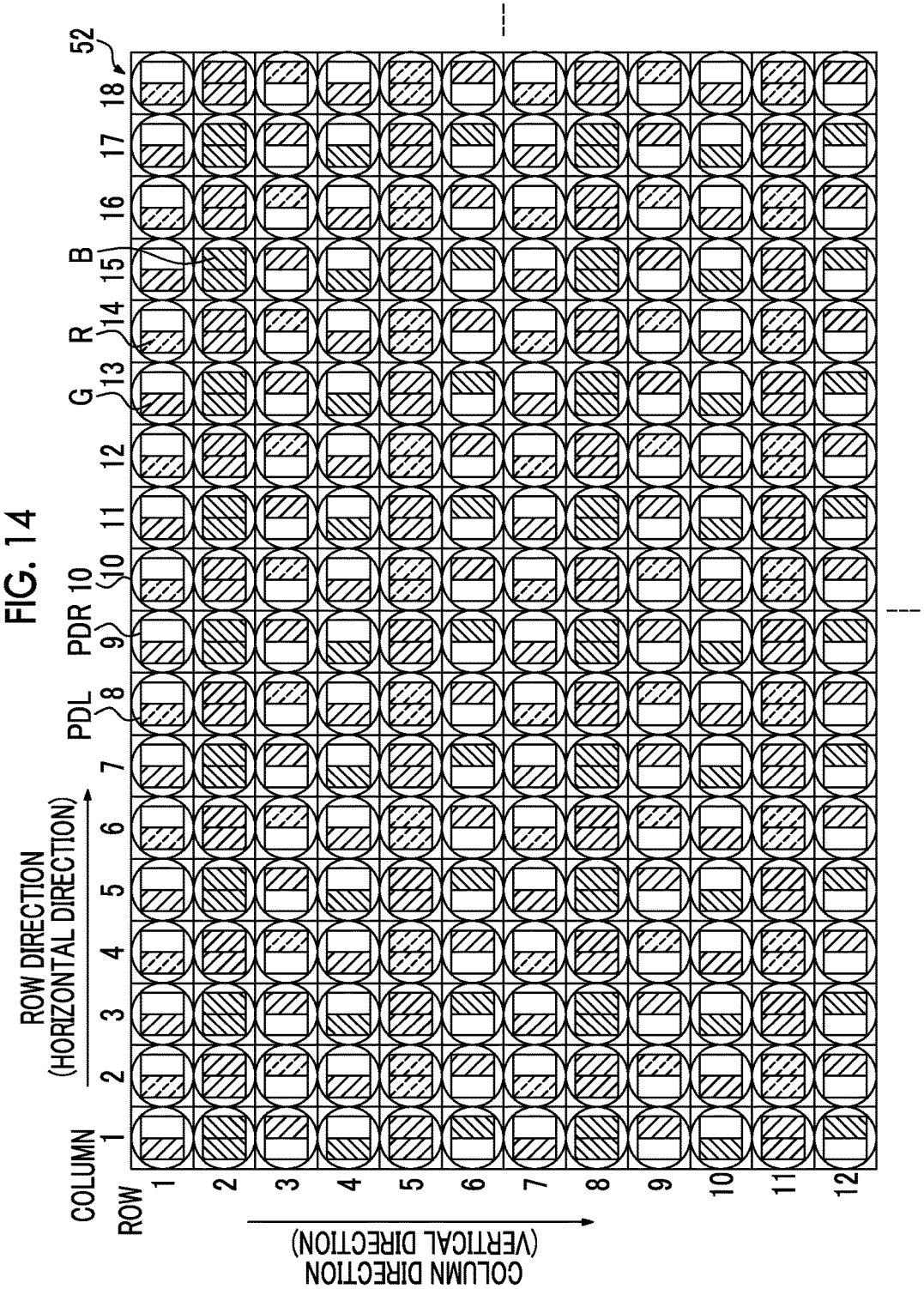
FIG. 14 is a diagram schematically illustrating an example of the arrangement of the pixels which function as phase difference pixels and normal pixels in the imaging element included in the imaging device according to the first embodiment and an example of the arrangement of the color filters allocated to each pixel.

In the first embodiment, for example, the control unit 50 selects the pixels 10, which function as left phase difference pixels, as the first pixel group. FIG. 14 is a diagram schematically illustrating an example of the arrangement of the pixels 10 which function as the phase difference pixels and the normal pixels in the imaging element 20 included in the imaging device 100 according to the first embodiment and an example of the arrangement of the color filters allocated to each pixel 10. In the first embodiment, for example, as illustrated in FIG. 14, the pixels 10 in the (3n−2)-th (1, 4, 7, 10, . . . ) row are selected as the first pixel group. In FIG. 14 and FIGS. 15 to 17 which are used in the following description, for convenience of explanation, the photodiodes PDL and PDR of each pixel 10 are drawn by oblique lines indicating the colors of the color filters 21 corresponding to each pixel 10. In addition, in the pixel 10 which functions as the left phase difference pixel, only the photodiode PDL is drawn by oblique lines indicating the color of the color filter 21. In the pixel 10 which functions as the right phase difference pixel, only the photodiode PDR is drawn by oblique lines indicating the color of the color filter 21.

Figure 15:
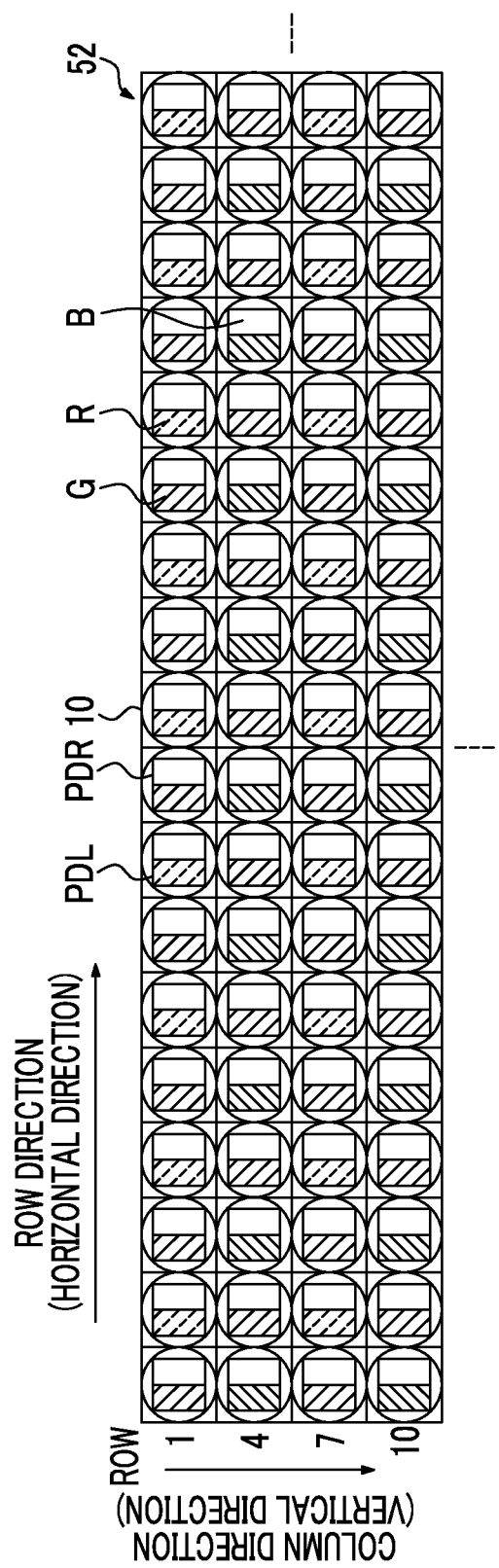
FIG. 15 is a diagram schematically illustrating an example of the arrangement of the pixels which are selected as a first pixel group in the imaging element included in the imaging device according to the first embodiment and an example of the arrangement of the color filters allocated to each pixel.

Specifically, the control unit 50 sequentially outputs the on signal to the (3n−2)-th (1, 4, 7, 10, . . . ) left phase difference pixel photodiode read selection line TGsel_L through the scanning circuit 54 such that the signal charge generated in the photodiode PDL is transmitted from the read electrode 70L to the FD 72. At that time, the control unit 50 sequentially outputs the off signal to the (3n−2)-th right phase difference pixel photodiode read selection line TGsel_R through the scanning circuit 54. Therefore, the signal charge generated in the photodiode PDR is not read. The control unit 50 sequentially outputs the on signal to the (3n−2)-th read row selection line Read through the scanning circuit 54 to turn on the read switches 74. Therefore, an electric signal corresponding to the signal charge read from the FD 72 is output to the read signal line 58. FIG. 15 illustrates the pixels 10 which are selected and extracted as the first pixel group by the control unit 50. As illustrated in FIG. 15, the color filters corresponding to the pixels 10 which are selected as the first pixel group are arranged in a Bayer array, similarly to the color filters 21.

The control unit 50 selects the pixels 10 which function as the right phase difference pixels as the second pixel group. In the first embodiment, for example, as illustrated in FIG. 14, the pixels 10 in a 3n-th (3, 6, 9, 12, . . . ) row are selected as the second pixel group.

Figure 16:
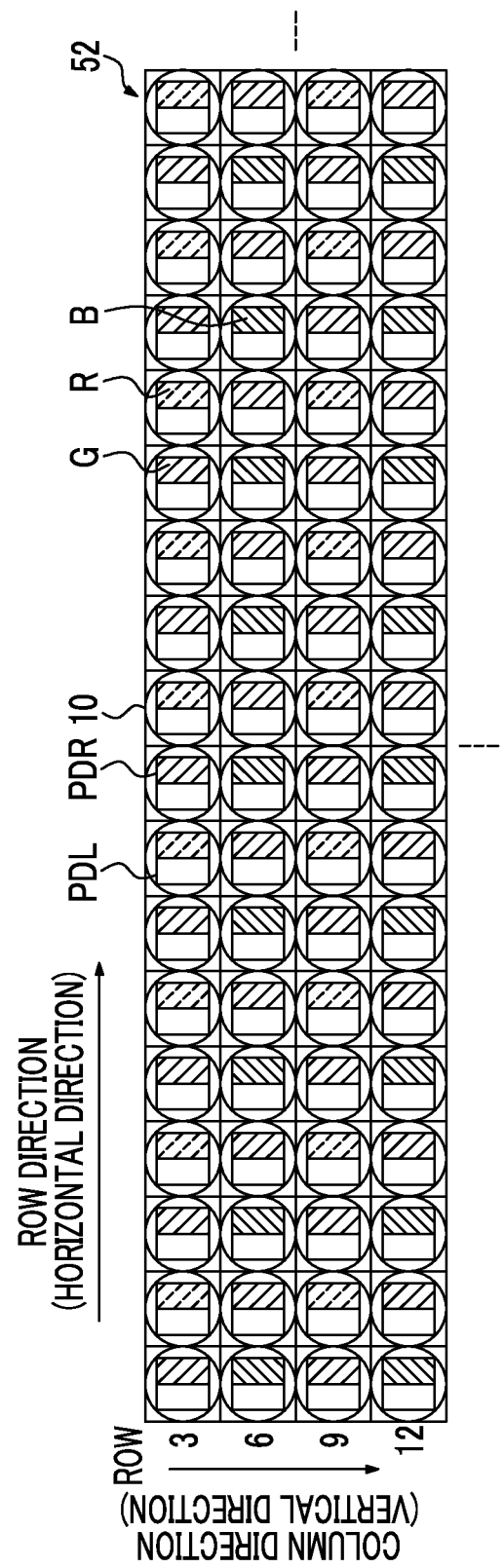
FIG. 16 is a diagram schematically illustrating an example of the arrangement of the pixels which are selected as a second pixel group in the imaging element included in the imaging device according to the first embodiment and an example of the arrangement of the color filters allocated to each pixel.

Specifically, the control unit 50 sequentially outputs the on signal to the 3n-th (3, 6, 9, 12, . . . ) right phase difference pixel photodiode read selection line TGsel_R through the scanning circuit 54 such that the signal charge generated in the photodiode PDR is transmitted from the read electrode 70R to the FD 72. At that time, the control unit 50 sequentially outputs the off signal to the 3n-th left phase difference pixel photodiode read selection line TGsel_L through the scanning circuit 54. Therefore, the signal charge generated in the photodiode PDL is not read. In addition, the control unit 50 sequentially outputs the on signal to the 3n-th read row selection line Read through the scanning circuit 54 to turn on the read switches 74. Therefore, an electric signal corresponding to the signal charge read from the FD 72 is output to the read signal line 58. FIG. 16 illustrates the pixels 10 which are selected and extracted as the second pixel group by the control unit 50. As illustrated in FIG. 16, the color filters corresponding to the pixels 10 which are selected as the second pixel group are arranged in a Bayer array, similarly to the color filters 21.

The control unit 50 selects a plurality of pixels 10 which function as the normal pixels as the third pixel group. In the first embodiment, for example, as illustrated in FIG. 14, the pixels 10 in a (3n−1)-th (2, 5, 8, 11, . . . ) row are selected as the third pixel group.

Figure 17:
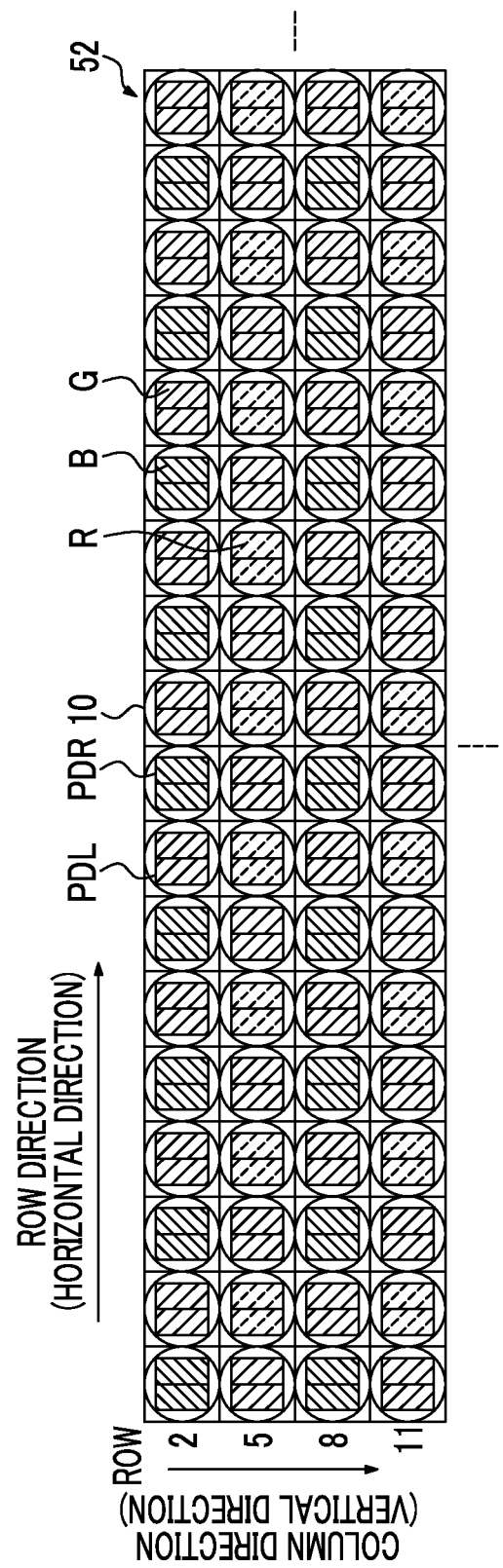
FIG. 17 is a diagram schematically illustrating an example of the arrangement of the pixels which are selected as a third pixel group in the imaging element included in the imaging device according to the first embodiment and an example of the arrangement of the color filters allocated to each pixel.

Specifically, the control unit 50 sequentially outputs the on signal to the (3n−1)-th (2, 5, 8, 11, . . . ) left phase difference pixel photodiode read selection line TGsel_L and the (3n−1)-th right phase difference pixel photodiode read selection line TGsel_R through the scanning circuit 54 such that the signal charges generated in the photodiodes PDL and PDR are transmitted from the read electrodes 70L and 70R to the FD 72. In addition, the control unit 50 sequentially outputs the on signal to the (3n−1)-th read row selection line Read through the scanning circuit 54 to turn on the read switches 74. Therefore, an electric signal corresponding to the signal charge which is read from the FD 72 is output to the read signal line 58. FIG. 17 illustrates the pixels 10 which are selected and extracted as the third pixel group by the control unit 50. As illustrated in FIG. 17, the color filters corresponding to the pixels 10 which are selected as the third pixel group are arranged in a Bayer array, similarly to the color filters 21.

Then, in Step 408, the image processing unit 28 generates a left eye image and a right eye image on the basis of the image signals read from the first pixel group and the second pixel group and stores (overwrites and saves) the left eye image and the right eye image in the parallax image storage area (not illustrated) of the primary storage unit 25.

Then, in Step 410, in the image processing unit 28, the split image processing unit 32 generates a split image on the basis of the left eye image and the right eye image. In the image processing unit 28, the normal processing unit 30 generates a normal image on the basis of the image signal read from the third pixel group. Then, the image processing unit 28 outputs the generated split image and normal image to the display control unit 36 and ends the image processing. When the split image and the normal image are input, the display control unit 36 performs control such that the display device continuously displays the normal image as a moving image and continuously displays the split image as a moving image in a display region of the normal image. Then, for example, as illustrated in FIG. 12, the display device displays a live view image.

As described above, in the imaging device 100 according to the first embodiment, each pixel 10 of the imaging element 20 includes the photodiodes PDL and PDR. In addition, the imaging element 20 includes the color filters 21 having a Bayer array. The control unit 50 selects the pixels 10 in the (3n−2)-th (n is a natural number equal to or greater than 1) as the first pixel group, selects the pixels 10 in the 3n-th row as the second pixel group, and selects the pixels 10 in the (3n−1)-th row as the third pixel group. The pixels 10 in the first pixel group function as the left phase difference pixels. The signal charge generated in the photodiode PDL is read as an electric signal (image signal) to the read signal line 58 through the read electrode 70L, the FD 72, and the read switch 74 on the basis of the control of the device control unit 22 and the control unit 50. The pixels 10 in the second pixel group function as the right phase difference pixels. The signal charge generated in the photodiode PDR is read as an electric signal (image signal) to the read signal line 58 through the read electrode 70R, the FD 72, and the read switch 74 on the basis of the control of the device control unit 22 and the control unit 50. The pixels 10 in the third pixel group function as the normal pixels. The signal charges generated in the photodiodes PDL and PDR are added and the sum of the signal charges is read as an electric signal (image signal) to the read signal line 58 through the read electrodes 70L and 70R, the FD 72, and the read switch 74, on the basis of the control of the device control unit 22 and the control unit 50. The image processing unit 28 generates a left eye image and a right eye image on the basis of the image signals read from the first pixel group and the second pixel group and generates a split image on the basis of the left eye image and the right eye image. Therefore, the imaging device 100 according to the first embodiment can ensure a split image with a simple structure even if all of the pixels are the phase difference pixels, as compared to a case in which the imaging element 20 is configured so as to independently read the signal charges from both the photodiodes PDL and PDR at the same time.

Since the imaging device 100 includes the color filters 21 having the Bayer array, the color filters corresponding to the phase difference pixels and the normal pixels can be arranged in the Bayer array. In addition, in the first embodiment, the control unit 50 selects the pixels 10 in units of rows, selects the pixels 10 in the (3n−2)-th (n is a natural number equal to or greater than 1) row as the first pixel group, selects the pixels 10 in the 3n-th row as the second pixel group, and selects the pixels 10 in the (3n−1)-th row as the third pixel group. Therefore, it is possible to arrange the color filters corresponding to the phase difference pixels and the color filters corresponding to the normal pixels in the Bayer array with a simple structure.

In the first embodiment, the control unit 50 selects the pixels 10 in the (3n−2)-th row as the first pixel group, selects the pixels 10 in the 3n-th row as the second pixel group, and selects the pixels 10 in the (3n−1)-th row as the third pixel group. However, the invention is not limited thereto. For example, the control unit 50 may select the pixels 10 in the 3n-th row as the first pixel group, select the pixels 10 in the (3n−2)-th row as the second pixel group, and select the pixels 10 in the (3n−1)-th row as the third pixel group. In a case in which the pixels 10 in each pixel group are extracted, the pixels to be extracted are not particularly limited as long as the corresponding color filters have the Bayer array.

The flow (see FIG. 13) of the image processing described in the first embodiment is illustrative. Therefore, unnecessary steps may be removed, new steps may be added, or the order of the steps in the process may be changed, without departing from the scope and spirit of the invention. In addition, each step in the image processing described in the first embodiment may be implemented by software configuration, that is, the execution of a program by a computer, or a combination of hardware configuration and software configuration. Furthermore, each step in the image processing described in the first embodiment may be implemented by hardware configuration, such as an ASIC or a programmable logic device, or a combination of hardware configuration and software configuration.

In a case in which the computer executes the program to implement the image processing described in the first embodiment, the program may be stored in a predetermined storage area (for example, the secondary storage unit 26) in advance. However, the program is not necessarily stored in the secondary storage unit 26 at the beginning. For example, the program may be stored in an arbitrary portable storage medium, such as a solid state drive (SSD), a CD-ROM, a DVD disk, a magneto-optical disk, or an IC card which is connected to the computer and is then used, in advance. Then, the computer may acquire the program from the portable storage medium and execute the program. In addition, the program may be stored in another computer or a server apparatus connected to the computer through, for example, the Internet or a local area network (LAN) and the computer may acquire the program and execute the program.

When each step in the image processing described in the first embodiment is implemented by software configuration, for example, the CPU 12 may execute an image processing program such that the image processing is performed by the imaging device 100. The image processing program indicates, for example, a program including each step of the image processing illustrated in FIG. 13. The image processing program may be stored in the secondary storage unit 26. The CPU 12 may read the image processing program from the secondary storage unit 26, develop the image processing program in the primary storage unit 25, and sequentially perform each step of the imaging processing illustrated in FIG. 13. In this case, the CPU 12 functions as an example of a control unit according to the invention.

The imaging device 100 described in the first embodiment may have a function of checking the depth of field (field depth check function). In this case, for example, the imaging device 100 has a field depth check key. The field depth check key may be a hardware key or a software key. In a case in which the hardware key is pressed to issue an instruction, it is preferable to apply a momentary switch (non-hold switch). For example, during the period for which the momentary switch is pressed at a predetermined position, a specific operation state of the imaging device 100 is maintained. Here, when the field depth check key is pressed, the aperture value is changed. When the field depth check key is maintained in a pressed state (the field depth check is maintained at a predetermined position), the aperture value changes continuously until it reaches a limit value. As such, when the field depth check key is maintained in a pressed state, the aperture value changes. Therefore, in some cases, the phase difference required to obtain the split image is not obtained. In a case in which the field depth check key is pressed with the split image being displayed, display may be changed from the split image to general live view display while the field depth check key is being pressed. In addition, when the pressed state is removed, the CPU 12 may switch a screen such that the split image is displayed again. Here, the momentary switch is given as an example of the field depth check key. However, the invention is not limited thereto. For example, an alternate switch (hold switch) may be applied.

Second Embodiment

In the first embodiment, the signal charge is read from the pixels 10 in all of the pixel columns. However, in a second embodiment, the signal charge is read from the pixels 10 in a predetermined pixel column. In the second embodiment, the same components as those in the first embodiment are denoted by the same reference numerals and the description thereof will not be repeated.

Figure 18:
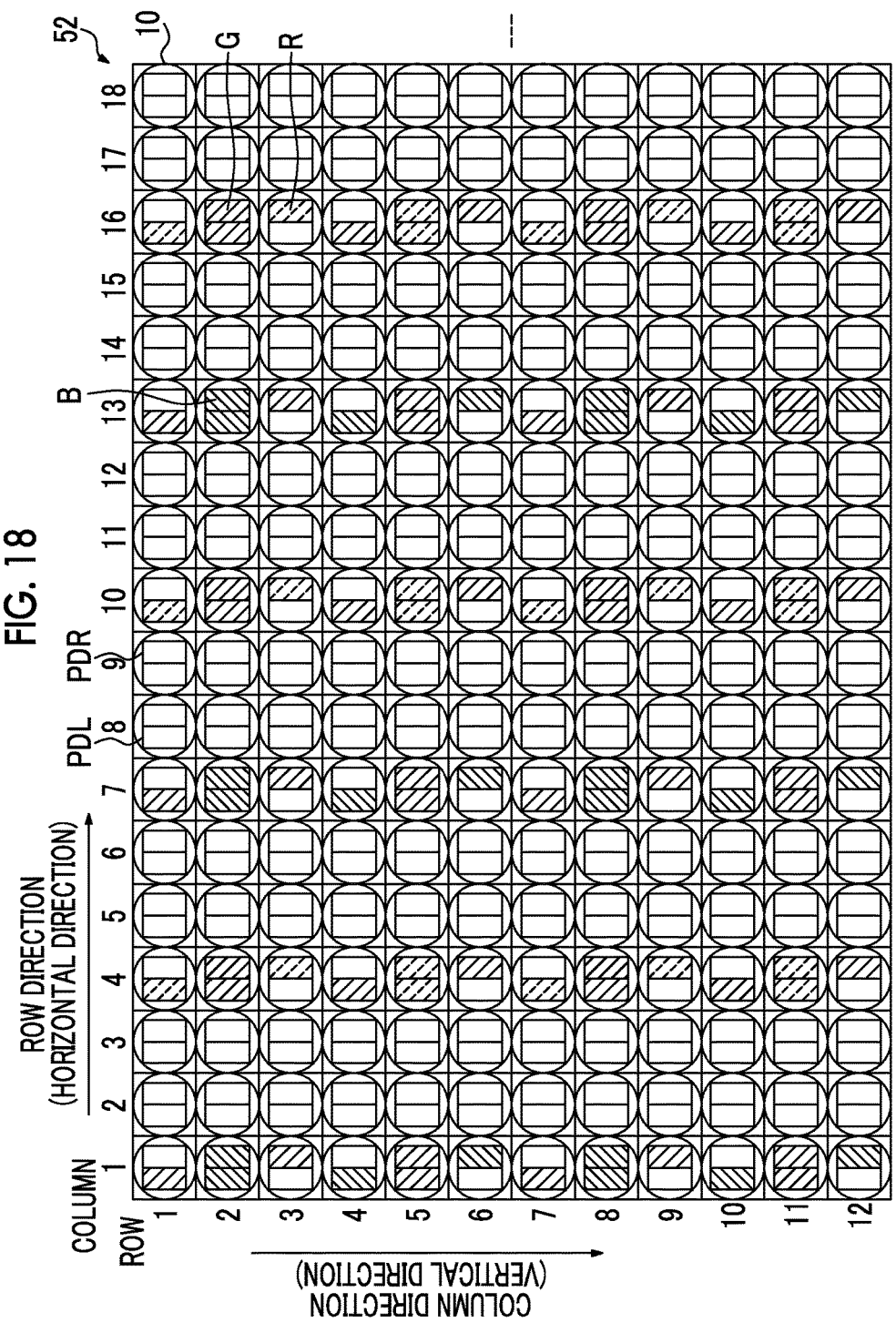
FIG. 18 is a diagram schematically illustrating an example of the arrangement of the pixels which function as the phase difference pixels and the normal pixels in the imaging element included in the imaging device according to the second embodiment and an example of the arrangement of the color filters allocated to each pixel.

An imaging device 100A according to the second embodiment differs from the imaging device 100 according to the first embodiment in the pixels 10 which are selected as the first, second, and third pixel groups by the control unit 50. FIG. 18 is a diagram schematically illustrating an example of the arrangement of the pixels 10 which function as the phase difference pixels and the normal pixels in an imaging element 20 included in the imaging device 100A according to the second embodiment and an example of the arrangement of the color filters 21 allocated to each pixel 10.

As illustrated in FIG. 18, in the second embodiment, similarly to the first embodiment, the control unit 50 selects the pixels 10 in the (3n−2)-th row as the first pixel group, selects the pixels 10 in the 3n-th row as the second pixel group, and selects the pixels 10 in the (3n−1)-th row as the third pixel group. In addition, in the second embodiment, the control unit 50 selects the pixels 10 in a (3m−2)-th (m is a natural number equal to or greater than 1) pixel column as the pixels 10 forming the first, second, and third pixel groups.

That is, the control unit 50 selects the pixels 10 in the (3n−2)-th row and the (3m−2)-th column as the first pixel group which functions as left eye phase difference pixels, selects the pixels 10 in the 3n-th row and the (3m−2)-th column as the second pixel group which functions as right eye phase difference pixels, and selects the pixels 10 in the (3n−1)-th row and the (3m−2)-th column as the third pixel group which functions as normal pixels.

When reading a signal charge from each of the pixels 10 in the first, second, and third pixel groups which are thinned out in a pixel column unit, the control unit 50 may skip the thinned-out pixel columns. In this case, the signal charges stored in the pixels 10 which are not selected as any of the first, second, and third pixel groups may be collectively reset. In addition, the thinned-out pixel columns may not be skipped, the signal charges may be sequentially read from each pixel column, and the signal processing unit 56 may read and discard the electric signal of the read signal line 58 corresponding to the pixel column which has not been selected as any of the first, second, and third pixel groups. However, when the thinned-out pixel column is skipped, the number of pixel columns from which the signal charge is read can be reduced by two-thirds. Therefore, it is possible to improve a reading speed and to suppress power consumption, which is preferable. As described above, in the second embodiment, the control unit 50 thins out the pixels 10 in a pixel column unit to reduce the number of pixels by two-thirds and selects the pixels. Since the first, second, and third pixel groups are selected in this way, the density of the pixels (the density of the pixels 10 selected as each pixel group) in the horizontal direction (row direction) can be equal to the density of the pixels in the vertical direction (column direction). Therefore, it is possible to improve the quality of the split image and the normal image.

In the second embodiment, the control unit 50 selects the pixels 10 in the (3m−2)-th pixel column as the pixels 10 in the first, second, and third pixel groups. However, the invention is not limited thereto. For example, the control unit 50 may select the pixels 10 in the 3m-th column or the (3m−1)-th column as the pixels 10 in the first, second, and third pixel groups.

Third Embodiment

In the first embodiment, the signal charge is read from the pixels 10 in all of the pixel columns. However, in a third embodiment, the signal charge is read from the pixels 10 in a predetermined pixel column. In addition, in the third embodiment, the same components as those in the first embodiment are denoted by the same reference numerals and the description thereof will not be repeated.

Figure 19:
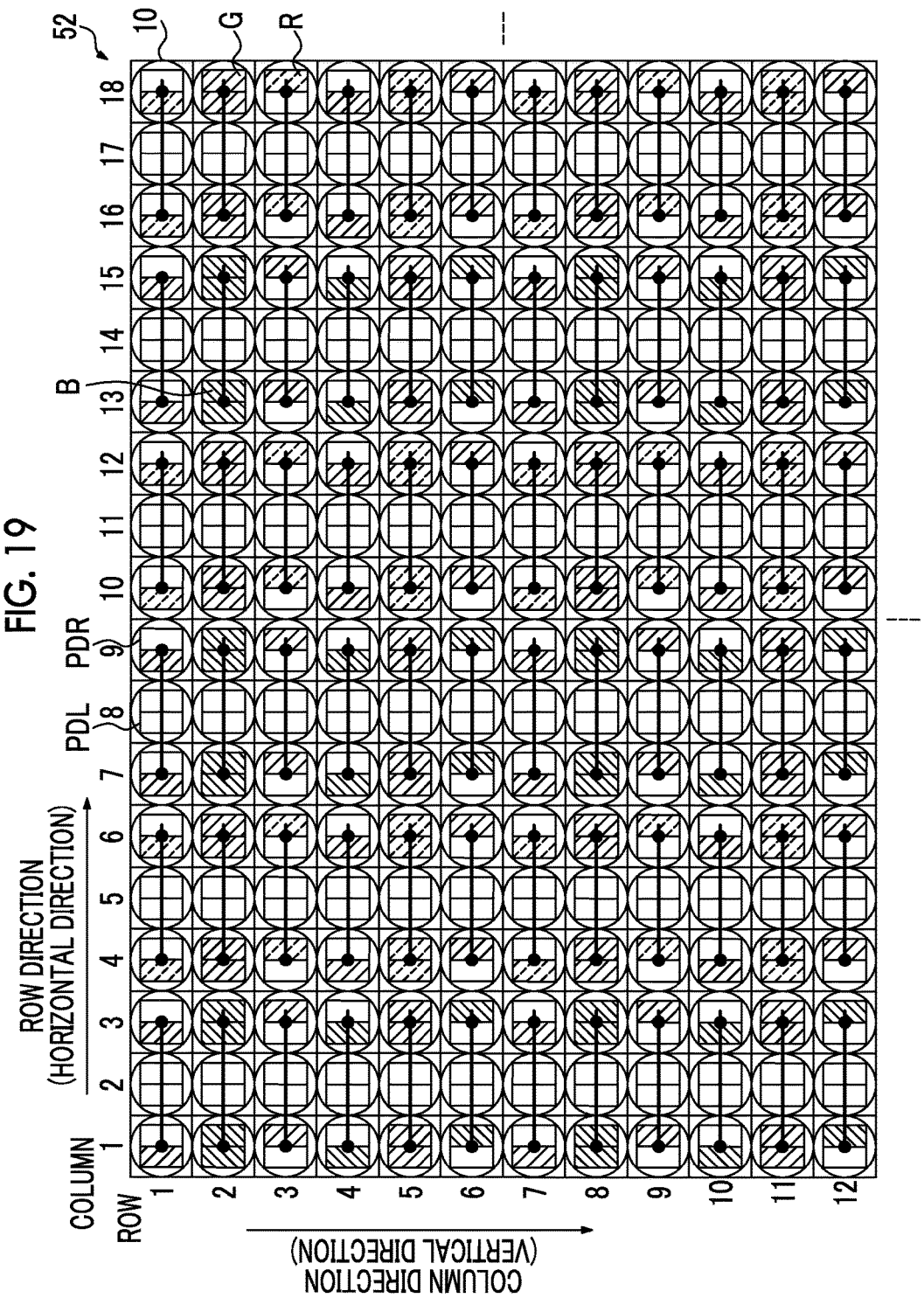
FIG. 19 is a diagram schematically illustrating an example of the arrangement of the pixels which function as the phase difference pixels and the normal pixels in the imaging element included in the imaging device according to the third embodiment and an example of the arrangement of the color filters allocated to each pixel.

An imaging device 100B according to the third embodiment differs from the imaging device 100 according to the first embodiment in the pixels 10 which are selected as the first, second, and third pixel groups by the control unit 50. FIG. 19 is a diagram schematically illustrating an example of the arrangement of the pixels 10 which function as the phase difference pixels and the normal pixels in an imaging element 20 included in the imaging device 100B according to the third embodiment and an example of the arrangement of the color filters 21 allocated to each pixel 10.

As illustrated in FIG. 19, in the third embodiment, similarly to the first embodiment, the control unit 50 selects the pixels 10 in the (3n−2)-th row as the first pixel group, selects the pixels 10 in the 3n-th row as the second pixel group, and selects the pixels 10 in the (3n−1)-th row as the third pixel group. In addition, in the third embodiment, the control unit 50 selects the pixels 10 in the (3m−2)-th (m is a natural number equal to or greater than 1) pixel column and the 3m-th pixel column as the pixels 10 forming the first, second, and third pixel groups. In addition, the control unit 50 collectively reads signal charges from the pixels 10 in the same row and the (3m−2)-th and 3m-th columns as one pixel unit. In the example illustrated in FIG. 19, the control unit 50 collectively reads the signal charges from the pixels 10 in the first and third columns, collectively reads the signal charges from the pixels 10 in the fourth and sixth columns, collectively reads the signal charges from the pixels 10 in the seventh and ninth columns, collectively reads the signal charges from the pixels 10 in the tenth and twelfth columns, collectively reads the signal charges from the pixels 10 in the thirteenth and fifteenth columns, and collectively reads the signal charges from the pixels 10 in the sixteenth and eighteenth columns. The signal processing unit 56 adds the signal charges which are collectively read as each unit. As such, in the third embodiment, the signal charges are collectively read from the pixels 10 in different pixel columns. However, since the color filters 21 corresponding to the pixels 10 from which the signal charges are collectively read have the same color, no problem occurs.

As such, since the signal charges corresponding to two pixels are collectively read and added, the pixel value of each pixel unit is an added value. The pixel values, which are the added values, may be used, without any change, or the mean of the pixel values may be used, in order to generate a right eye image, a left eye image, and a normal image.

As such, in the third embodiment, the control unit 50 selects the pixels 10 in the (3n−2)-th row and the (3m−2)-th and 3m-th columns, which form one unit, as the first pixel group which functions as the left eye phase difference pixels, selects the pixels 10 in the 3n-th row and the (3m−2)-th and 3m-th columns, which form one unit, as the second pixel group which functions as the right eye phase difference pixels, and selects the pixels 10 in the (3n−1)-th row and the (3m−2)-th and 3m-th columns, which form one unit, as the third pixel group which functions as the normal pixels.

When reading the signal charge from each of the pixels 10 in the first, second, and third pixel groups which are thinned out and selected a pixel column unit, the control unit 50 may skip the thinned-out pixel columns. In this case, the signal charges stored in the pixels 10 which have not been selected as any of the first, second, and third pixel groups may be collectively reset. In addition, the thinned-out pixel columns may not be skipped, the signal charges may be sequentially read from each pixel column, and the signal processing unit 56 may read and discard the electric signal of the read signal line 58 corresponding to the pixel column which has not been selected as any of the first, second, and third pixel groups. It is preferable that the signal charges are read from the pixels 10 in the (3m−2)-th column and the 3m-th column at the same time. The signal charges may be sequentially read from each pixel column. When the thinned-out pixel column is skipped and the signal charges are read from the pixels 10 in the (3m−2)-th column and the 3m-th column at the same time, the number of pixel columns from which the signal charge is read can be reduced by two-thirds. Therefore, it is possible to improve a reading speed and to suppress power consumption, which is preferable.

As described above, in the third embodiment, the control unit 50 thins out the pixels 10 in a pixel column unit to reduce the number of pixels by two-thirds and selects the pixels. Since the first, second, and third pixel groups are selected in this way, the density of the pixels (the density of the pixels 10 selected as each pixel group) in the horizontal direction (row direction) can be equal to the density of the pixels in the vertical direction (column direction). Therefore, it is possible to improve the quality of the split image and the normal image.

In the third embodiment, since the amount of signal charge for each unit increases, it is possible to improve the S/N ratio.

In the third embodiment, the control unit 50 selects the pixels 10 in the (3m−2)-th column and the 3m-th column as one unit. However, the invention is not limited thereto. For example, the control unit 50 may select the pixels 10 in the (3m−1)-th column and the (3m+1)-th column as one unit. The color filters 21 corresponding to the pixels 10 which are selected as one unit may have the same color.

Fourth Embodiment

In the first embodiment, all of the pixels 10 have the same exposure time. However, in a fourth embodiment, the phase difference pixel and the normal pixel have different exposure times. In the fourth embodiment, the same components as those in the first embodiment are denoted by the same reference numerals and the description thereof will not be repeated.

An imaging device 100C according to the fourth embodiment differs from the imaging device 100 according to the first embodiment in the control of the exposure time of the pixel 10 by the control unit 50. In the fourth embodiment, the control unit 50 performs control such that the exposure time of the phase difference pixel is longer than the exposure time of the normal pixel.

The imaging element 20 controls a charge storage time (shutter speed) on the basis of a vertical synchronizing signal (see FIG. 20) and a horizontal synchronizing signal (not illustrated). The control unit 50 outputs the vertical synchronizing signal to the scanning circuit 54. In addition, the control unit 50 outputs the horizontal synchronizing signal to the signal processing unit 56.

Figure 20:
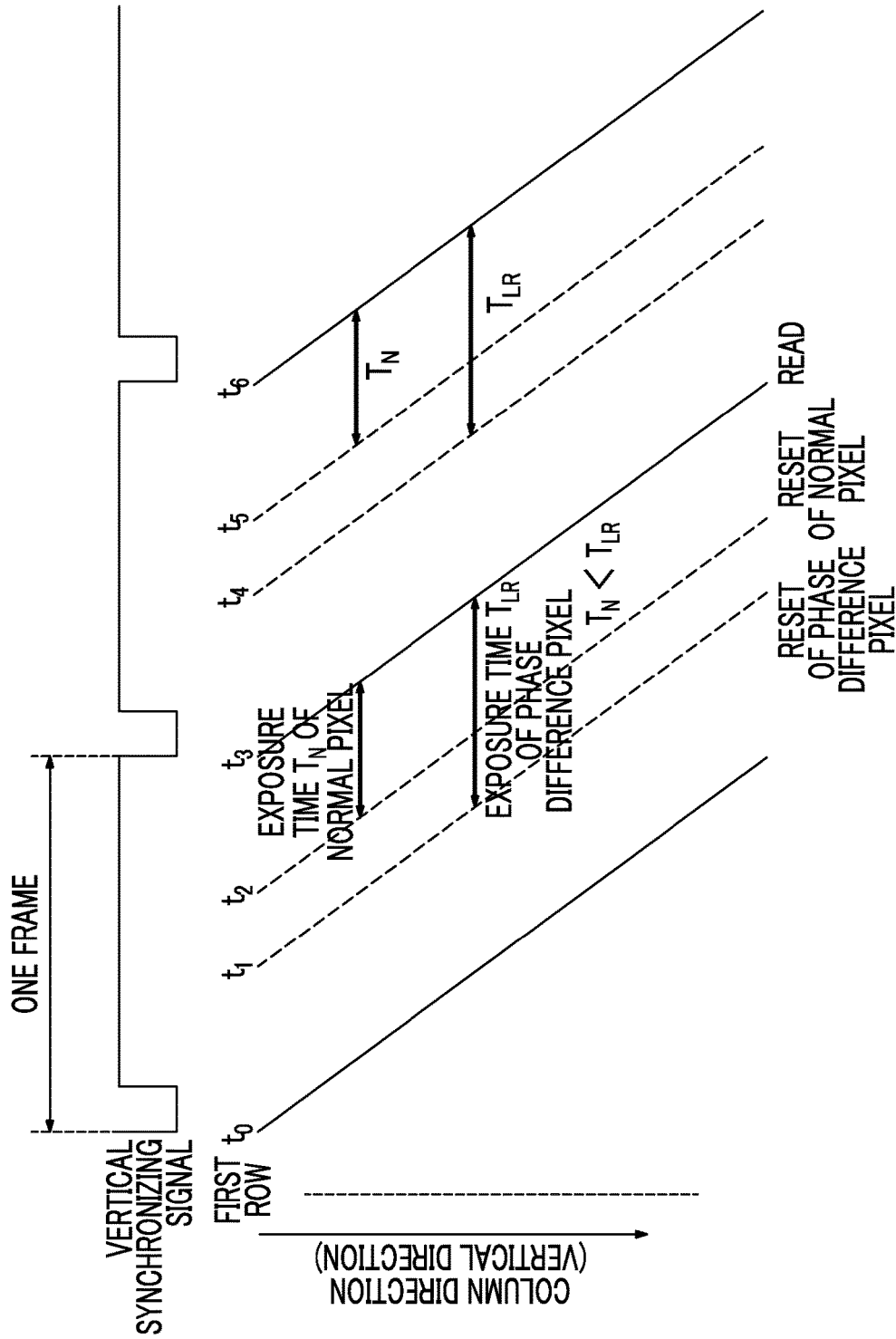
FIG. 20 is a timing chart illustrating an example of the exposure time of the pixel in the imaging element of the imaging device according to the fourth embodiment.

FIG. 20 is a timing chart illustrating an example of the exposure time of the pixel 10 in the fourth embodiment. In the fourth embodiment, the charge storage time for which the signal charge is stored in the pixel 10 is used as an example of the exposure time. However, the invention is not limited thereto. For example, the time for which light is emitted to the pixel 10 (the time for which image light is focused on a light receiving surface) may be used as the exposure time.

In the example illustrated in FIG. 20, the upper side of FIG. 20 corresponds to the first pixel row in the pixel array 52. In the imaging element 20, a signal charge is sequentially read from the first pixel row. In the example illustrated in FIG. 20, the period from a time t0 to a time t3 corresponds to one frame (first frame).

At the time t1, the control unit 50 resets the signal charges of the phase difference pixels (the pixels in the first and second pixel groups) and the signal charges stored in the photodiodes PDL and PDR of the phase difference pixels are discharged. Specifically, since it takes a time to discharge the signal charges, the control unit 50 outputs the on signal to the reset row selection line Reset, the left phase difference pixel photodiode read selection line TGsel_L, and the right phase difference pixel photodiode read selection line TGsel_R connected to the phase difference pixels for a predetermined reset time until the time t1. In addition, the control unit 50 outputs the off signal to the read row selection line Read to turn off the read switches 74 during the reset operation.

The control unit 50 completes the reset operation at the time t1 and outputs the off signal to the reset row selection line Reset, the left phase difference pixel photodiode read selection line TGsel_L, and the right phase difference pixel photodiode read selection line TGsel_R connected to the phase difference pixels. The signal charge starts to be stored in the photodiodes PDL and PDR of the phase difference pixel from the time t1 by the above-mentioned operation.

At the time t2 after the time t1, the control unit 50 resets the signal charges of the normal pixels (the pixels in the third pixel group) and the signal charges stored in the photodiodes PDL and PDR of the normal pixels are discharged. Specifically, since it takes a time to discharge the signal charges, the control unit 50 outputs the on signal to the reset row selection line Reset, the left phase difference pixel photodiode read selection line TGsel_L, and the right phase difference pixel photodiode read selection line TGsel_R connected to the normal pixels for a predetermined reset time until the time t2. In addition, the control unit 50 outputs the off signal to the read row selection line Read connected to the normal pixels to turn off the read switches 74 during the reset operation.

The control unit 50 completes the reset operation at the time t2 and outputs the off signal to the reset row selection line Reset, the left phase difference pixel photodiode read selection line TGsel_L, and the right phase difference pixel photodiode read selection line TGsel_R connected to the normal pixels. The signal charge starts to be stored in the photodiodes PDL and PDR of the normal pixel from the time t2 by the above-mentioned operation.

At the time t3, the control unit 50 ends the storage of the signal charge and reads the signal charge from the phase difference pixels and the normal pixels. That is, the control unit 50 reads the signal charge from all of the pixels 10 at the time t3. Specifically, the control unit 50 outputs the on signal to the read row selection line Read and the left phase difference pixel photodiode read selection line TGsel_L corresponding to the row of the left phase difference pixels. In addition, the control unit 50 outputs the off signal to the right phase difference pixel photodiode read selection line TGsel_R. The signal charges stored in the photodiodes PDL of the left phase difference pixels (the pixels in the first pixel group) are read by the above-mentioned operation.

The control unit 50 outputs the on signal to the read row selection line Read and the right phase difference pixel photodiode read selection line TGsel_R corresponding to the row of the right phase difference pixels. The control unit 50 outputs the off signal to the left phase difference pixel photodiode read selection line TGsel_L. The signal charges stored in the photodiodes PDR of the right phase difference pixels (the pixels in the second pixel group) are read by the above-mentioned operation.

The control unit 50 outputs the on signal to the read row selection line Read, the left phase difference pixel photodiode read selection line TGsel_L, and the right phase difference pixel photodiode read selection line TGsel_R corresponding to the row of the normal pixels. The signal charges stored in the photodiodes PDL and PDR of the normal pixels (the pixels in the third pixel group) are read by the above-mentioned operation.

As illustrated in FIG. 20, the exposure time $T_{LR}$ of the phase difference pixel is from the time t1 to the time t3 and the exposure time $T_N$ of the normal pixel is from the time t2 to the time t3. Therefore, the exposure time $T_{LR}$ of the phase difference pixel is longer than the exposure time $T_N$ of the normal pixel.

As described above, in the fourth embodiment, the control unit 50 performs control such that the exposure time $T_{LR}$ of the phase difference pixel is longer than the exposure time $T_N$ of the normal pixel. In the phase difference pixel, the signal charge stored in any one of the photodiodes PDL and PDR is read. In the normal pixel, the signal charges stored in both the photodiodes PDL and PDR are read. Since the area of the photodiode in the phase difference pixel is less than that in the normal pixel, the amount of signal charge is reduced and sensitivity is lowered. However, in the fourth embodiment, the control unit 50 performs control such that the exposure time $T_{LR}$ of the phase difference pixel is longer than the exposure time $T_N$ of the normal pixel. Therefore, the exposure time $T_{LR}$ of the phase difference pixel can increase to maintain an exposure state for a long time and it is possible to improve brightness which is the value of the phase difference pixel.

Figure 21:
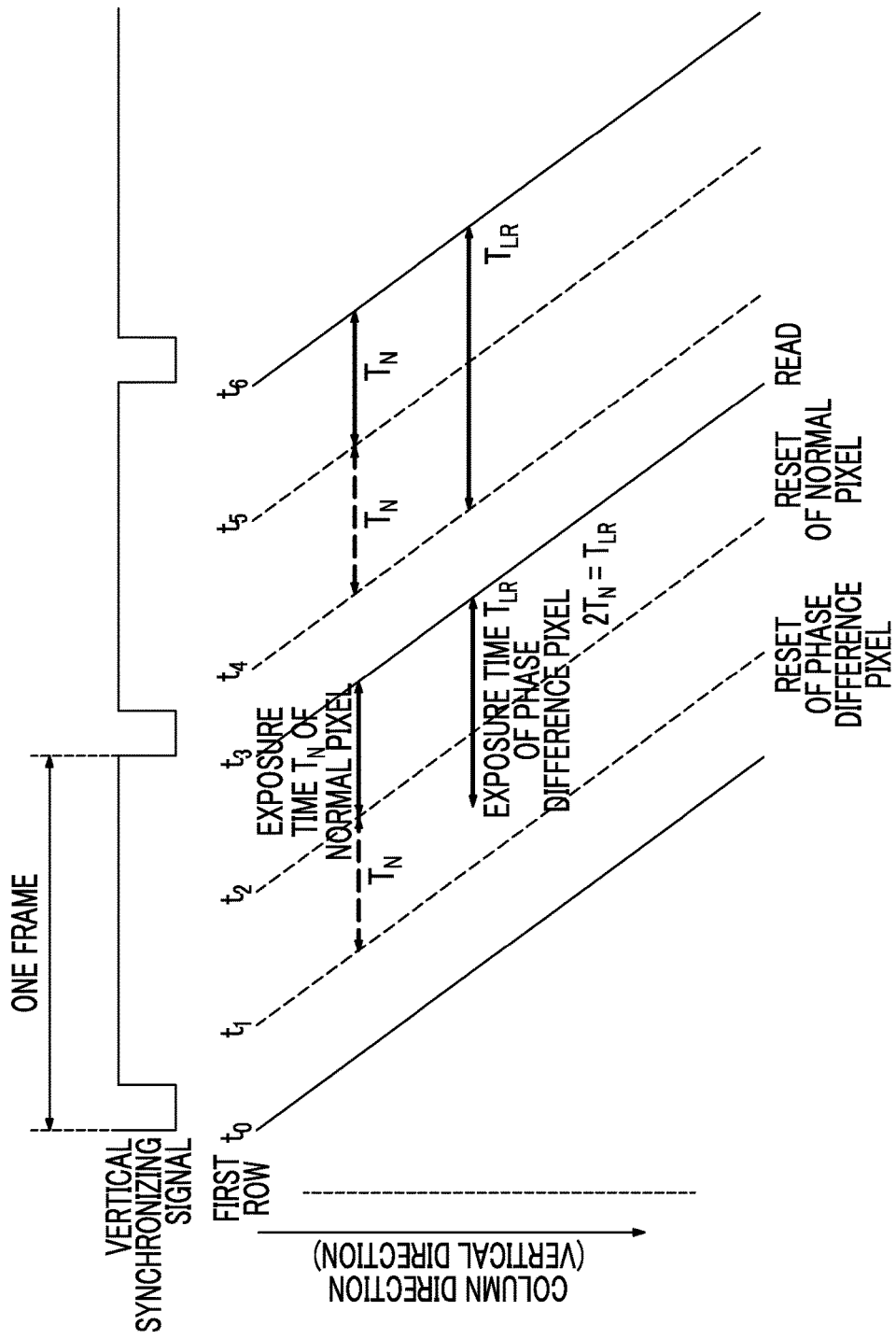
FIG. 21 is a timing chart illustrating another example of the exposure time of the pixel in the imaging element of the imaging device according to the fourth embodiment.

It is preferable to determine how much longer the exposure time $T_{LR}$ of the phase difference pixel is than the exposure time $T_N$ of the normal pixel, on the basis of the characteristics of the photodiodes PDL and PDR, such as the area or sensitivity of the photodiodes PDL and PDR. For example, as described in each of the embodiments (for example, see FIGS. 5 and 6), in a case in which the photodiodes PDL and PDR have the same area or sensitivity, the sensitivity of the photodiode in the phase difference pixel is about half the sensitivity of the photodiode in the normal pixel. Therefore, in this case, as illustrated in the timing chart of FIG. 21, it is preferable that the exposure time $T_{LR}$ of the phase difference pixel is twice as long as the exposure time $T_N$ of the normal pixel. When the exposure time TLR of the phase difference pixel is twice as long as the exposure time $T_N$ of the normal pixel, brightness, which is the value of the phase difference pixel, can be equal to brightness which is the value of the normal pixel.

Fifth Embodiment

In the first embodiment, all of the pixels 10 have the same exposure time. However, in a fifth embodiment, the phase difference pixel and the normal pixel have different exposure times. In the first embodiment, the pixel rows which are selected as the first, second, and third pixel groups by the control unit 50 are fixed. However, in the fifth embodiment, the pixel rows which are selected as the first and second pixel groups by the control unit 50 vary depending on frames. In the fifth embodiment, the same components as those in the first embodiment are denoted by the same reference numerals and the description thereof will not be repeated.

An imaging device 100D according to the fifth embodiment differs from the imaging device 100 according to the first embodiment in the control of the exposure time of the pixel 10 by the control unit 50. In the fifth embodiment, the control unit 50 performs control such that the exposure time of the phase difference pixel is longer than the exposure time of the normal pixel. In the fifth embodiment, a basic operation of controlling the exposure time and the charge storage time in the imaging element 20 (pixels 10) of the imaging device 100D includes the same operation as that in the fourth embodiment. Therefore, the detailed description of the same operations will not be repeated.

Figure 22:
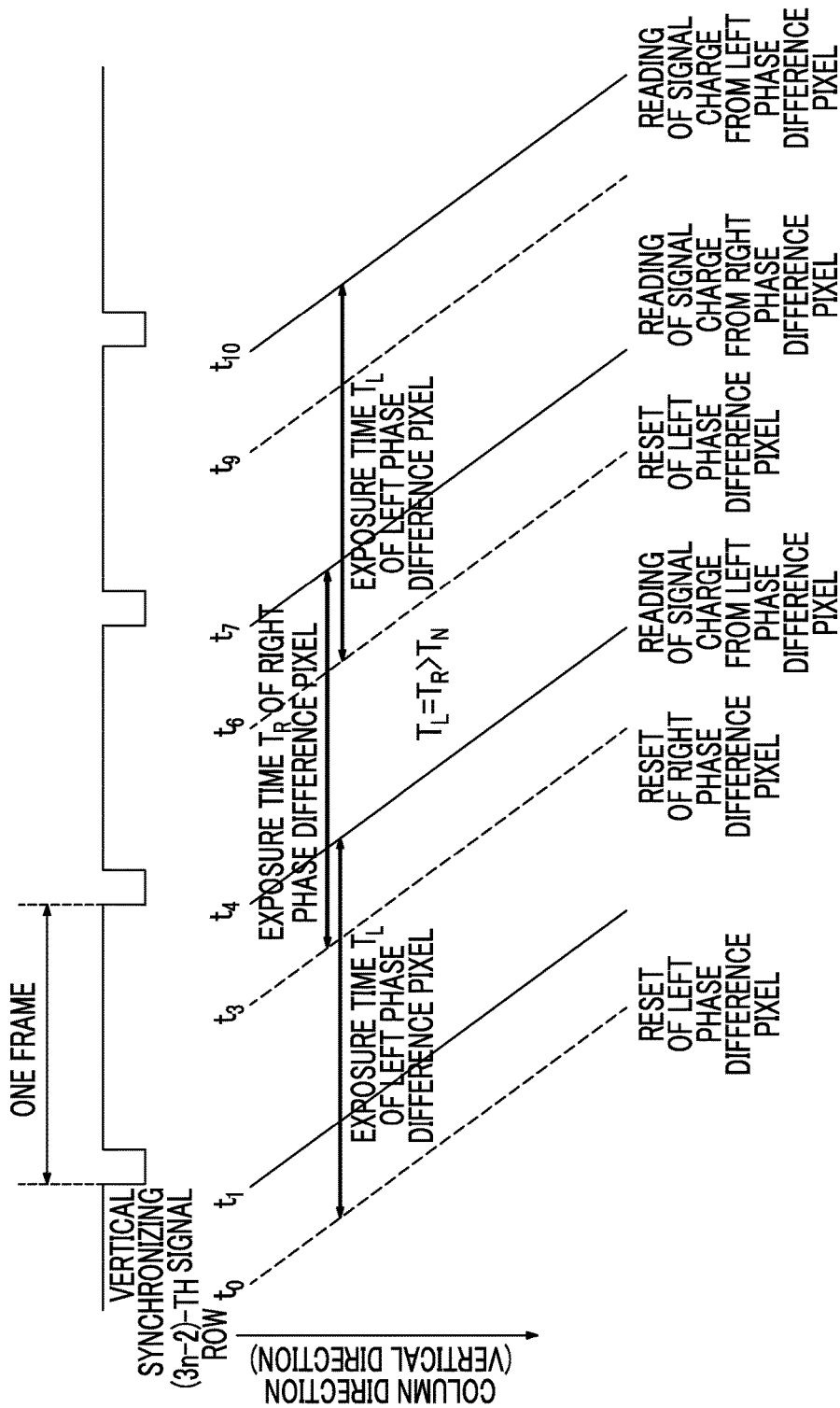
FIG. 22 is a timing chart illustrating an example of the exposure time which is extracted from a (3n−2)-th pixel row in the imaging element of the imaging device according to the fifth embodiment.
Figure 23:
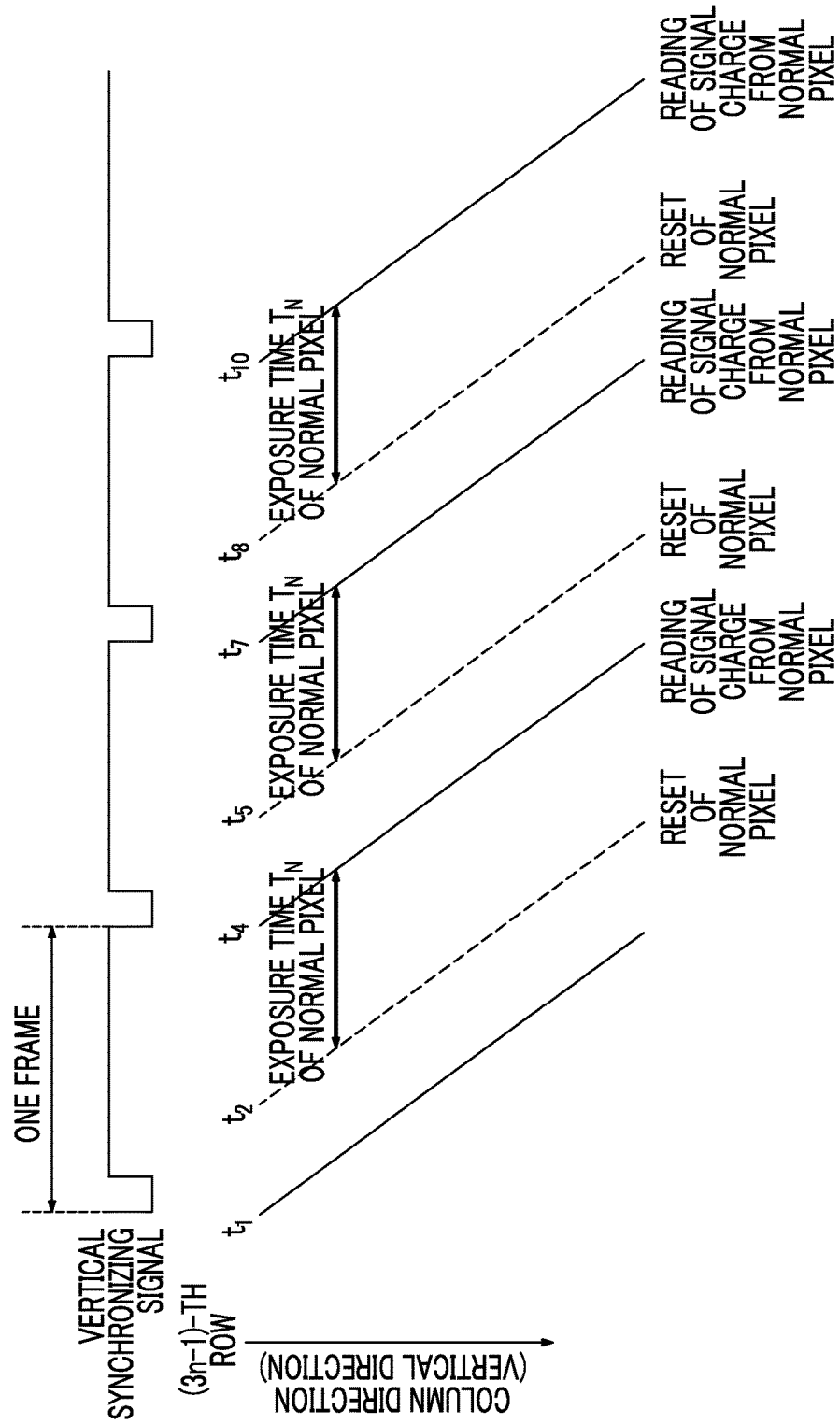
FIG. 23 is a timing chart illustrating an example of the exposure time which is extracted from a (3n−1)-th pixel row in the imaging element of the imaging device according to the fifth embodiment.
Figure 24:
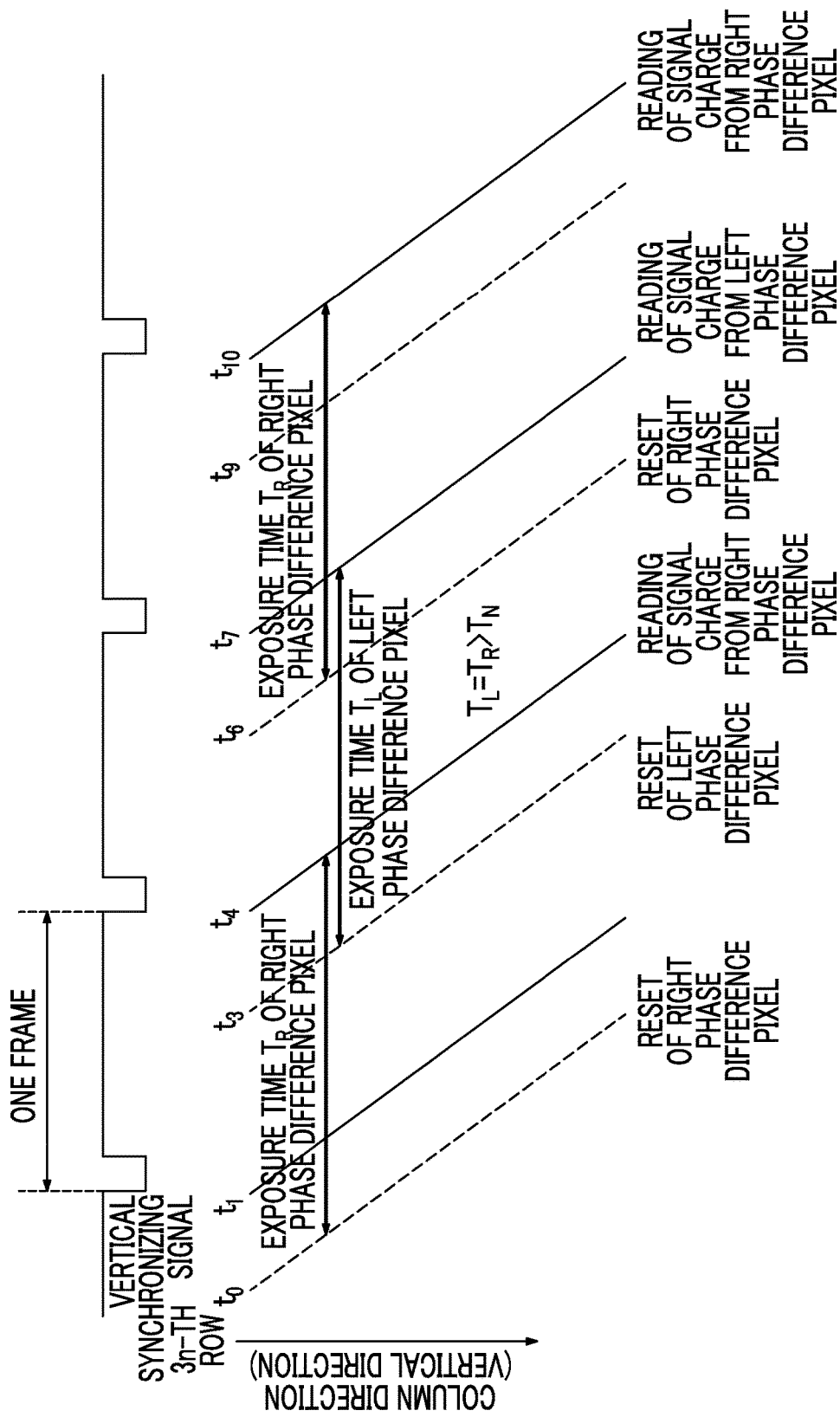
FIG. 24 is a timing chart illustrating an example of the exposure time which is extracted from a 3n-th pixel row in the imaging element of the imaging device according to the fifth embodiment.

FIGS. 22 to 24 are timing charts illustrating an example of the exposure time of the pixel 10 in the fifth embodiment. FIG. 22 is a timing chart illustrating an example of the exposure time extracted from a (3n−2)-th pixel row. FIG. 23 is a timing chart illustrating an example of the exposure time extracted from a (3n−1)-th pixel row. FIG. 24 is a timing chart illustrating an example of the exposure time extracted from a 3n-th pixel row.

FIGS. 25 to 28 are diagrams schematically illustrating a reading operation of reading a signal charge from the pixel 10 in the fifth embodiment. In the imaging element 20 according to the fifth embodiment, two read signal lines (read signal lines 58A and 58B) to which an electric signal is output from the FD 72 of each pixel 10 are provided for each pixel column. As illustrated in FIGS. 25 to 28, the electric signals are alternately output to the read signal lines 58A and 58B for each pixel column. The electric signals are alternately output to the read signal lines 58A and 58B for each pixel row. In FIGS. 25 to 28, the hatched photodiodes PDL and PDR indicate the photodiodes in which a signal charge is stored and the photodiodes PDL and PDR which are not hatched indicate the photodiodes in which no signal charge is stored (the signal charge is reset or has been read).

In the first frame, the control unit 50 selects the pixels 10 in the (3n−2)-th row as the first pixel group, selects the pixels 10 in the 3n-th row as the second pixel group, and selects the pixels 10 in the (3n−1)-th row as the third pixel group. In the next frame, the control unit 50 selects the pixels 10 in the 3n-th row as the first pixel group, selects the pixels 10 in the (3n−2)-th row as the second pixel group, and selects the pixels 10 in the (3n−1)-th row as the third pixel group. In the frame after the next frame, the control unit 50 selects the pixels 10 in the (3n−2)-th row as the first pixel group, selects the pixels 10 in the 3n-th row as the second pixel group, and selects the pixels 10 in the (3n−1)-th row as the third pixel group. As such, the control unit 50 alternately selects the pixels in the (3n−2)-th row and the pixels in the 3n-th row as the first pixel group and the second pixel group for each frame.

First, an operation for the first frame will be described. The operation for the first frame is performed at the times t0, t2, and t4. In the fifth embodiment, the control unit 50 of the imaging element 20 performs control for the first frame from the time t0. The period corresponding to the first frame of the imaging element 20 is from the time t1 to the time t4. Therefore, in the fifth embodiment, the imaging element 20 starts a charge storage operation from the previous frame.

Figure 25:
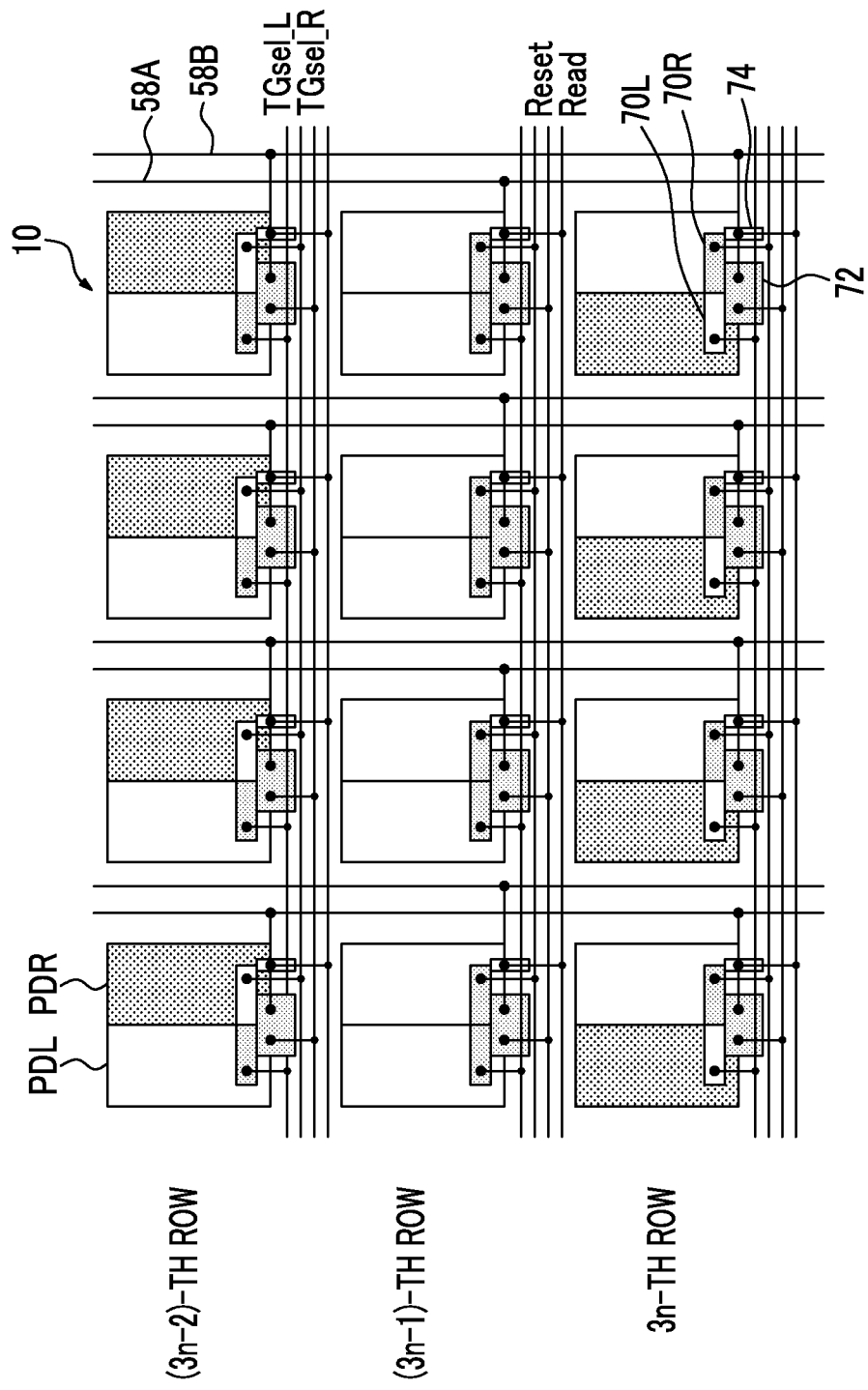
FIG. 25 is a diagram schematically illustrating a reading operation of reading a signal charge from the pixels in the imaging element of the imaging device according to the fifth embodiment.

At the time t0, the control unit 50 selects the pixels 10 in the (3n−2)-th row as the first pixel group which functions as the left phase difference pixels and resets the signal charges stored in the photodiodes PDL of the left phase difference pixels which are selected as the first pixel group. Specifically, the control unit 50 outputs the on signal to the reset row selection line Reset and the left phase difference pixel photodiode read selection line TGsel_L connected to the pixels 10 in the (3n−2)-th row for a predetermined reset time until the time t0. In addition, the control unit 50 outputs the off signal to the right phase difference pixel photodiode read selection line TGsel_R and the read row selection line Read connected to the pixels 10 in the (3n−2)-th row during the reset operation. As illustrated in FIG. 25, in the pixels 10 in the (3n−2)-th row, the signal charge stored in the photodiode PDL is reset by the above-mentioned operation and the signal charge stored in the photodiode PDR is maintained by the above-mentioned operation.

The control unit 50 selects the pixels 10 in the 3n-th row as the second pixel group which functions as the right phase difference pixels and resets the signal charges stored in the photodiodes PDR of the right phase difference pixels which are selected as the second pixel group. Specifically, the control unit 50 outputs the on signal to the reset row selection line Reset and the right phase difference pixel photodiode read selection line TGsel_R connected to the pixels 10 in the 3n-th row for a predetermined reset time until the time t0. In addition, the control unit 50 outputs the off signal to the left phase difference pixel photodiode read selection line TGsel_L and the read row selection line Read connected to the pixels 10 in the 3n-th row for the reset operation. As illustrated in FIG. 25, in the pixels 10 in the 3n-th row, the signal charge stored in the photodiode PDR is reset by the above-mentioned operation and the signal charge stored in the photodiode PDL is maintained by the above-mentioned operation. When the reset of the phase difference pixels at the time t0 is completed, the signal charge starts to be stored in the photodiode PDL of the left phase difference pixel and the photodiode PDR of the right phase difference pixel.

Then, at the time t2, the control unit 50 does not perform control for the pixels 10 in the (3n−2)-th row and the (3n−1)-th row.

The control unit 50 selects the pixels 10 in the (3n−1)-th row as the third pixel group which functions as the normal pixels and resets the signal charges stored in the photodiodes PDL and PDR of the normal pixels which are selected as the third pixel group. Specifically, the control unit 50 outputs the on signal to the reset row selection line Reset, the left phase difference pixel photodiode read selection line TGsel_L, and the right phase difference pixel photodiode read selection line TGsel_R connected to the pixels 10 in the (3n−1)-th row for a predetermined reset time until the time t0. In addition, the control unit 50 outputs the off signal to the read row selection line Read connected to the pixels 10 in the (3n−1)-th row for the reset operation. As illustrated in FIG. 25, in the pixels 10 in the (3n−1)-th row, the signal charges stored in the photodiodes PDL and PDR are reset by the above-mentioned operation. When the reset of the normal pixels at the time t2 is completed, a signal charge starts to be stored in the photodiodes PDL and PDR of the normal pixel.

Figure 27:
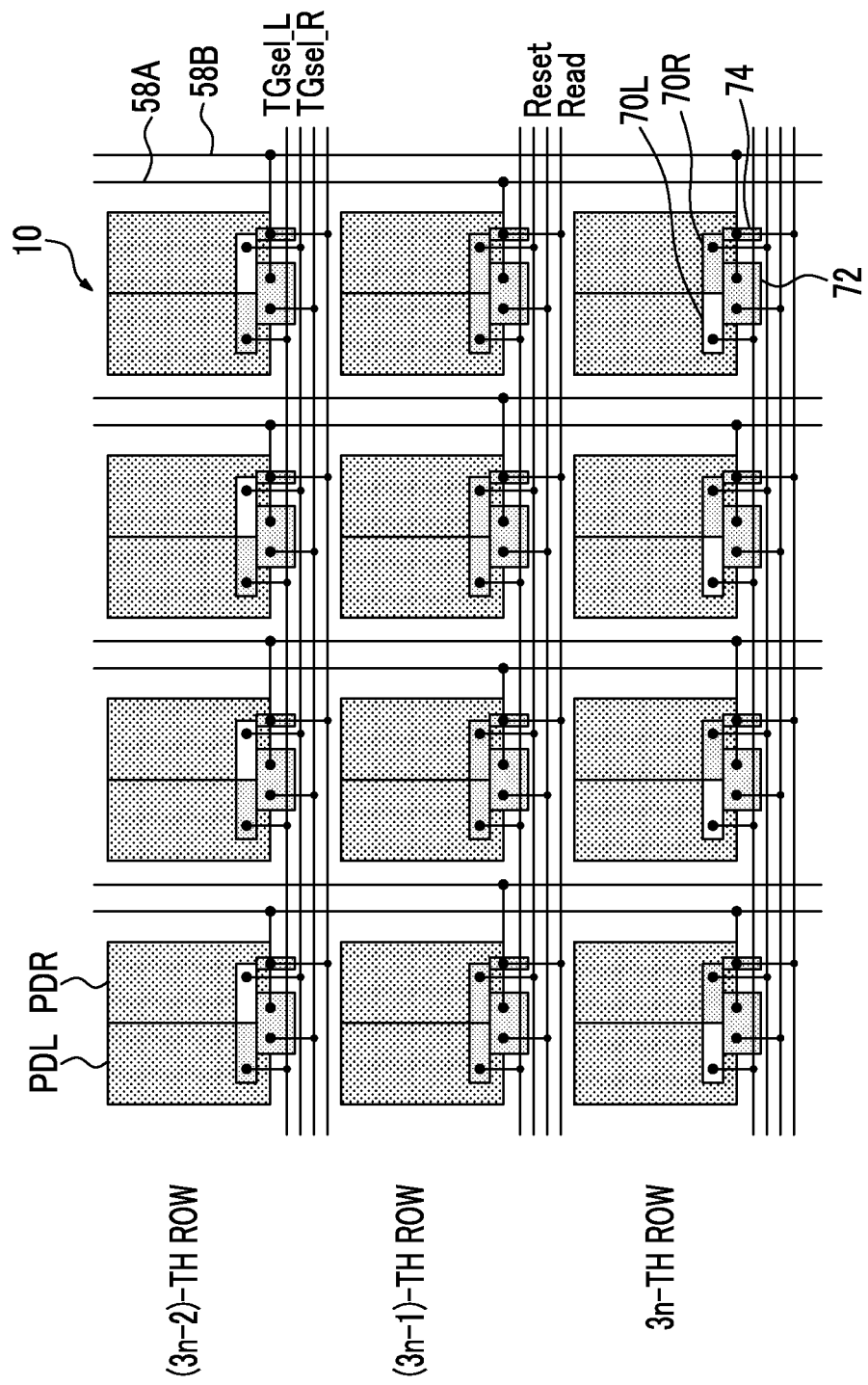
FIG. 27 is a diagram schematically illustrating a reading operation of reading a signal charge from the pixels in the imaging element of the imaging device according to the fifth embodiment.

Then, at the time t4, the signal charges stored in the phase difference pixel and the normal pixel are read. As illustrated in FIG. 27, the control unit 50 reads the signal charge from the photodiodes PDL of the pixels 10 in the (3n−2)-th row, the photodiodes PDL and PDR of the pixels 10 in the (3n−1)-th row, and the photodiodes PDR of the pixels 10 in the 3n-th row. Specifically, the control unit 50 outputs the on signal to the read row selection line Read and the left phase difference pixel photodiode read selection line TGsel_L connected to the pixels 10 in the (3n−2)-th row. In addition, the control unit 50 outputs the off signal to the right phase difference pixel photodiode read selection line TGsel_R and the reset row selection line Reset connected to the pixels 10 in the (3n−2)-th row. As illustrated in FIG. 27, in the pixels 10 in the (3n−2)-th row, the signal charge stored in the photodiode PDL is output to the read signal line 58A or the read signal line 58B by the above-mentioned operation and the signal charge stored in the photodiode PDR is maintained by the above-mentioned operation.

The control unit 50 outputs the on signal to the read row selection line Read and the right phase difference pixel photodiode read selection line TGsel_R connected to the pixels 10 in the 3n-th row. In addition, the control unit 50 outputs the off signal to the left phase difference pixel photodiode read selection line TGsel_L and the reset row selection line Reset connected to the pixels 10 in the 3n-th row. As illustrated in FIG. 27, in the pixels 10 in the 3n-th row, the signal charge stored in the photodiode PDR is output to the read signal line 58A or the read signal line 58B by the above-mentioned operation and the signal charge stored in the photodiode PDL is maintained by the above-mentioned operation.

The control unit 50 outputs the on signal to the read row selection line Read, the left phase difference pixel photodiode read selection line TGsel_L, and the phase difference pixel photodiode read selection line TGsel_R connected to the pixels 10 in the (3n−1)-th row. In addition, the control unit 50 outputs the off signal to the reset row selection line Reset connected to the pixels 10 in the (3n−1)-th row. As illustrated in FIG. 27, in the pixels 10 in the (3n−1)-th row, the signal charges stored in the photodiodes PDL and PDR are output to the read signal line 58A or the read signal line 58B by the above-mentioned operation.

As illustrated in FIGS. 22 to 24, in the imaging element 20 according to the fifth embodiment in which the exposure time $T_L$ of the left phase difference pixel and the exposure time $T_R$ of the right phase difference pixel are from the time t0 to the time t4 and exposure is performed over two frames, the exposure time $T_L$ of the left phase difference pixel and the exposure time $T_R$ of the right phase difference pixel are longer than the period corresponding to one frame. In contrast, the exposure time $T_N$ of the normal pixel is from the time t2 to the time t4. Therefore, the exposure time $T_L$ of the left phase difference pixel and the exposure time $T_R$ of the right phase difference pixel are longer than the exposure time $T_N$ of the normal pixel.

Next, an operation for the next frame (second frame) will be described. The operation for the second frame is performed at the times t3, t5, and t7. In the fifth embodiment, the control unit 50 of the imaging element 20 performs control for the second frame from the time t3. The period corresponding to the second frame of the imaging element 20 is from the time t4 to the time t7. Therefore, in the fifth embodiment, the imaging element 20 starts a charge storage operation from the previous frame.

Figure 26:
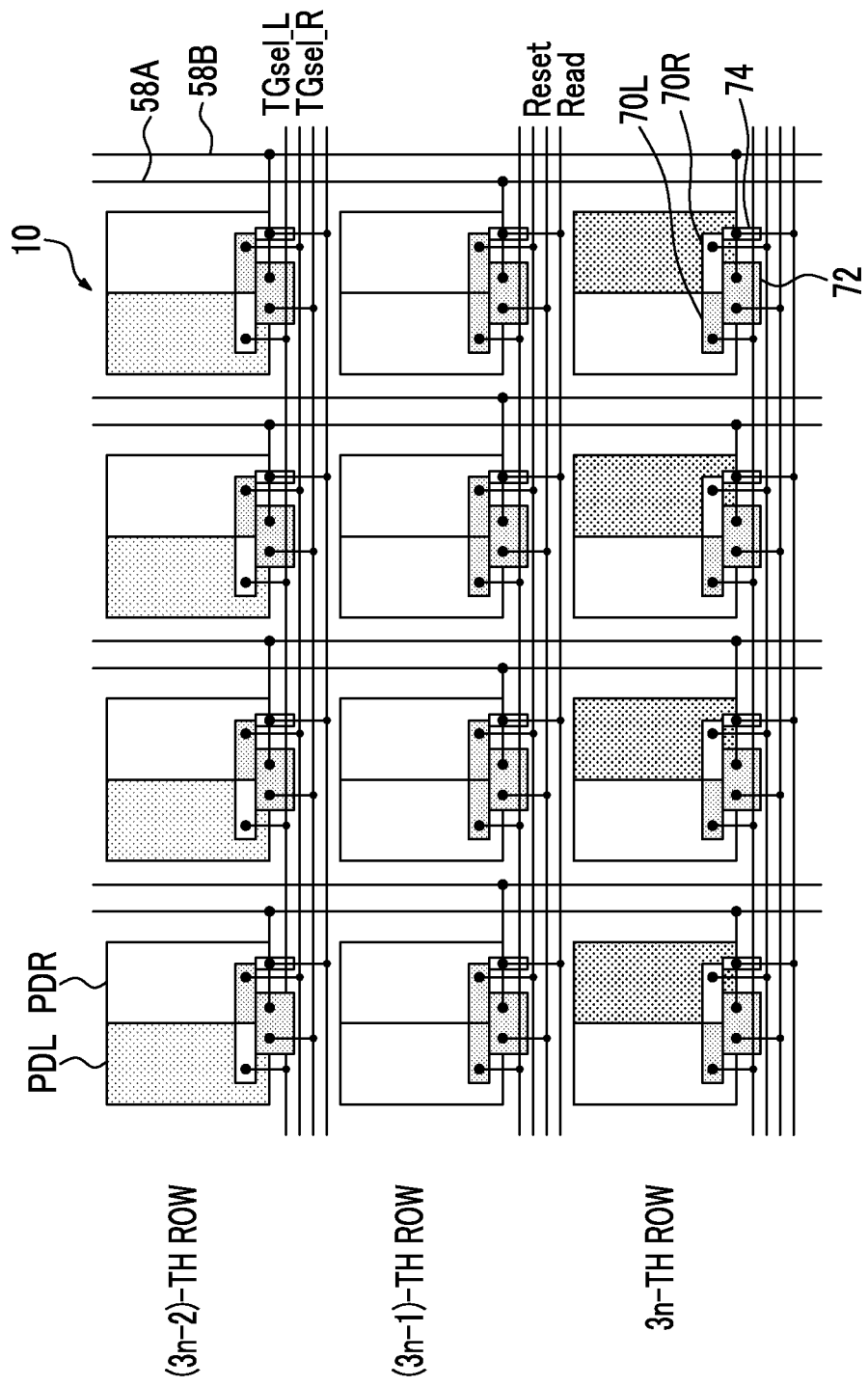
FIG. 26 is a diagram schematically illustrating a reading operation of reading a signal charge from the pixels in the imaging element of the imaging device according to the fifth embodiment.

At the time t3, the control unit 50 selects the pixels 10 in the (3n−2)-th row as the second pixel group which functions as the right phase difference pixels. The control unit 50 resets the signal charges stored in the photodiodes PDR of the right phase difference pixels which are selected as the second pixel group. Specifically, the control unit 50 outputs the on signal to the reset row selection line Reset and the right phase difference pixel photodiode read selection line TGsel_R connected to the pixels 10 in the (3n−2)-th row for a predetermined reset time until the time t3. In addition, the control unit 50 outputs the off signal to the left phase difference pixel photodiode read selection line TGsel_L and the read row selection line Read connected to the pixels 10 in the (3n−2)-th row during the reset operation. As illustrated in FIG. 26, in the pixels 10 in the (3n−2)-th row, the signal charge stored in the photodiode PDR is reset by the above-mentioned operation and the signal charge stored in the photodiode PDL is maintained by the above-mentioned operation.

The control unit 50 selects the pixels 10 in the 3n-th row as the first pixel group which functions as the left phase difference pixels. The control unit 50 resets the signal charges stored in the photodiodes PDL of the left phase difference pixels which are selected as the first pixel group. Specifically, the control unit 50 outputs the on signal to the reset row selection line Reset and the left phase difference pixel photodiode read selection line TGsel_L connected to the pixels 10 in the 3n-th row for a predetermined reset time until the time t3. In addition, the control unit 50 outputs the off signal to the right phase difference pixel photodiode read selection line TGsel_R and the read row selection line Read connected to the pixels 10 in the 3n-th row during the reset operation. As illustrated in FIG. 26, in the pixels 10 in the 3n-th row, the signal charge stored in the photodiode PDL is reset by the above-mentioned operation and the signal charge stored in the photodiode PDR is maintained by the above-mentioned operation.

In the imaging element 20 according to the fifth embodiment, as illustrated in FIGS. 22 to 24, for the period from the time t3 to the time t4, charge is stored in the photodiodes PDL and PDR of all of the pixels 10.

Then, at the time t5, the control unit 50 performs the same operation as that at the time t2 to reset the normal pixels in the (3n−1)-th row.

Figure 28:
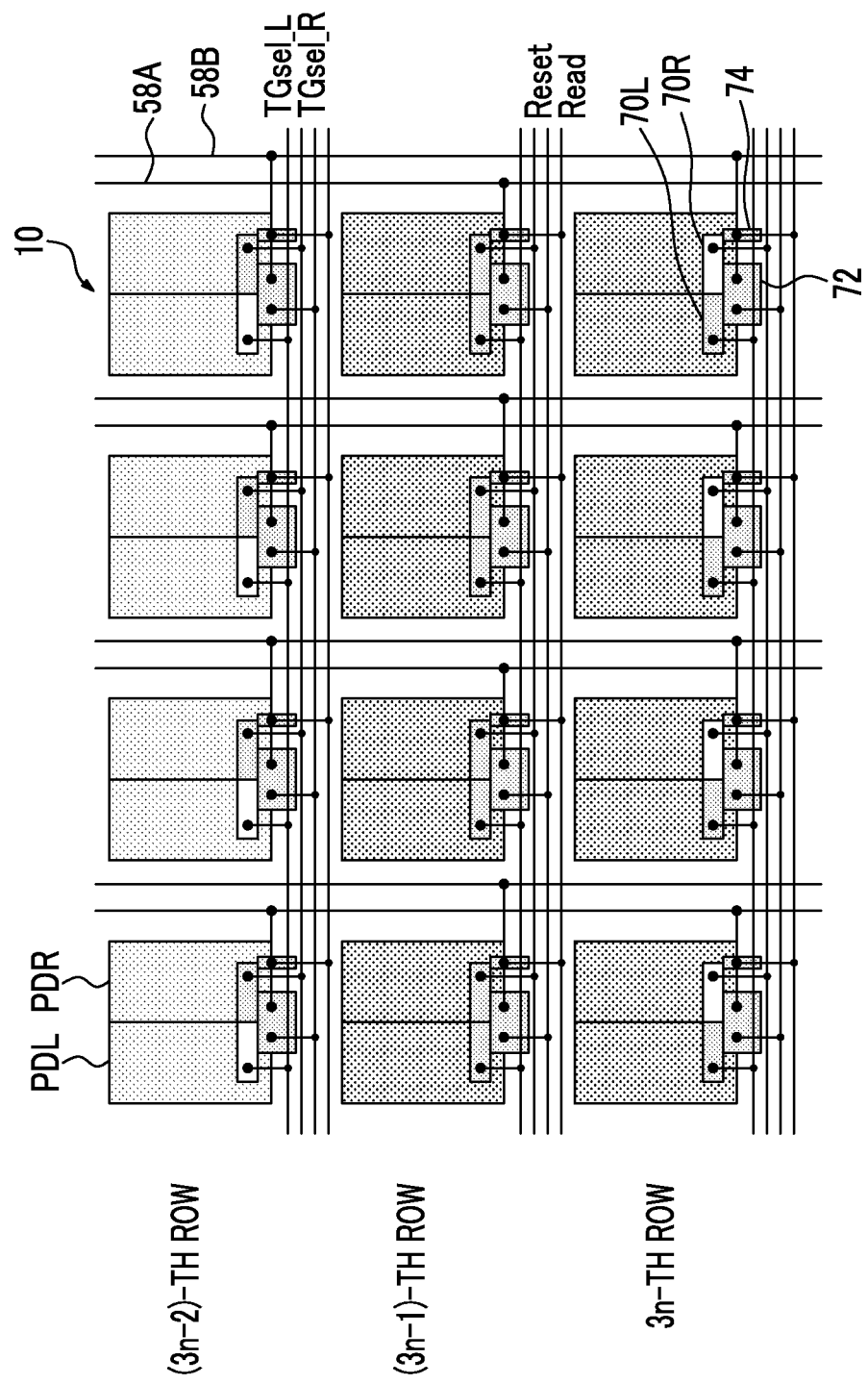
FIG. 28 is a diagram schematically illustrating a reading operation of reading a signal charge from the pixels in the imaging element of the imaging device according to the fifth embodiment.

Then, at the time t7, the signal charges stored in the phase difference pixel and the normal pixel are read. As illustrated in FIG. 28, the control unit 50 reads the signal charge from the photodiodes PDR of the pixels in the (3n−2)-th row, the photodiodes PDL and PDR of the pixels 10 in the (3n−1)-th row, and the photodiodes PDL of the pixels 10 in the 3n-th row. Specifically, the control unit 50 outputs the on signal to the read row selection line Read and the left phase difference pixel photodiode read selection line TGsel_L connected to the pixels 10 in the 3n-th row. In addition, the control unit 50 outputs the off signal to the right phase difference pixel photodiode read selection line TGsel_R and the reset row selection line Reset connected to the pixels 10 in the 3n-th row. As illustrated in FIG. 28, in the pixels 10 in the 3n-th row, the signal charge stored in the photodiode PDL is output to the read signal line 58A or the read signal line 58B by the above-mentioned operation and the signal charge stored in the photodiode PDR is maintained by the above-mentioned operation.

The control unit 50 outputs the on signal to the read row selection line Read and the right phase difference pixel photodiode read selection line TGsel_R connected to the pixels 10 in the (3n−2)-th row. In addition, the control unit 50 outputs the off signal to the left phase difference pixel photodiode read selection line TGsel_L and the reset row selection line Reset connected to the pixels 10 in the (3n−2)-th row. As illustrated in FIG. 28, in the pixels 10 in the (3n−2)-th row, the signal charge stored in the photodiode PDR is output to the read signal line 58A or the read signal line 58B by the above-mentioned operation and the signal charge stored in the photodiode PDL is maintained by the above-mentioned operation.

The control unit 50 outputs the on signal to the read row selection line Read, the left phase difference pixel photodiode read selection line TGsel_L, and the right phase difference pixel photodiode read selection line TGsel_R connected to the pixels 10 in the (3n−1)-th row. In addition, the control unit 50 outputs the off signal to the reset row selection line Reset connected to the pixels 10 in the (3n−1)-th row. As illustrated in FIG. 28, in the pixels 10 in the (3n−1)-th row, the signal charges stored in the photodiodes PDL and PDR are output to the read signal line 58A or the read signal line 58B by the above-mentioned operation.

As illustrated in FIGS. 22 to 24, in the imaging element 20 according to the fifth embodiment in which the exposure time $T_L$ of the left phase difference pixel and the exposure time $T_R$ of the right phase difference pixel in the second frame are from the time t3 to the time t7 and exposure is performed over two frames, the exposure time $T_L$ of the left phase difference pixel and the exposure time $T_R$ of the right phase difference pixel are longer than the period corresponding to one frame. In contrast, the exposure time $T_N$ of the normal pixel is from the time t5 to the time t7. Therefore, the exposure time $T_L$ of the left phase difference pixel and the exposure time $T_R$ of the right phase difference pixel are longer than the exposure time $T_N$ of the normal pixel.

As described above, in the imaging device 100D according to the fifth embodiment, the control unit 50 alternately selects the pixels 10 in the (3n−2)-th row and the pixels 10 in the 3n-th row as the first and third pixel groups for each frame. The pixels 10 in the same row can alternately function as the left phase difference pixels and the right phase difference pixels for each frame. Therefore, it is possible to expose the phase difference pixel over two frames. As a result, it is possible to further increase the exposure time of the phase difference pixel and thus to further improve brightness which is the value of the phase difference pixel.

Sixth Embodiment

In a sixth embodiment, an imaging device which corrects shading characteristics will be described. In the sixth embodiment, the same components as those in the first embodiment are denoted by the same component and the description thereof will not be repeated.

Figure 29:
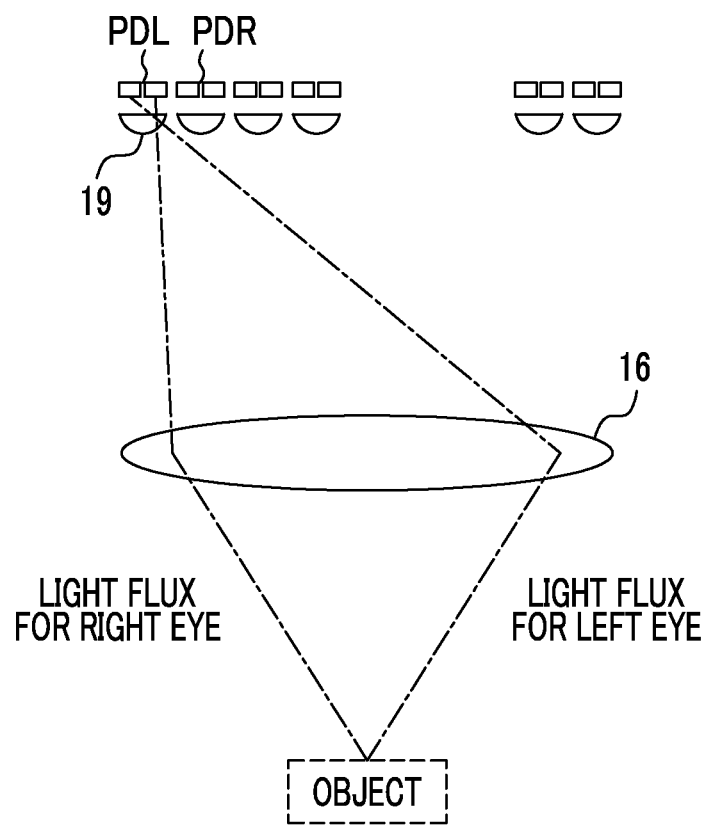
FIG. 29 is a diagram illustrating the principle of shading characteristics by left region passage light and right region passage light (an example of the path of a light flux incident on each of photodiodes PDL and PDR).
Figure 30:
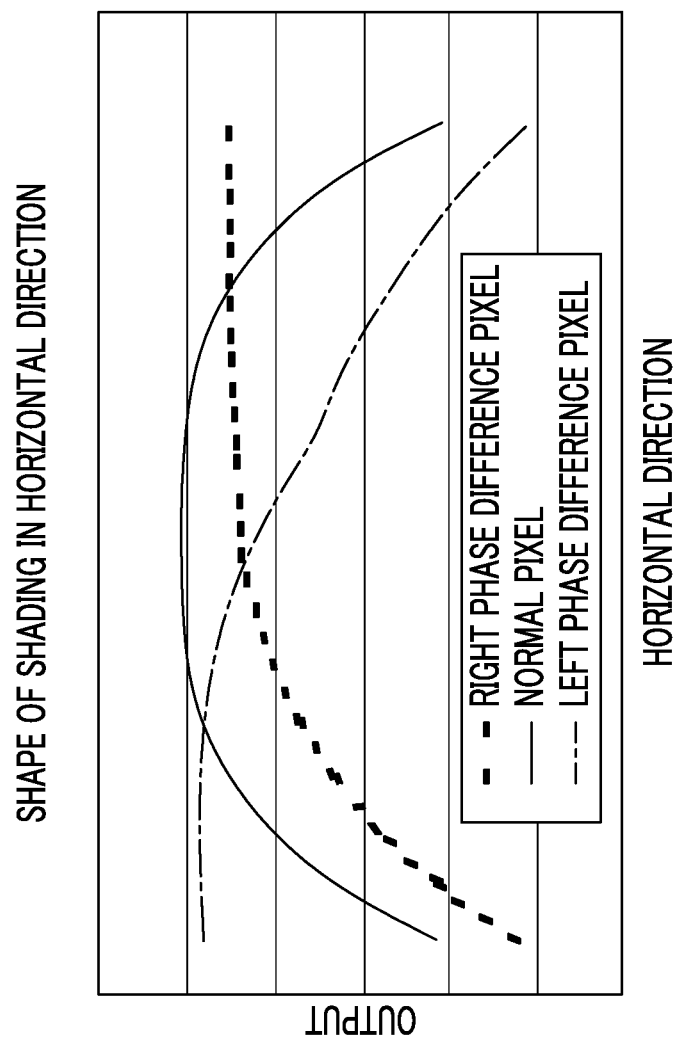
FIG. 30 is a graph illustrating an example of the influence of linear shading characteristics in a pupil division direction on the output of each pixel in a direction corresponding to the pupil division direction in each of a left eye image and a right eye image.

In an imaging device 100E, for example, in a case in which the image of an object is captured as illustrated in FIG. 29, left region passage light which has passed through the imaging lens 16 is incident on the photodiode PDL of the pixel 10 through the microlens 19. However, the left region passage light is not incident on the photodiode PDR of the pixel 10. In contrast, right region passage light which has passed through the imaging lens 16 is incident on the photodiode PDR of the pixel 10 through the microlens 19. However, the right region passage light is not incident on the photodiode PDL of the pixel 10. As such, the left and right photodiodes are individually provided in the pixel 10 and the center of each of the left region passage light and the right region passage light deviates from the optical axis of the imaging lens 16. Therefore, in each pixel 10, the shading characteristics vary linearly depending on the position of the pixel in a pupil division direction. A change in the shading characteristics appears as a change in the output of the left eye image and the right eye image. That is, the output of the left eye image and the right eye image, which are obtained in case a uniform amount of light is incident on the imaging lens 16 from the front side, in the left-right direction (a direction corresponding to the pupil division direction) varies linearly depending on the position of the pixel. For example, as illustrated in FIG. 30, the output of the left eye image is reduced as the position of the pixel becomes closer to the right side and the output of the right eye image is reduced as the position of the pixel becomes closer to the left side. The linear changes in the outputs of the left eye image and the right eye image, which are opposite to each other in the left-right direction, have an effect on the quality of a split image.

Figure 31:
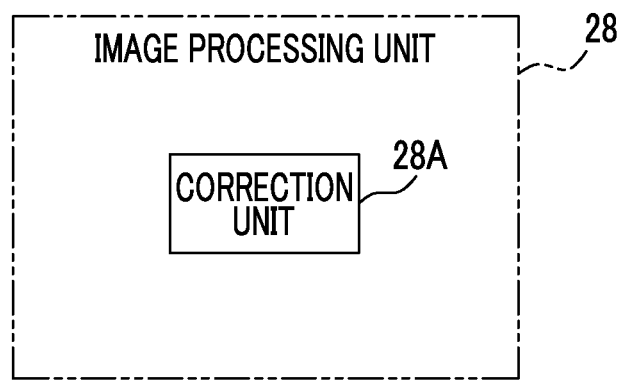
FIG. 31 is a block diagram illustrating an example of the function of a main portion of the imaging device according to the sixth embodiment of the invention.

In the imaging device 100E according to the sixth embodiment, for example, as illustrated in FIG. 31, an image processing unit 28 includes a correction unit 28A and corrects the shading characteristics of a phase difference image. The correction unit 28A acquires a frame and corrects the shading characteristics of the phase difference pixel on the basis of the result of the comparison between the value of a phase difference pixel in the phase difference image and the value of a normal pixel in a normal image. The comparison result obtained by the correction unit 28A may be calculated using an arithmetic expression or a table. In the sixth embodiment, for example, the correction unit 28A calculates the proportion of the value of the left phase difference pixel to the value of the normal pixel as the ratio of the left phase difference pixel to the normal pixel and uses the calculated ratio as the gain of the left phase difference pixel to correct the shading characteristics. In addition, in the sixth embodiment, for example, the correction unit 28A calculates the proportion of the value of the right phase difference pixel to the value of the normal pixel as the ratio of the right phase difference pixel to the normal pixel and uses the calculated ratio as the gain of the right phase difference pixel to correct the shading characteristics.

In the sixth embodiment, the shading characteristics indicate, for example, linear shading characteristics which appear in the right eye image and the left eye image in each direction along the pupil division direction due to the deviation of the center of the light flux that passes through a pair of regions of the imaging lens 16 from the optical axis of the lens. In addition, the correction of the shading characteristics means, for example, the correction of the shading characteristics which appear in a left eye image for display and a right eye image for display, as illustrated in FIG. 34.

Next, as the operation of the imaging device 100E according to the sixth embodiment, image processing performed by the image processing unit 28 will be described. As described above, the imaging device 100E according to the sixth embodiment differs from the imaging device 100 according to the first embodiment in image processing. The image processing performed by the imaging device 100E according to the sixth embodiment includes a correction process of correcting the shading characteristics.

Figure 32:
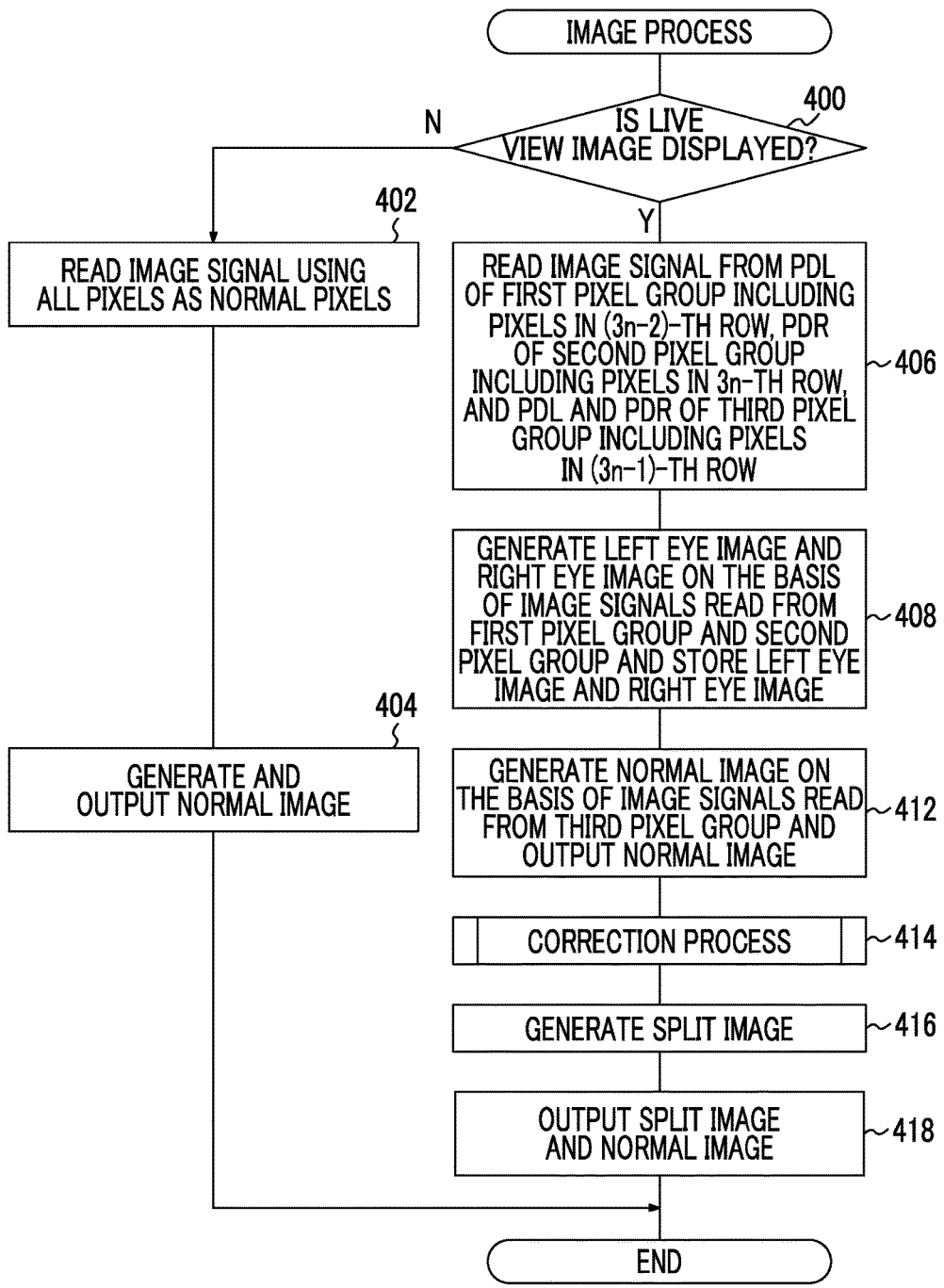
FIG. 32 is a flowchart illustrating an example of the flow of image processing according to the sixth embodiment.

FIG. 32 is a flowchart illustrating an example of the flow of the image processing according to the sixth embodiment. The process from Step 400 to Step 408 is the same as that in the image processing according to the first embodiment and thus the detailed description thereof will not be repeated.

In the image processing according to the sixth embodiment, in a case in which a live view image is displayed, in Step 406, the control unit 50 reads electric signals corresponding to the signal charges generated in the photodiodes PDL in the first pixel group which includes the pixels 10 in the (3n−2)-th (n is a natural number equal to or greater than 1) row. In addition, the control unit 50 reads electric signals corresponding to the signal charges generated in the photodiodes PDR in the second pixel group which includes the pixels 10 in the 3n-th row. The control unit 50 reads electric signals corresponding to the signal charges generated in the photodiodes PDL and PDR in the third pixel group which includes the pixels 10 in the (3n−1)-th row.

Then, in Step 408, the image processing unit 28 generates a left eye image and a right eye image on the basis of the image signals read from the first pixel group and the second pixel group and stores (overwrites and saves) the left eye image and the right eye image in a parallax image storage area (not illustrated) of the primary storage unit 25. In the image processing according to the sixth embodiment, after Step 408, the proceeds to Step 412.

In Step 412, the image processing unit 28 generates a normal image on the basis of the image signals read from the third pixel group and stores (overwrites and saves) the normal image in the parallax image storage area (not illustrated) of the primary storage unit 25.

Figure 33:
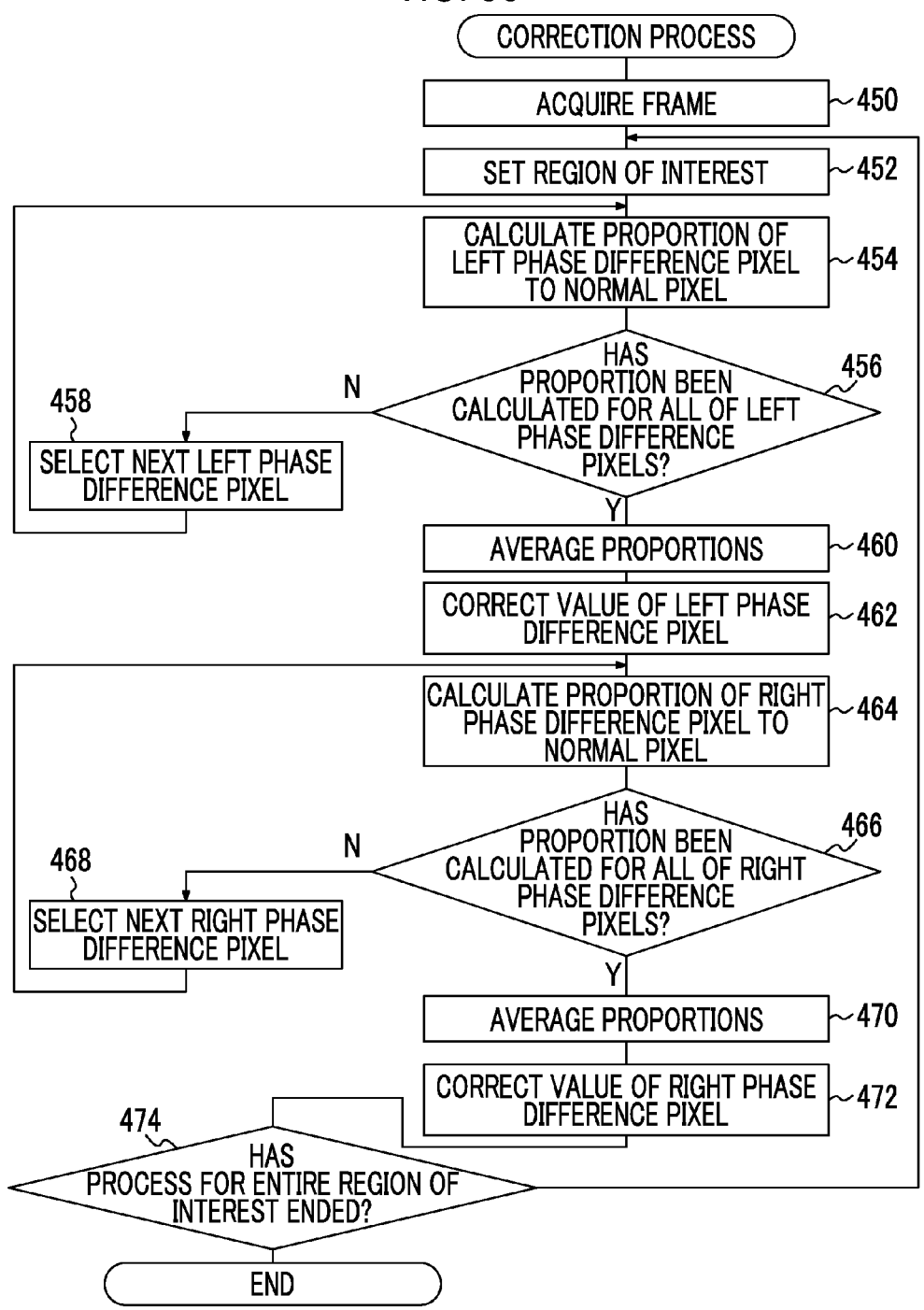
FIG. 33 is a flowchart illustrating an example of the flow of a correction process in the image processing according to the sixth embodiment.

Then, in Step 414, the correction unit 28A of the image processing unit 28 performs the correction process. FIG. 33 is a flowchart illustrating an example of the flow of the correction process performed by the correction unit 28A.

In Step 450, the correction unit 28A acquires a frame from the parallax image storage area of the primary storage unit 25.

Then, in Step 452, the correction unit 28A sets a region of interest. In the sixth embodiment, the correction unit 28A divides the phase difference image and the normal image into a plurality of regions of interest and corrects the shading characteristics in each of the divided regions of interest. In Step 452, the correction unit 28A sets one region of interest in which the shading characteristics are to be corrected among the plurality of divided region of interest. For example, the size of the region of interest and the number of regions of interest are predetermined according to the processing speed and characteristics of the imaging device 100E.

Then, in Step 454, the correction unit 28A calculates the proportion of the left phase difference pixel to the normal pixel. In the sixth embodiment, the correction unit 28A corrects the shading characteristics using the normal pixel adjacent to the left phase difference pixel. In Step 454, the correction unit 28A corrects the shading characteristics, using the normal pixel which is adjacent to one left phase difference pixel selected from the region of interest in the row direction. For example, in the example illustrated in FIG. 14, the correction unit 28A calculates the proportion of the left phase difference pixel which is arranged in the fourth row and the third column to the normal pixel which is arranged in the fifth row and the third column. Since the control unit 50 selects the first, second, and third pixel groups for each pixel row, the normal pixel is adjacent to the left phase difference pixel in the column direction.

Then, in Step 456, the correction unit 28A determines whether the proportion has been calculated for all of the left phase difference pixels in the region of interest. In a case in which the left phase difference pixel, of which the proportion has not been calculated in Step 454, remains in the region of interest, the determination result is "No" and the process proceeds to Step 458. In Step 458, the next left phase difference pixel is selected and the process returns to Step 454. The process in Step 454 and Step 456 is repeatedly performed.

On the other hand, in a case in which it is determined in Step 456 that the proportion has been calculated for all of the left phase difference pixels in the region of interest in Step 454, the determination result is "Yes" and the process proceeds to Step 460.

In Step 460, the correction unit 28A averages the calculated proportions to calculate the mean of the proportions. Then, in Step 462, the correction unit 28A corrects the values of the left phase difference pixels in the region of interest, on the basis of the mean calculated in Step 460. In the sixth embodiment, the correction unit 28A multiplies the value of each left phase difference pixel in the region of interest by the mean calculated in Step 460 as a gain to correct the pixel values. The shading characteristics of the left phase difference pixels in the region of interest are corrected by the above-mentioned correction process (so-called shading correction is performed). The values of the left phase difference pixels, of which the shading characteristics have been corrected, are temporarily stored (overwritten and saved) in the parallax image storage area (not illustrated) of the primary storage unit 25.

When the shading characteristics of the left phase difference pixels in the region of interest are corrected in Steps 454 to 462, the shading characteristics of the right phase difference pixels in the region of interest are similarly corrected.

In Step 464, the correction unit 28A calculates the proportion of the right phase difference pixel to the normal pixel. In the sixth embodiment, the correction unit 28A corrects the shading characteristics using the normal pixel adjacent to the right phase difference pixel. In Step 464, the correction unit 28A corrects the shading characteristics, using the normal pixel which is adjacent to one right phase difference pixel selected from the region of interest in the row direction. For example, in the example illustrated in FIG. 14, the correction unit 28A calculates the proportion of the right phase difference pixel which is arranged in the third row and the third column to the normal pixel which is arranged in the second row and the third column. Since the control unit 50 selects the first, second, and third pixel groups for each pixel row, the normal pixel is adjacent to the right phase difference pixel in the column direction.

Then, in Step 466, the correction unit 28A determines whether the proportion has been calculated for all of the right phase difference pixels in the region of interest. In a case in which the right phase difference pixel, of which the proportion has not been calculated in Step 464, remains in the region of interest, the determination result is "No" and the process proceeds to Step 468. In Step 468, the next right phase difference pixel is selected and the process returns to Step 464. The process in Step 464 and Step 466 is repeatedly performed.

On the other hand, in a case in which it is determined in Step 466 that the proportion has been calculated for all of the left phase difference pixels in the region of interest in Step 464, the determination result is "Yes" and the process proceeds to Step 470.

In Step 470, the correction unit 28A averages the calculated proportions to calculate the mean of the proportions. Then, in Step 472, the correction unit 28A corrects the values of the right phase difference pixels in the region of interest, on the basis of the mean calculated in Step 470. In the sixth embodiment, the correction unit 28A multiplies the value of each right phase difference pixel in the region of interest by the mean calculated in Step 470 as a gain to correct the pixel values. The shading characteristics of the right phase difference pixels in the region of interest are corrected by the above-mentioned correction process (so-called shading correction is performed). The values of the right phase difference pixels, of which the shading characteristics have been corrected, are temporarily stored (overwritten and saved) in the parallax image storage area (not illustrated) of the primary storage unit 25.

Then, in Step 474, the correction unit 28A determines whether the process from Step 452 to Step 472 for all of the regions of interest has ended. In a case in which there is a region of interest which has not been subjected to the process from Step 452 to Step 472, the process returns to Step 452 and the process from Step 452 to Step 472 is repeatedly performed. On the other hand, if the process from Step 452 to Step 472 for all of the regions of interest has ended, the correction process ends since the shading characteristics of all of the phase difference pixels have been corrected. Then, the process proceeds to Step 416 which is an image processing step.

In Step 416, in the image processing unit 28, a split image processing unit 32 generates a split image on the basis of the left eye image and the right eye image. Since the right eye image and the left eye image, of which the shading characteristics have been corrected by the above-mentioned correction process, are stored in the parallax image storage area of the primary storage unit 25, the split image processing unit 32 generates the split image on the basis of the right eye image and the left eye image stored in the parallax image storage area of the primary storage unit 25.

Then, in Step 418, the image processing unit 28 outputs the split image which has been generated in Step 416 and the normal image which has been generated in Step 412 and then stored (overwritten and saved) in the parallax image storage area (not illustrated) of the primary storage unit 25 to the display control unit 36 and ends the image processing. When the split image and the normal image are input, the display control unit 36 performs control such that the display device continuously displays the normal image as a moving image and continuously displays the split image as a moving image in the display region of the normal image. Then, for example, as illustrated in FIG. 12, the display device displays a live view image.

As such, the photographer can check a focus state, using the split image displayed on the display device. In addition, in the manual focus mode, the photograph can operate the focus ring 301 to adjust the amount of out-of-focus (the amount of defocus) to zero.

In a case in which the correction unit 28A corrects the shading characteristics of the split image, for example, a linear change in the brightness of a parallax image for display due to a linear change in the sensitivity of each phase difference pixel in the pupil division direction is reduced, as illustrated in FIG. 34.

As described above, in the imaging device 100E, the image processing unit 28 includes the correction unit 28A. The correction unit 28A calculates the proportion of the value of the phase difference pixel to the value of the normal pixel and corrects the value of each phase difference pixel value, using the calculated proportion as the gain. Therefore, it is possible to display a live view image including the split image, of which the shading characteristics have been corrected, on the display device.

In the sixth embodiment, the correction unit 28A corrects the shading characteristics, using the normal pixel adjacent to the phase difference pixel. Therefore, it is possible to improve the accuracy of correction, as compared to a case in which the normal pixel that is far away from the phase difference pixel is used.

In the sixth embodiment, the correction unit 28A corrects the shading characteristics of the phase difference pixel, using the proportion of the value of the phase difference pixel to the value of the normal pixel. However, the invention is not limited thereto. For example, the correction unit 28A may correct the shading characteristics of the phase difference pixel, using the difference between the value of the normal pixel and the value of the phase difference pixel. In addition, the use of the proportion of the value of the phase difference pixel to the value of the normal pixel as in the sixth embodiment is more preferable than the use of the difference between the pixel values, in order to appropriately correct the shading characteristics.

Seventh Embodiment

In each of the above-described embodiments, the imaging devices 100, 100A, 100B, 100C, 100D, and 100E are given as an example. However, for example, a mobile phone or a smart phone with a camera function may be given as an example of a portable terminal apparatus which is a modification example of the imaging devices 100, 100A, 100B, 100C, 100D, and 100E. In addition, for example, a personal digital assistant (PDA) or a portable game machine is given as an example of the portable terminal apparatus. In a seventh embodiment, the smart phone will be described in detail as an example with reference to the drawings.

Figure 35:
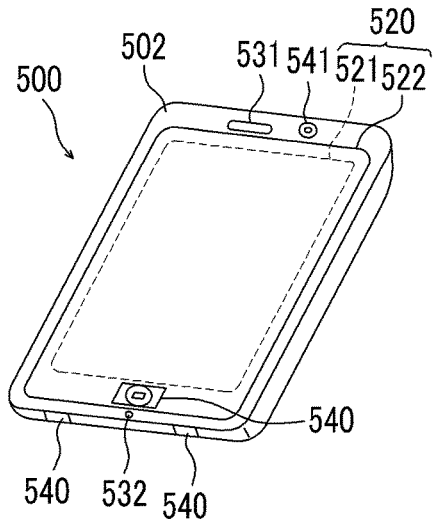
FIG. 35 is a perspective view illustrating an example of the outward appearance of a smart phone according to a seventh embodiment.

FIG. 35 is a perspective view illustrating an example of the outward appearance of a smart phone 500. The smart phone 500 illustrated in FIG. 35 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding mechanism.

Figure 36:
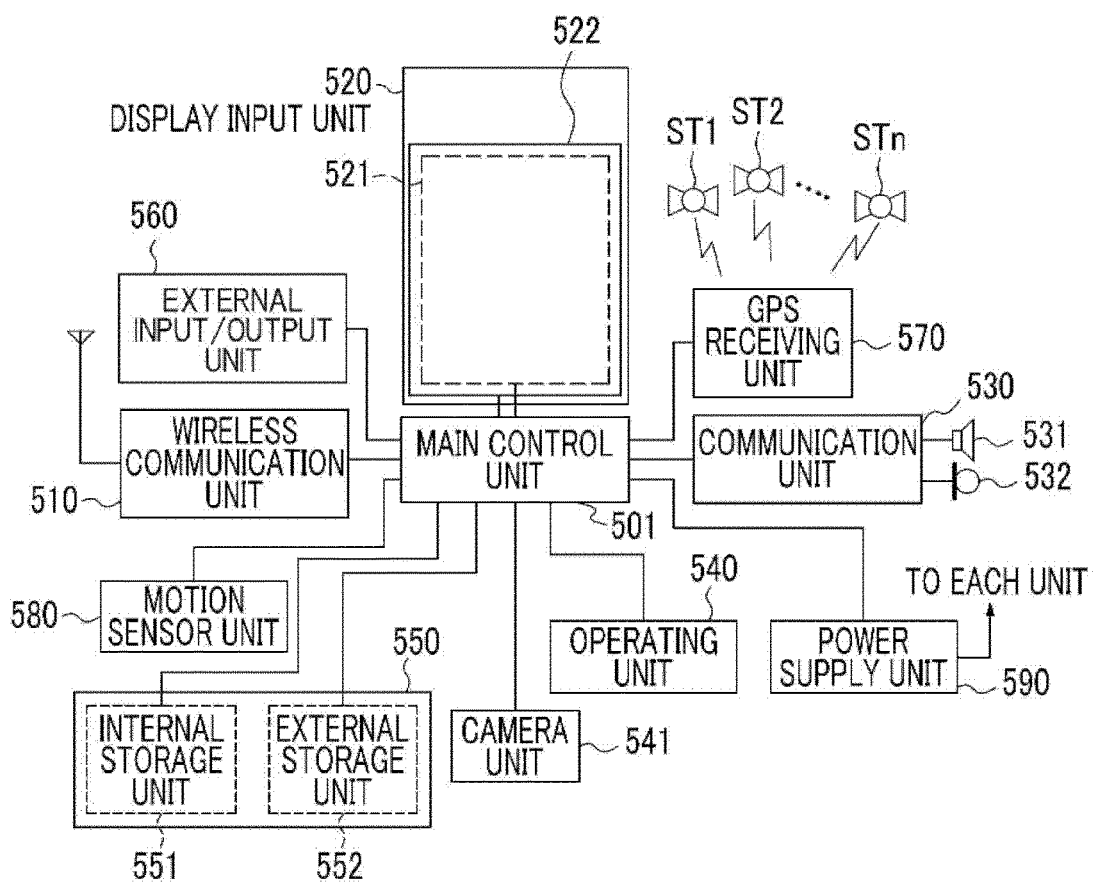
FIG. 36 is a block diagram illustrating an example of the structure of a main portion of an electrical system of the smart phone according to the seventh embodiment.

FIG. 36 is a block diagram illustrating an example of the structure of the smart phone 500 illustrated in FIG. 35. As illustrated in FIG. 36, the smart phone 500 includes, as main components, a wireless communication unit 510, the display input unit 520, a communication unit 530, the operating unit 540, the camera unit 541, a storage unit 550, and an external input/output unit 560. In addition, the smart phone 500 includes, as main components, a global positioning system (GPS) receiving unit 570, a motion sensor unit 580, a power supply unit 590, and a main control unit 501. The smart phone 500 has, as a main function, a wireless communication function which performs mobile wireless communication through a base station apparatus BS and a mobile communication network NW.

The wireless communication unit 510 performs wireless communication with the base station apparatus BS which is accommodated in the mobile communication network NW in response to an instruction from the main control unit 501. The wireless communication is used to transmit and receive various types of file data, such as voice data and image data, and electronic mail data or to receive, for example, web data and streaming data.

The display input unit 520 is a so-called touch panel and includes the display panel 521 and the operation panel 522. Therefore, the display input unit 520 displays, for example, images (still images and moving images) or text information to visually transmit information to the user and detects the user's operation for the displayed information under the control of the main control unit 501. It is preferable that the display panel 521 is a 3D display panel in a case in which a generated 3D image is viewed.

The display panel 521 uses, for example, a liquid crystal display (LCD) or an organic electro-luminescence display (OELD) as a display device. The operation panel 522 is a device that is provided such that an image displayed on a display surface of the display panel 521 is visually recognized and detects one or a plurality of coordinate points selected by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 36, the display panel 521 and the operation panel 522 of the smart phone 500 are integrated to form the display input unit 520 and the operation panel 522 is arranged so as to completely cover the display panel 521. In a case in which this arrangement is used, the operation panel 522 may have a function of detecting the user's operation even in a region other than the display panel 521. In other words, the operation panel 522 may include a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may include two sensitive regions, that is, an outer edge portion and an inner portion other than the outer edge portion. The width of the outer edge portion is appropriately designed according to, for example, the size of the housing 502. Examples of a position detecting method which is used in the operation panel 522 include a matrix switching method, a resistive film method, a surface elastic wave method, an infrared method, an electromagnetic induction method, and a capacitive sensing method. Any of the methods may be used.

The communication unit 530 includes the speaker 531 and the microphone 532. The communication unit 530 converts the voice of the user which is input through the microphone 532 into voice data which can be processed by the main control unit 501 and outputs the converted voice data to the main control unit 501. In addition, the communication unit 530 decodes voice data received by the wireless communication unit 510 or the external input/output unit 560 and outputs the decoded voice data from the speaker 531. As illustrated in FIG. 36, for example, the speaker 531 can be mounted on the same surface as the display input unit 520 and the microphone 532 can be mounted on a lower portion of the front surface of the housing 502.

The operating unit 540 is a hardware key which uses, for example, a key switch and receives instructions from the user. For example, as illustrated in FIG. 35, the operating unit 540 is a push button switch which is mounted on the lower portion of the front surface of the housing 502 of the smart phone 500, is turned on when it is pressed by, for example, a finger, and is turned off by the restoring force of a spring when the finger is taken off.

The storage unit 550 stores a control program or control data of the main control unit 501, application software, address data which is associated with, for example, the names or phone numbers of communication partners, and transmitted and received electronic mail data. In addition, the storage unit 550 stores web data which is downloaded by web browsing or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory or a hard disk. Examples of the storage medium can include a multimedia-card-micro-type memory, a card-type memory (for example, a MicroSD (registered trademark) memory), a random access memory (RAM), and a read only memory (ROM).

The external input/output unit 560 functions as an interface with all of the external apparatuses connected to the smart phone 500 and is directly or indirectly connected to other external apparatuses by communication or a network. Examples of the communication with other external apparatuses include universal serial bus (USB) communication and IEEE1394. Examples of the network include the Internet, a wireless LAN, a Bluetooth (registered trademark) network, a radio frequency identification (RFID) network, and an infrared data association (IrDA (registered trademark)) network. In addition, other examples of the network include an ultra wideband (UWB: registered trademark) network and a ZigBee (registered trademark) network.

Examples of the external apparatus connected to the smart phone 500 include a wired/wireless headset, a wired/wireless external charger, a wired/wireless data port, and a memory card which is connected through a card socket. Other examples of the external apparatus include a subscriber identity module (SIM) card/user identity module (UIM) card and an external audio/video apparatus which is connected through an audio/video input/output (I/O) terminal. In addition to the external audio/video apparatus, a wirelessly connected external audio/video apparatus may be given as an example of the external apparatus. For example, a smart phone which is connected wirelessly or in a wired manner, a personal computer which is connected wirelessly or in a wired manner, a PDA which is connected wirelessly or in a wired manner, and an earphone which is connected wirelessly or in a wired manner can be applied, instead of the external audio/video apparatus.

The external input/output unit 560 can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of the received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, the wireless LAN), it can detect the position using the positional information.

The motion sensor unit 580 includes, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 includes a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control for detecting the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540 or to receive an operation for the icon or the input of a character string to an input field of the window through the operation panel 522. In addition, the main control unit 501 performs the operation detection control to receive a request to scroll the displayed image through the scroll bar.

In addition, the main control unit 501 performs the operation detection control to determine whether the position of an operation for the operation panel 522 is an overlap portion (display region) which overlaps the display panel 521 or an outer edge portion (non-display region) which does not overlap the display panel 521 other than the overlap portion. The main control unit 501 has a touch panel control function that receives the determination result and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a CMOS or a CCD, and has the same functions as the imaging device 100 illustrated in FIG. 1.

The camera unit 541 can switch the operation mode between the manual focus mode and the automatic focus mode. When the manual focus mode is selected, the user can operate, for example, a focus icon button displayed on the operating unit 540 or the display input unit 520 to focus the imaging lens of the camera unit 541. In the manual focus mode, a live view image having a split image combined therewith is displayed on the display panel 521 such that the user can check a focus state in the manual focus mode. In addition, the hybrid finder 220 illustrated in FIG. 10 may be provided in the smart phone 500.

The camera unit 541 converts captured image data into image data which is compressed in, for example, a joint photographic coding experts group (JPEG) format under the control of the main control unit 501. Then, the camera unit 541 records the converted image data in the storage unit 550 or outputs the converted image data through the external input/output unit 560 or the wireless communication unit 510. As illustrated in FIG. 36, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. In case in which a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

For example, various kinds of information may be added to the image data of a still image or a moving image and the image data may be stored in the storage unit 550 or may be output through the external input/output unit 560 or the wireless communication unit 510. The "various kinds of information" include the positional information which is acquired by the GPS receiving unit 570 and the voice information which is acquired by the microphone 532 (for example, the main control unit may convert the voice information into text information using voice-text conversion). In addition, the "various kinds of information" include, for example, the posture information which is acquired by the motion sensor unit 580.

In each of the above-described embodiments, the split image is divided into two images in the up-down direction. However, the invention is not limited thereto. The split image may be divided into a plurality of images in the left-right direction or the oblique direction.

Figure 37:
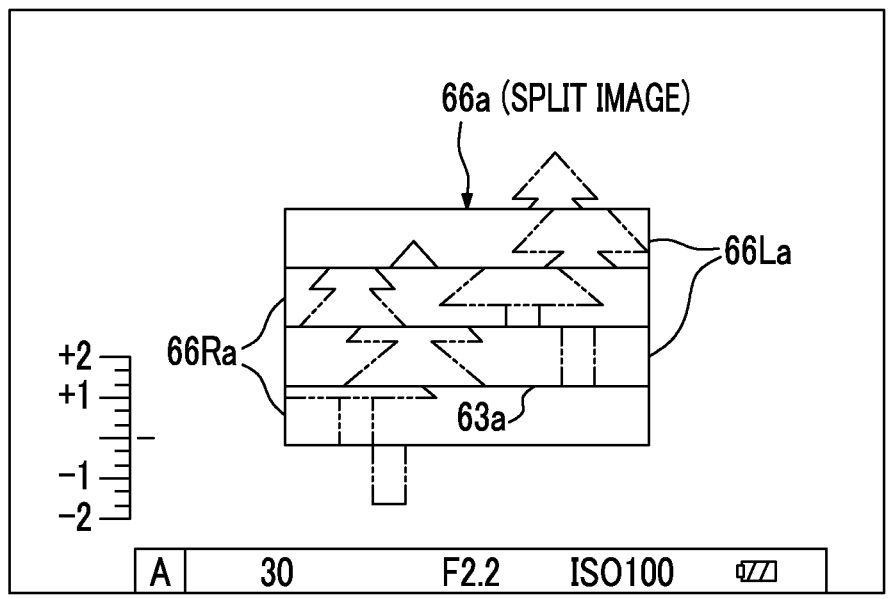
FIG. 37 is a diagram schematically illustrating a modification example of the split image according to the first to seventh embodiments in which a first image and a second image are divided into odd-numbered lines and even-numbered lines and the odd-numbered lines and the even-numbered lines are alternately arranged.

For example, a split image 66a illustrated in FIG. 37 is divided into odd-numbered lines and even-numbered lines by a plurality of boundary lines 63a which are parallel to each other in the row direction. In the split image 66a, a linear (for example, a strip-shaped) phase difference image 66La which is generated on the basis of an output signal from the first pixel group is displayed in the odd-numbered line (can also be displayed in the even-numbered line). In addition, a linear (for example, a strip-shaped) phase difference image 66Ra which is generated on the basis of an output signal from the second pixel group is displayed in the even-numbered line.

Figure 38:
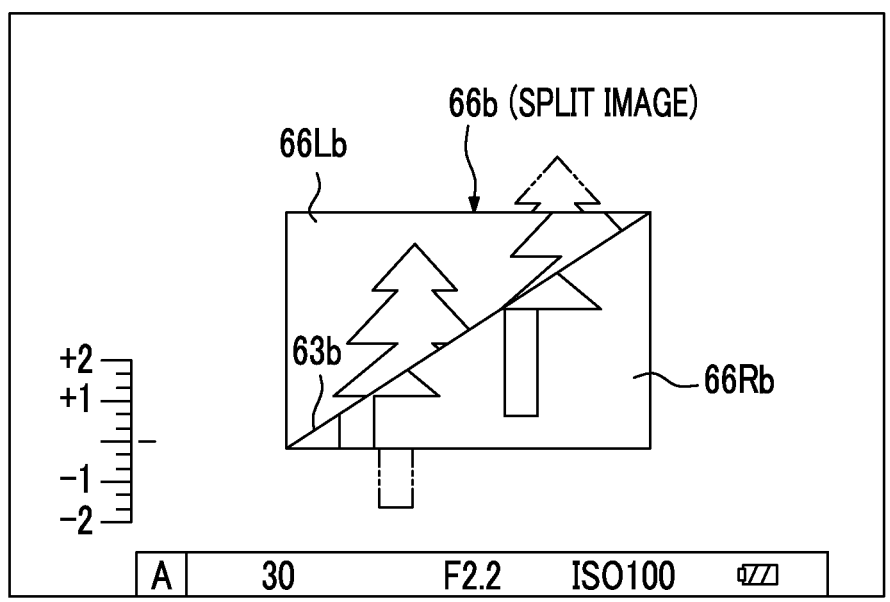
FIG. 38 is a diagram schematically illustrating a modification example of the split image according to the first to seventh embodiments which is divided by an oblique boundary line that is inclined with respect to a row direction.

A split image 66b illustrated in FIG. 38 is divided into two images by a boundary line 63b (for example, a diagonal line of the split image 66b) which has an angle of inclination in the row direction. In the split image 66b, a phase difference image 66Lb which is generated on the basis of an output signal from the first pixel group is displayed in one region. In addition, a phase difference image 66Rb which is generated on the basis of an output signal from the second pixel group is displayed in the other region.

Figure 39A:
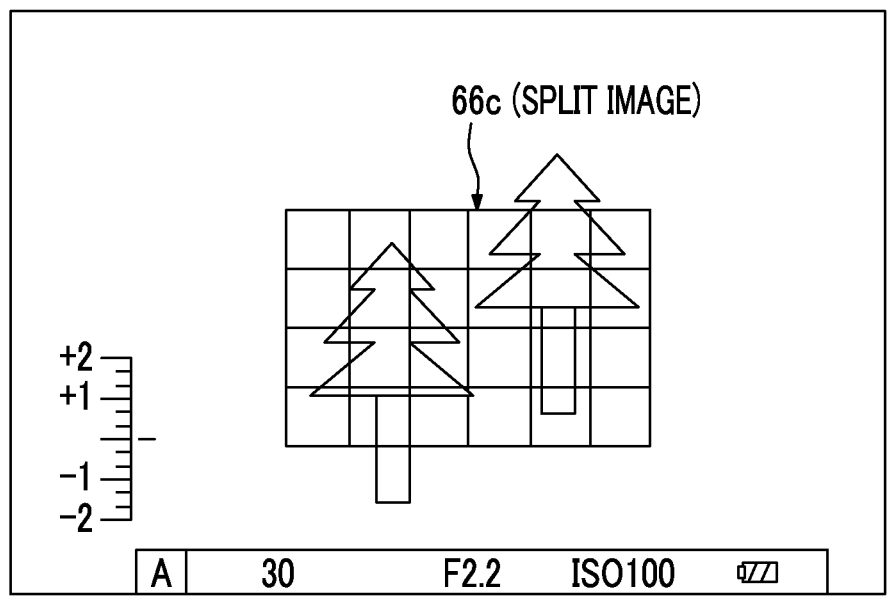
FIG. 39A is a diagram schematically illustrating a modification example of the split image according to the first to seventh embodiments which is divided by lattice-shaped boundary lines.
Figure 39B:
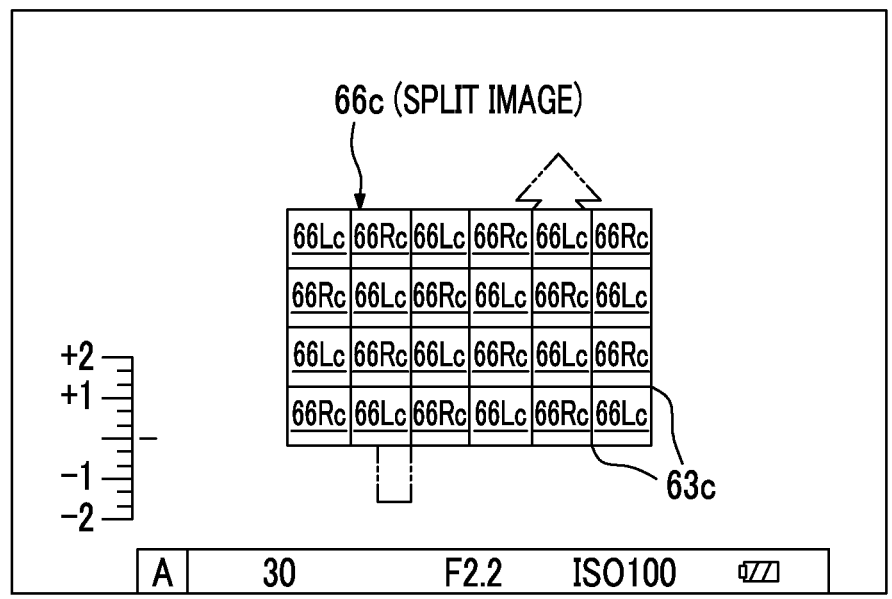
FIG. 39B is a diagram schematically illustrating a modification example of the split image according to the first to seventh embodiments which is formed in a checkered pattern.

A split image 66c illustrated in FIGS. 39A and 39B is divided by lattice-shaped boundary lines 63c which are parallel in the row direction and the column direction. In the split image 66c, phase difference images 66Lc which are generated on the basis of an output signal from the first pixel group are arranged in a checkered pattern and then displayed. In addition, phase difference images 66Rc which are generated on the basis of an output signal from the second pixel group are arranged in a checkered pattern and then displayed.

The split image is not limited thereto. A different focus check image may be generated from two phase difference images and then displayed. For example, two phase difference images may be superimposed and a composite image may be displayed. In a case in which the image is out of focus, it may be displayed as a double image. In a state in which the image is in focus, it may be clearly displayed.

In each of the above-described embodiments, in a case in which the first to third images are input to the image processing unit 28, both the normal image and the split image are displayed on the same screen of the display device at the same time. However, the invention is not limited thereto. For example, the display control unit 36 may perform control such that the continuous display of the normal images as a moving image on the display device is prevented and the split images are continuously displayed as a moving image on the display device. Here, the term "preventing the display of the normal image" means, for example, that no normal image is displayed on the display device. Specifically, the term "preventing the display of the normal image" means that the normal image is generated, but is not output and displayed on the display device or that the normal image is not generated and displayed on the display device. The entire screen of the display device may be used to display the split image. For example, the entire display region of the split image illustrated in FIG. 12 may be used to display the split image. Here, an example of the "split image" can be a split image based on the image output from the phase difference pixel group (for example, the first image output from the first pixel group and the second image output from the second pixel group) in a case in which a specific imaging element is used. An example of the "case in which the specific imaging element is used" is a case in which an imaging element including only the phase difference pixel group (for example, the first pixel group and the second pixel group) is used. Another example of the "case in which the specific imaging element is used" can be a case in which an imaging element in which the ratio of the phase difference pixels (for example, the first pixel group and the second pixel group) to the normal pixels is a predetermined value is used.

Various conditions are considered as the conditions for preventing the display of the normal image and displaying the split image. For example, in a case in which an instruction to display the normal image is cancelled with the display of the split image being instructed, the display control unit 36 may perform control such that the display device does not display the normal image and displays the split image. In addition, for example, in a case in which the user looks through the hybrid finder, the display control unit 36 may perform control such that display device does not display the normal image and displays the split image. For example, in a case in which the release button 211 is in the halfway pressed state, the display control unit 36 may perform control such that the display device does not display the normal image and displays the split image. For example, in a case in which an operation of pressing the release button 211 is not performed, the display control unit 36 may perform control such that the display device does not display the normal image and displays the split image. For example, in a case in which a face detection function which detects the face of the object is performed, the display control unit 36 may perform control such that the display device does not display the normal image and displays the split image. Here, the modification example in which the display control unit 36 prevents the display of the normal image has been described. However, the invention is not limited thereto. For example, the display control unit 36 may perform control such that the entire split image is overwritten on the normal image.

EXPLANATION OF REFERENCES

16: imaging lens
20: imaging element

22: device control unit
28: image processing unit
50: control unit
100, 100A, 100B, 100C, 100D, 100E: imaging device

What is claimed is:

1. An image processing device comprising:
a control unit that reads a first image signal from pixels which are selected as a first pixel group among a plurality of pixels, each of which includes an output unit that selectively outputs any one of the first image signal, a second image signal, and a third image signal obtained by adding the first and second image signals which are obtained from an object image that passes through first and second regions of an imaging lens, is pupil-divided, and is formed, reads the second image signal from pixels which are selected as a second pixel group among the plurality of pixels, and reads the third image signal from pixels which are selected as a third pixel group among the plurality of pixels,
wherein the plurality of pixels are two-dimensionally arranged, and
the control unit selects the pixels in units of rows as the first, second, and third pixel groups among the plurality of pixels which are two-dimensionally arranged, and interchanges the pixels which are selected as the first and second pixel groups for each frame.

2. The image processing device according to claim 1, further comprising:
a processor configured to
generate a first display image which is used to check a focus and in which first divided images that are some of a plurality of divided images obtained by dividing a first image based on the first image signal in a predetermined division direction and second divided images that correspond to divided regions adjacent to divided regions corresponding to the first divided images among a plurality of divided images obtained by dividing a second image based on the second image signal in the division direction are arranged so as to be adjacent to each other in the division direction.

3. The image processing device according to claim 2, wherein the processor further generates a second display image which is used to check an imaging range, on the basis of the third image signal.

4. The image processing device according to claim 2, wherein the control unit performs control such that an exposure time of the pixel in the first and second pixel groups is longer than an exposure time of the pixel in the third pixel group.

5. The image processing device according to claim 1, wherein color filters of three primary colors are provided in a Bayer array in the plurality of pixels, and
when n is a natural number equal to or greater than 1, the control unit selects pixels in a (3n−2)-th row, pixels in a (3n−1)-th row, and pixels in a 3n-th row as any one of the first, second, or third pixel groups, respectively.

6. The image processing device according to claim 5, wherein, when n is a natural number equal to or greater than 1, the control unit selects the pixels in the (3n−2)-th row as one of the first and second pixel groups, selects the pixels in the (3n−1)-th row as the third pixel group, and selects the pixels in the 3n-th row as the other of the first and second pixel groups.

7. The image processing device according to claim 6, wherein, when m is a natural number equal to or greater than 1, the control unit selects the pixels in a (3m−2)-th column as the first, second, and third pixel groups.

8. The image processing device according to claim 6, wherein, when m is a natural number equal to or greater than 1, the control unit selects the pixels as the first, second, and third pixel groups such that the pixels in the same row and (3m−2)-th and 3m-th columns form one pixel unit.

9. The image processing device according to claim 5, wherein, when m is a natural number equal to or greater than 1, the control unit selects the pixels in a (3m−2)-th column as the first, second, and third pixel groups.

10. The image processing device according to claim 5, wherein, when m is a natural number equal to or greater than 1, the control unit selects the pixels as the first, second, and third pixel groups such that the pixels in the same row and (3m−2)-th and 3m-th columns form one pixel unit.

11. The image processing device according to claim 5, wherein the control unit selects all rows of the plurality of pixels which are two-dimensionally arranged as any one of the first, second, or third pixel groups, respectively.

12. The image processing device according to claim 1, wherein, when m is a natural number equal to or greater than 1, the control unit selects the pixels in a (3m−2)-th column as the first, second, and third pixel groups.

13. The image processing device according to claim 1, wherein, when m is a natural number equal to or greater than 1, the control unit selects the pixels as the first, second, and third pixel groups such that the pixels in the same row and (3m−2)-th and 3m-th columns form one pixel unit.

14. The image processing device according to claim 1, wherein the control unit performs control such that an exposure time of the pixel in the first and second pixel groups is longer than an exposure time of the pixel in the third pixel group.

15. The image processing device according to claim 1, wherein the control unit performs control such that the exposure time of the pixel in the first and second pixel groups is twice as long as the exposure time of the pixel in the third pixel group.

16. The image processing device according to claim 1, wherein, when k is a natural number equal to or greater than 1, the control unit selects the pixels, which are selected as the first pixel group in a k-th frame, as the second pixel group in a (k+1)-th frame, selects the pixels, which are selected as the second pixel group in the k-th frame, as the first pixel group in the (k+1)-th frame, and selects the pixels, which are selected as the third pixel group in the k-th frame, as the third pixel group in the (k+1)-th frame.

17. The image processing device according to claim 16, wherein the control unit performs control such that the first and second pixel groups are exposed over the k-th frame and the (k+1)-th frame.

18. The image processing device according to claim 1, further comprising:
a processor configured to
correct shading characteristics of the first image based on the first image signal, on the basis of a result of comparison between a value of a pixel in the third pixel group and a value of a pixel, which is adjacent to the pixel, in the first pixel group, and correct shading characteristics of the second image based on the second image signal, on the basis of a result of comparison between the value of the pixel in the third pixel group and a value of a pixel, which is adjacent to the pixel, in the second pixel group.

19. An imaging device comprising:

the image processing device according to claim 1;

an imaging element that includes the plurality of pixels; and a storage unit that stores an image which is generated on the basis of a signal output from the imaging element.

20. An image processing method of the image processing device according to claim 1 comprising:

allowing the control unit to read the first image signal from pixels which are selected as the first pixel group among the plurality of pixels, each of which includes an output unit that selectively outputs any one of the first image signal, the second image signal, and the third image signal obtained by adding the first and second image signals which are obtained from the object image that passes through first and second regions of the imaging lens, is pupil-divided, and is formed, to read the second image signal from pixels which are selected as the second pixel group among the plurality of pixels, and to read the third image signal from pixels which are selected as the third pixel group among the plurality of pixels, and allowing the control unit to select the pixels in units of rows as the first, second, and third pixel groups among the plurality of pixels which are two-dimensionally arranged.

21. A non-transitory computer readable recording medium recorded with an image processing program that causes a computer to function as the image processing device according to claim 1 comprising:

allowing the control unit to read the first image signal from pixels which are selected as the first pixel group among the plurality of pixels, each of which includes an output unit that selectively outputs any one of the first image signal, the second image signal, and the third image signal obtained by adding the first and second image signals which are obtained from the object image that passes through first and second regions of the imaging lens, is pupil-divided, and is formed, to read the second image signal from pixels which are selected as the second pixel group among the plurality of pixels, and to read the third image signal from pixels which are selected as the third pixel group among the plurality of pixels, and allowing the control unit to select the pixels in units of rows as the first, second, and third pixel groups among the plurality of pixels which are two-dimensionally arranged.

* * * * *